United States Patent
Tada et al.

(10) Patent No.: US 9,899,903 B2
(45) Date of Patent: Feb. 20, 2018

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Keiko Tada, Chiyoda-ku (JP); Hiromitsu Suzuki, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/516,851

(22) PCT Filed: Dec. 18, 2015

(86) PCT No.: PCT/JP2015/085516
§ 371 (c)(1),
(2) Date: Apr. 4, 2017

(87) PCT Pub. No.: WO2016/104370
PCT Pub. Date: Jun. 30, 2016

(65) Prior Publication Data
US 2017/0302154 A1 Oct. 19, 2017

(30) Foreign Application Priority Data
Dec. 24, 2014 (JP) .................................. 2014-259689

(51) Int. Cl.
*H02M 7/5395* (2006.01)
*H02M 1/12* (2006.01)
(Continued)

(52) U.S. Cl.
CPC .............. *H02M 1/12* (2013.01); *H02M 1/08* (2013.01); *H02M 7/5395* (2013.01); *H02P 27/08* (2013.01)

(58) Field of Classification Search
CPC . H02M 2001/0003; H02M 2001/0009; H02M 2001/0012; H02M 7/02;
(Continued)

(56) References Cited

U.S. PATENT DOCUMENTS

| 4,615,000 A * | 9/1986 | Fujii ....................... H02M 7/48 318/811 |
| 6,107,776 A * | 8/2000 | Nakazawa ........ H02M 7/53875 318/254.2 |

(Continued)

FOREIGN PATENT DOCUMENTS

| JP | 8-256483 A | 10/1996 |
| JP | 2010-200537 A | 9/2010 |

(Continued)

OTHER PUBLICATIONS

H. S. Patel, et al., "Generalized Techniques of Harmonic Elimination and Voltage Control in Thyristor Inverters: Part I—Harmonic Elimination," IEEE Transactions on Industry Applications, vol. IA-9, No. 3, May/Jun. 1973, pp. 310-317.

(Continued)

*Primary Examiner* — Emily P Pham
*Assistant Examiner* — Shahzeb K Ahmad
(74) *Attorney, Agent, or Firm* — Oblon, McClelland, Maier & Neustadt, L.L.P.

(57) ABSTRACT

A switching pattern determination unit in a control unit includes a modulation rate ensuring unit, a harmonic reducing unit, and a function combining unit, and sets a function f prescribing the relationship between each switching phase and a modulation rate, a function Y prescribing the relationship between each switching phase and the sum of squares of values obtained by multiplying a harmonic component of each order by a weighting coefficient of each order, and an evaluation function X formed from the function Y, the (Continued)

function f, and a weighting variable. Then, by a switching phase calculation unit and a switching pattern storage unit, each switching pattern according to each modulation rate m and each number of pulses is obtained and stored which ensures the modulation rate and reduces an addition value of harmonic components of respective orders.

18 Claims, 32 Drawing Sheets

(51) Int. Cl.
*H02M 1/08* (2006.01)
*H02P 27/08* (2006.01)

(58) Field of Classification Search
CPC ........ H02M 7/06; H02M 7/155; H02M 7/525; H02M 7/527; H02M 7/529; H02M 7/538; H02M 7/5387; H02M 7/53873; H02M 7/539; H02M 7/5395; H02M 1/08; H02M 1/12
See application file for complete search history.

(56) References Cited

U.S. PATENT DOCUMENTS

| | | | |
|---|---|---|---|
| 6,950,321 B2* | 9/2005 | Stancu | H02M 1/12 363/40 |
| 2010/0159856 A1* | 6/2010 | Kato | H03F 1/3247 455/114.3 |
| 2012/0001586 A1* | 1/2012 | Maruyama | H02M 1/12 318/798 |
| 2012/0217795 A1* | 8/2012 | Hasegawa | B60L 3/003 307/9.1 |
| 2014/0225547 A1* | 8/2014 | Yokozutsumi | H02P 27/085 318/400.27 |
| 2017/0047862 A1* | 2/2017 | Luo | H02J 3/38 |

FOREIGN PATENT DOCUMENTS

| | | |
|---|---|---|
| JP | 2011-223772 A | 11/2011 |
| JP | 2014-143831 A | 8/2014 |

OTHER PUBLICATIONS

International Search Report dated Mar. 15, 2016 in PCT/JP2015/085516 filed Dec. 18, 2015.

* cited by examiner

POWER CONVERSION DEVICE

TECHNICAL FIELD

The present invention relates to a power conversion device for converting DC voltage to variable-voltage variable-frequency AC voltage through PWM (pulse width modulation) control and outputting the AC voltage, and in particular, to a technique of reducing harmonic components of a wide range of orders in output voltage.

BACKGROUND ART

As a PWM control method, in general, triangular wave comparison PWM is used. In order to reduce harmonics in output voltage, the frequency of the PWM carrier needs to be increased. However, in a large-capacity inverter, since the switching speed of a GTO used as a switching device is slow, the frequency of the PWM carrier cannot be increased. As a result, there is a problem that low-order harmonics are left in the output voltage.

Considering this, a low-order harmonic eliminating PWM control method is proposed which performs switching at a timing of reducing a specific low-order harmonic by effectively utilizing a small number of times of switching (see, for example, Patent Document 1 and Non-Patent Document 1).

A low-order harmonic eliminating PWM switching method using a so-called multilevel inverter is described in, for example, Patent Document 2. Patent Document 2 discloses a designing method for low-order harmonic eliminating PWM control, in which, using a 5-level inverter having a two-stage (two-leg) series configuration in which each stage corresponds to 3-level switching, occurrence of double switching voltage is prevented in line-to-line voltage and switching is performed at a timing of reducing harmonics.

CITATION LIST

Patent Document

Patent Document 1: Japanese Laid-Open Patent Publication No. 8-256483
Patent Document 2: Japanese Laid-Open Patent Publication No. 2010-200537

Non-Patent Literature

Non-Patent Document 1: "Generalized Techniques of Harmonic Elimination and Voltage Control in Thyristor Inverters: Part I-Harmonic Elimination" (IEEE TRANSACTIONS ON INDUSTRY APPLICATIONS, VOL. IA-9, NO. 3, MAY/JUNE 1973)

SUMMARY OF THE INVENTION

Problems to be Solved by the Invention

Depending on the switching pattern specifying a switching phase for each switching device composing the inverter, the modulation rate which corresponds to the ratio of output voltage to input voltage is determined and at the same time, a harmonic component contained in the output voltage is also determined.

If there are a plurality of switching patterns that satisfy a desired modulation rate, it is possible to select a switching pattern that can reduce a harmonic component of a desired order, from the plurality of switching patterns.

Such a switching pattern is represented as a function having, as variables, n-number of switching phases determined in accordance with the number of pulses of switching in PWM control. Specifically, for example, as shown by expression (4) of Patent Document 2, a total of n-number of simultaneous equations are created which are constituted of an equation needed for obtaining a desired modulation rate m and equations needed for reducing individual harmonic components of desired orders (fifth, seventh, eleventh, thirteenth orders), and then, from the solutions thereof, n-number of switching phases are obtained, whereby a desired switching pattern can be specified.

In the conventional harmonic reducing method, as is found from above, since it is necessary to create simultaneous equations the number of which is the same as the number of order kinds of harmonics to be reduced, naturally, the number of the order kinds is limited. In particular, in a large-capacity inverter, in the case of using an device having a low switching speed and performing operation with a comparatively small number of pulses, there is a problem that the above limitation is so severe that harmonic components cannot effectively be reduced.

The present invention has been made to solve the above conventional problems, and an object of the present invention is to obtain a power conversion device in which the number of order kinds of harmonics to be reduced is not directly limited by the number of pulses and therefore harmonic components of a wide range of orders in output voltage can be reduced even with a comparatively small number of pulses.

Solution to the Problems

A power conversion device according to the present invention includes: an inverter which includes a switching device, receives DC voltage of a DC voltage source, converts the DC voltage to variable-voltage variable-frequency AC voltage, and outputs the AC voltage to a load; and a control unit for performing PWM control for ON/OFF driving of the switching device on the basis of an output voltage command value and an output frequency command value.

The control unit includes: a modulation rate calculator for calculating a modulation rate for the inverter on the basis of the DC voltage of the DC voltage source and the output voltage command value; a pulse number determination unit for determining a number of pulses per half cycle of a fundamental wave in the PWM control on the basis of the output frequency command value; a switching pattern determination unit for obtaining, in advance, through calculation, a switching pattern specifying switching phases each of which is a timing of ON/OFF driving the switching device, in accordance with the modulation rate and the number of pulses, and stores the switching pattern for each modulation rate and for each number of pulses; and a gate signal generation unit for reading, from the switching pattern determination unit, the switching pattern corresponding to the modulation rate from the modulation rate calculator and the number of pulses from the pulse number determination unit, and generating a gate signal for ON/OFF driving the switching device, on the basis of the switching pattern.

The switching pattern determination unit includes: a modulation rate ensuring unit for generating a first function which is a function for ensuring the modulation rate and which associates a fundamental wave component of an output waveform of the inverter with the modulation rate and has the switching phases as variables; a harmonic reducing unit for generating a second function which is a function for reducing a harmonic component in the output waveform of the inverter and which is an addition value of harmonic elements of respective orders determined by harmonic components of respective orders in the output waveform of the inverter, and has the switching phases as variables; a function combining unit for setting a third function which is formed from the first function, the second function, and one or more additional variables, and has the switching phases and the additional variables as variables; a switching phase calculation unit for calculating the switching phases that ensures the modulation rate and reduces the addition value of the harmonic elements of respective orders, by minimizing the third function with respect to the switching phases and the additional variables; and a switching pattern storage unit for storing the switching pattern specified by the calculated switching phases, for each modulation rate and for each number of pulses.

Effect of the Invention

As described above, the switching pattern determination unit in the power conversion device according to the present invention includes: a modulation rate ensuring unit for generating a first function which is a function for ensuring the modulation rate and which associates a fundamental wave component of an output waveform of the inverter with the modulation rate and has the switching phases as variables; a harmonic reducing unit for generating a second function which is a function for reducing a harmonic component in the output waveform of the inverter and which is an addition value of harmonic elements of respective orders determined by harmonic components of respective orders in the output waveform of the inverter, and has the switching phases as variables; a function combining unit for setting a third function which is formed from the first function, the second function, and one or more additional variables, and has the switching phases and the additional variables as variables; a switching phase calculation unit for calculating the switching phases that ensures the modulation rate and reduces the addition value of the harmonic elements of respective orders, by minimizing the third function with respect to the switching phases and the additional variables; and a switching pattern storage unit for storing the switching pattern specified by the calculated switching phases, for each modulation rate and for each number of pulses. Therefore, the number of order kinds of harmonics to be reduced is not directly limited by the number of pulses and therefore harmonic components of a wide range of orders in output voltage can be reduced even with a comparatively small number of pulses.

DESCRIPTION OF EMBODIMENTS

Embodiment 1

Figure 1:
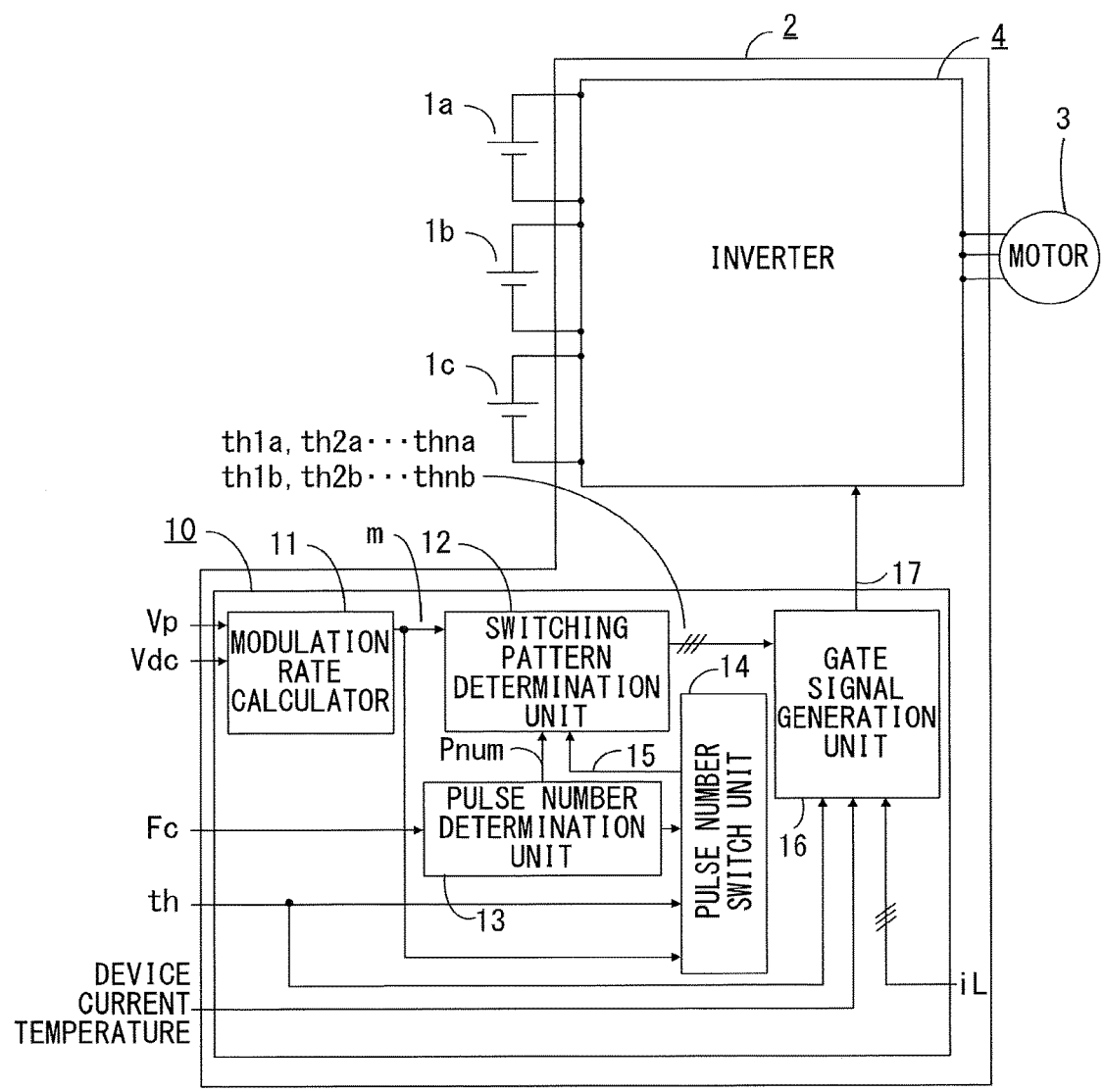
FIG. 1 is a circuit diagram showing the entire configuration of a power conversion device in embodiment 1 of the present invention.
Figure 2:
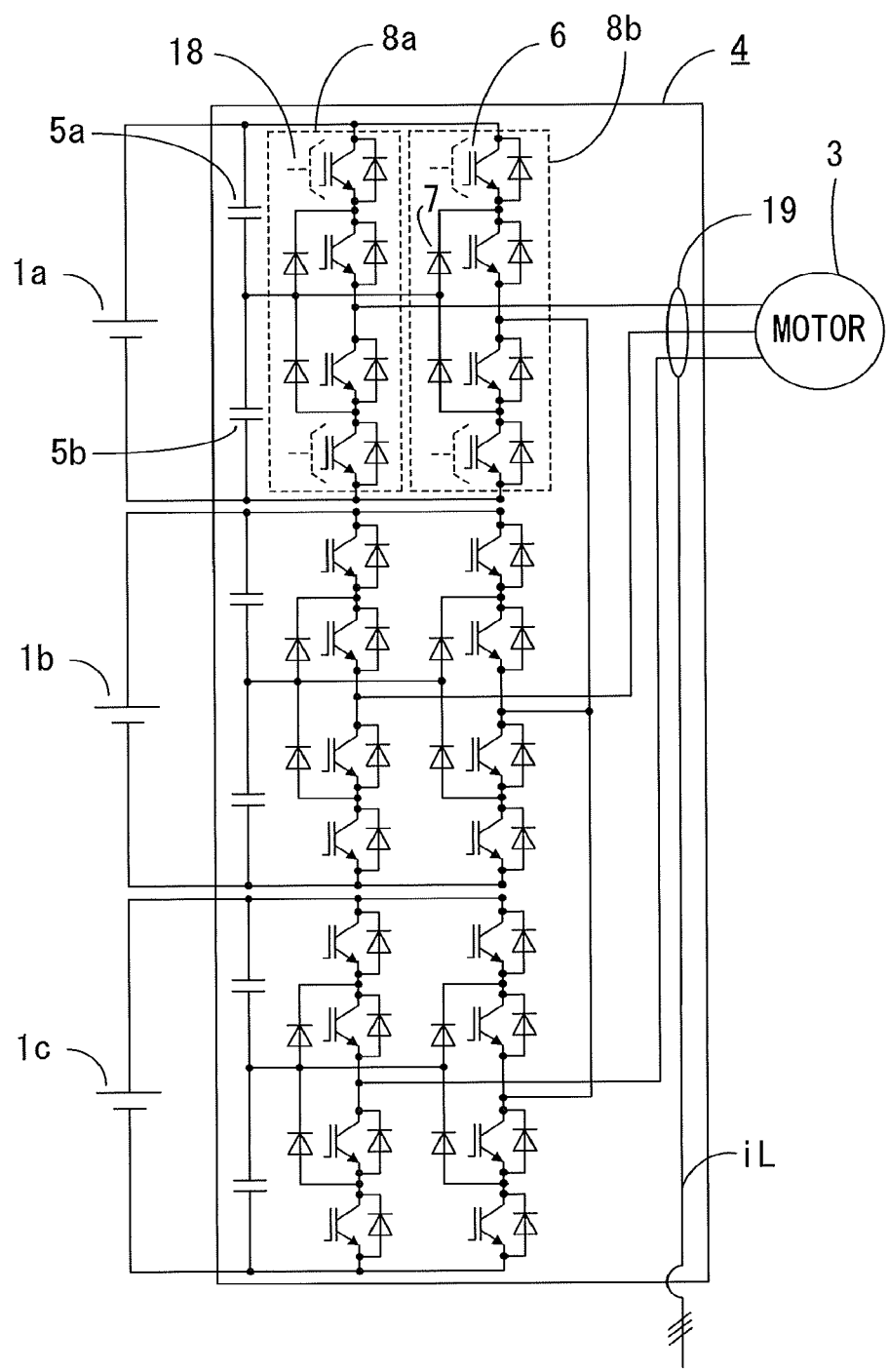
FIG. 2 is a circuit diagram showing the configuration of an inverter of the power conversion device in embodiment 1 of the present invention.

FIG. 1 is a circuit diagram showing the entire configuration of a power conversion device 2 in embodiment 1 of the present invention. In FIG. 1, the power conversion device 2 includes an inverter 4 and a control unit 10 for controlling the inverter 4, and converts DC voltages of DC voltage sources 1a, 1b, 1c for U, V, W phases to variable-voltage variable-frequency AC voltage, and outputs the AC voltage to a motor 3 as a load. FIG. 2 is a circuit diagram showing the configuration of the inverter 4.

The inverter 4 is configured as a 5-level inverter in which two switching legs 8a and 8b are connected in series for each phase, the two switching legs 8a and 8b composing a neutral-point-clamp-type 3-level inverter including: a positive-side capacitor 5a and a negative-side capacitor 5b which are two-series connected and divide DC voltage of the DC voltage source 1a; a plurality of switching devices 6 formed from IGBTs or the like to which diodes are respectively connected in antiparallel; and clamp diodes 7.

Figure 3:
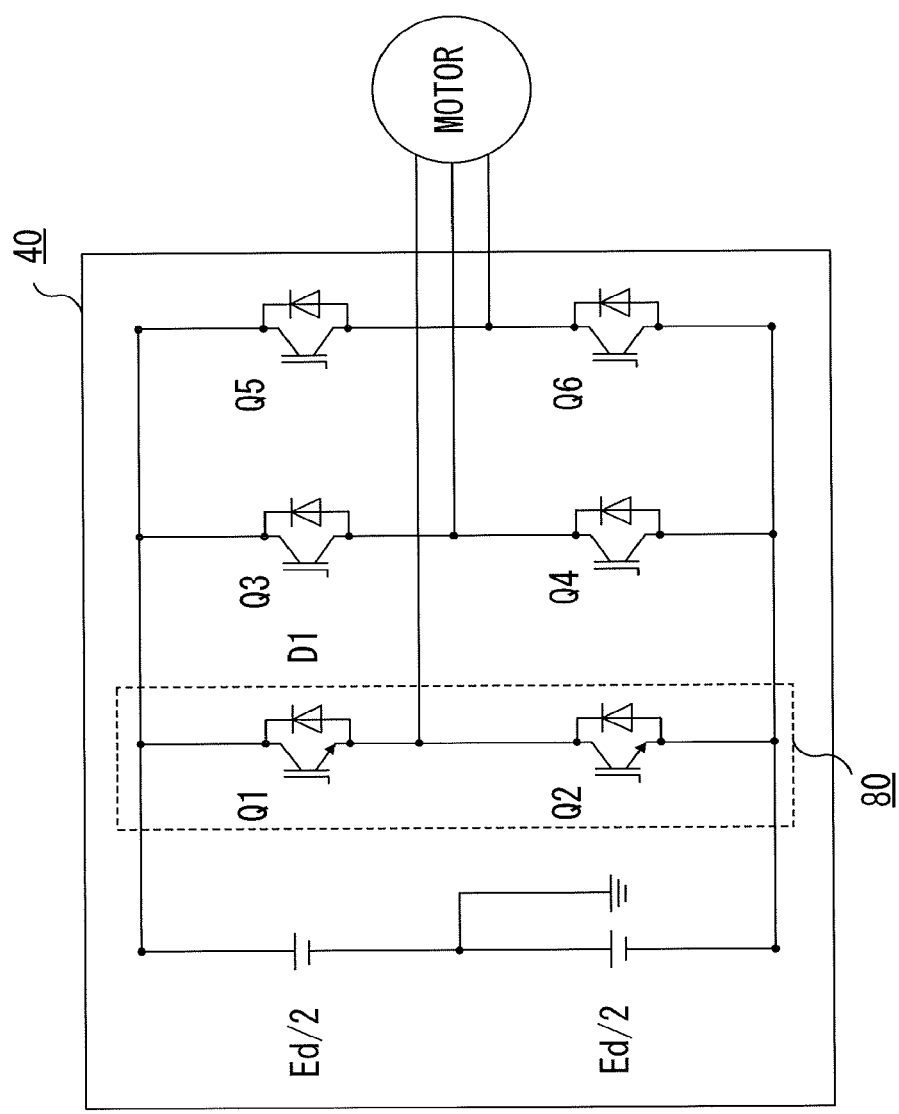
FIG. 3 is a circuit diagram showing the configuration of an inverter in another example of the embodiment of the present invention.

Hereinafter, a switching pattern and the like will be described for the case of configuring a 5-level inverter in which two switching legs 8a and 8b composing a 3-level inverter are connected in series for each phase as described above. However, the present invention may be applied to the case of using, for example, a 2-level inverter, instead of a 3-level inverter, and in addition, the present invention is not necessarily limited to the case of using a series unit of two legs but may be applied to other cases. FIG. 3 shows an example of a 2-level inverter 40 each phase of which is composed of one switching leg 80. Two of the 2-level switching legs 80 shown in FIG. 3 may be connected in series for each phase, and thus may be used for the inverter.

The inverter 4 converts DC voltages of the DC voltage sources 1a to 1c through ON/OFF driving of the switching devices 6 by PWM (pulse width modulation) control, to AC voltage having an arbitrary magnitude and an arbitrary frequency, and outputs the AC voltage. The inverter 4 has, at a part connected to the motor 3, a current sensor 19 as a load current detection unit for detecting current of the motor 3 which is load current iL. The inverter 4 has an device current/temperature sensor 18 as an device current detection unit for detecting current flowing through each switching device 6 and as an device temperature detection unit for detecting the temperature of each switching device 6.

The control unit 10 includes a modulation rate calculator 11, a pulse number determination unit 13, a switching pattern determination unit 12, a pulse number switch unit 14, and a gate signal generation unit 16. Hereinafter, these components will be described.

The modulation rate calculator 11 calculates a modulation rate m by expression (1) on the basis of DC voltage Vdc of each DC voltage source 1a to 1c and an output voltage command value (phase voltage amplitude) Vp of the inverter 4.

[Mathematical 1]

Mathematical 1

$$m = Vp/Vdc \qquad (1)$$

The pulse number determination unit 13 determines a pulse number Pnum which is the number of pulses per half cycle of the fundamental wave in PWM control, on the basis of an output frequency command value Fc for the inverter 4.

In the case where the inverter 4 has devices having low switching speeds as in a large-capacity inverter, when the output frequency command value Fc becomes high, the pulse number Pnum per half cycle needs to be decreased in a stepwise manner to decrease the number of times of switching. In the present embodiment, in high-speed operation, the pulse number Pnum is set at 1 (one pulse per half cycle).

When the pulse number Pnum determined by the pulse number determination unit 13 changes, the pulse number switch unit 14 sets a switch transitional period, and when the output voltage phase (th) of the inverter 4 becomes a predetermined phase, the pulse number switch unit 14 outputs, to the switching pattern determination unit 12, a switch command 15 for switching a switching pattern to be read out from the switching pattern determination unit 12.

The switching pattern determination unit 12 obtains, in advance, through calculation, for each pulse number Pnum and for each magnitude of the modulation rate m, a switching pattern for specifying switching phases corresponding to timings of ON/OFF driving each switching device 6, and stores the switching pattern for each modulation rate m and for each pulse number Pnum.

This calculation is for obtaining a switching pattern that achieves a required modulation rate m and reduces a harmonic component, and constitutes a major part of the present invention. The switching pattern and the way of calculation thereof will be described later in detail.

The gate signal generation unit 16 reads out, from the switching pattern determination unit 12, a switching pattern corresponding to the modulation rate m from the modulation rate calculator 11 and the pulse number Pnum from the pulse number determination unit 13, and generates a gate signal 17 for ON/OFF driving each switching device 6, on the basis of the switching pattern and an output voltage phase (th).

Figure 4:
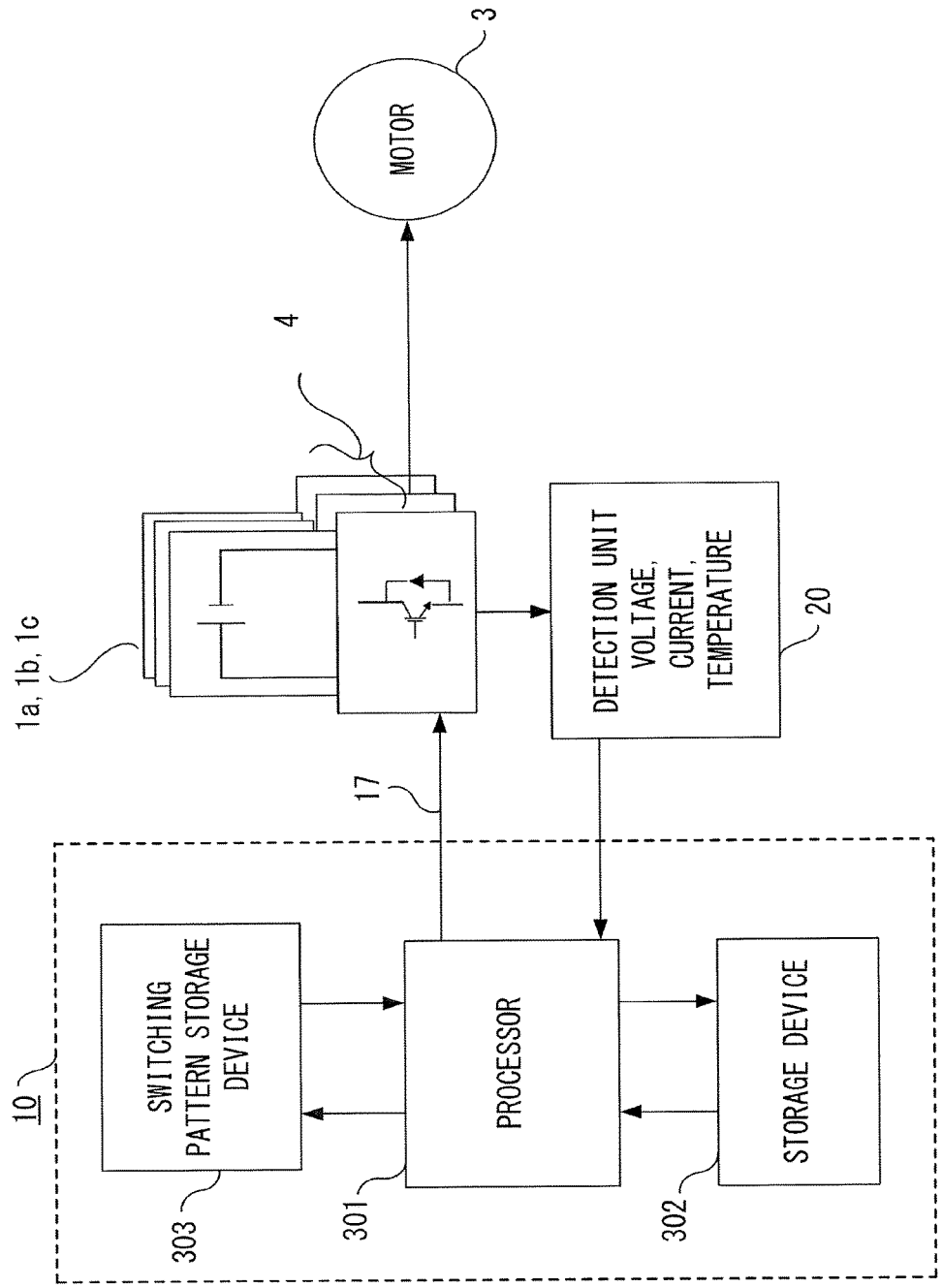
FIG. 4 is a diagram showing the hardware configuration of the power conversion device in embodiment 1 of the present invention.

FIG. 4 is a diagram showing the hardware configuration of the power conversion device 2. The control unit 10 includes a processor 301, a storage device 302, and a switching pattern storage device 303. The storage device 302 stores a program for the control unit 10 in advance. The processor 301 executes a function program stored in the storage device 302. The modulation rate calculator 11, the switching pattern determination unit 12, the pulse number determination unit 13, the pulse number switch unit 14, and the gate signal generation unit 16 in the control unit 10 are realized by the processor 301. The switching pattern storage device 303 stores the switching pattern determined by the switching pattern determination unit 12, by a program executed by the processor 301. The switching pattern storage device 303 may store the switching pattern during execution of the function program or at the time of starting.

As shown in FIG. 4, the gate signal 17 for ON/OFF driving each switching device 6 of the inverter 4 is generated through a calculation process by the processor 301 on the basis of information from a detection unit 20 which is a sensor group (including sensors 18 and 19) for detecting voltage, current, an device temperature, and the like at each part of the inverter 4.

Next, operations will be described. The operation of the inverter 4 itself based on ON/OFF driving of the switching devices 6 is known and therefore the description thereof is omitted. Here, the control unit 10, in particular, the switching pattern and the way of calculation of the switching pattern by the switching pattern determination unit 12, which are important in the present invention, will be mainly described.

Figure 5:
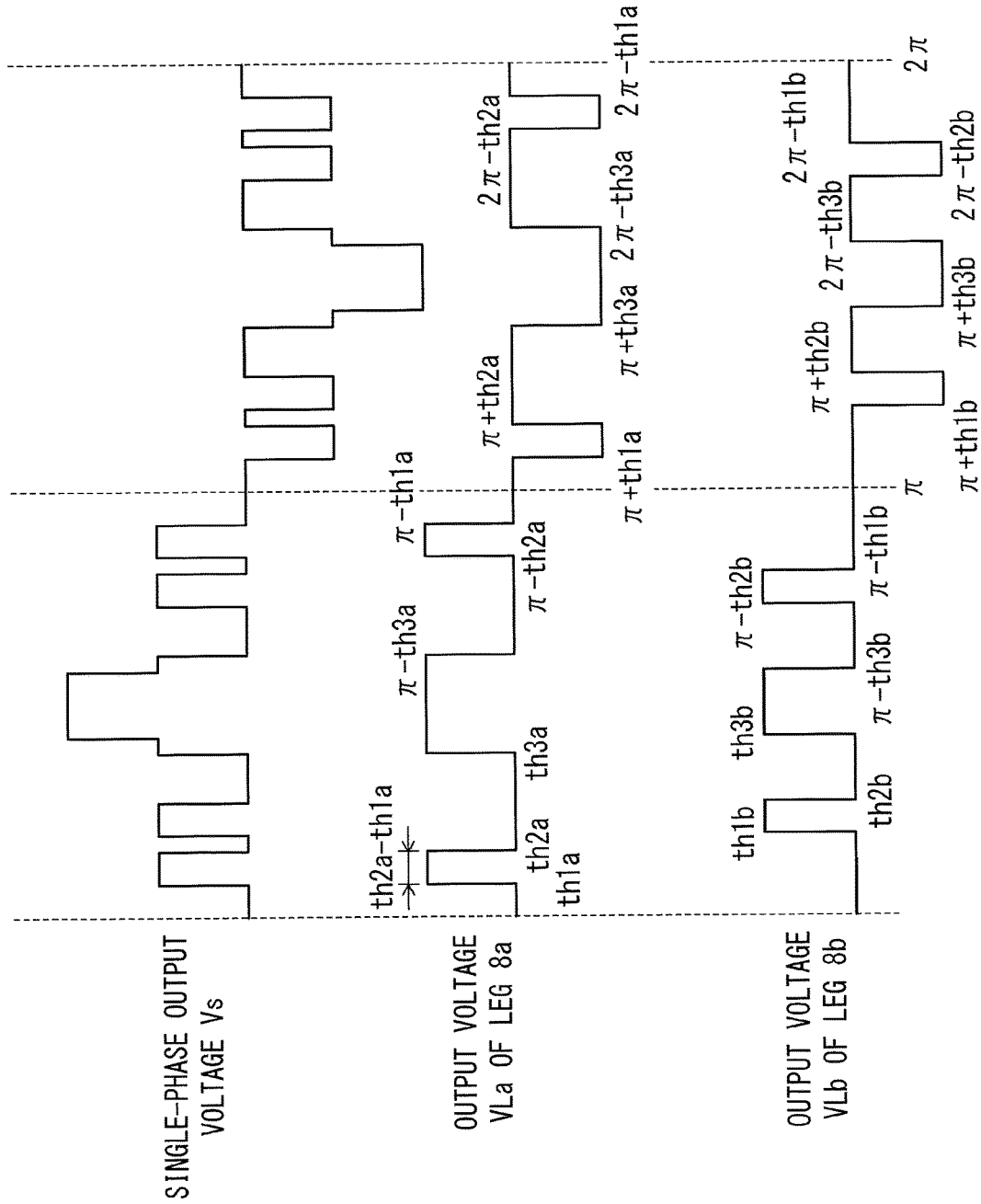
FIG. 5 is a diagram showing an example of an output voltage waveform for a single phase of the inverter controlled with a pulse number of 3, in embodiment 1 of the present invention.

FIG. 5 shows the relationship between the output voltage waveform for a single phase of the inverter 4 (5-level inverter 4) and the output voltage waveforms of the two switching legs 8a and 8b connected in series, in the case of pulse number Pnum=3.

FIG. 5 shows pulse voltage waveforms for one cycle (2π), and shows single-phase output voltage Vs of the 5-level inverter 4, output voltage VLa of the switching leg 8a, and output voltage VLb of the switching leg 8b. The switching legs are abbreviated as legs.

As shown in FIG. 5, by adding the output voltages VLa and VLb of the two switching legs 8a and 8b, the single-phase output voltage Vs of the 5-level inverter 4 which operates with a total pulse number=Pnum (3)×number of leg series stages (2)=6 is obtained.

Since the symmetry of positive and negative waveforms needs to be compensated, as switching phases corresponding to timings of turning on or off the switching devices 6, th1a, th2a, and th3a are determined for the switching leg 8a, and th1b, th2b, and th3b are determined for the switching leg 8b, as shown in FIG. 5. Thus, the output waveforms of the switching legs 8a and 8b and further the output voltage waveform of the 5-level inverter 4 are determined.

That is, the switching pattern is to specify these six switching phases th1a, th2a, th3a, th1b, th2b, th3b, and the output voltage waveform of the inverter 4 is to be specified by the switching pattern.

Here, for facilitating the understanding of the configuration and operation of the switching pattern determination unit 12 for obtaining the switching pattern in the present invention, first, a comparative example showing determination of a switching pattern using the method of the above Patent Document 2 will be described below, with reference to FIG. 6 and FIG. V.

In the above Patent Document 2, there is particularly no explanation based on a drawing showing the control configuration. However, here, in order to clarify contrast with the invention of the present application, the comparative example intentionally assumes the control configuration corresponding to the switching pattern determination unit 12 in the present embodiment 1. In addition, the inverter configuration is assumed to be the same as the 5-level inverter 4 used in the present embodiment 1.

Figure 6:
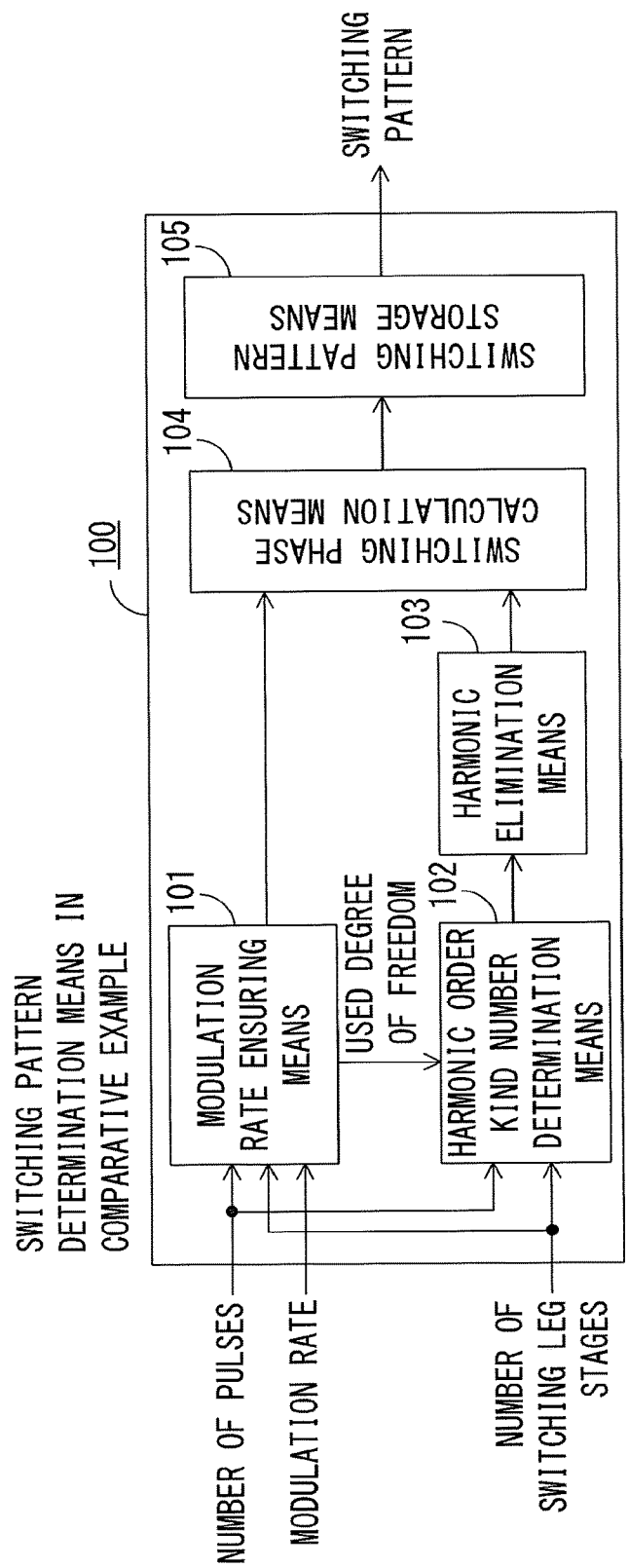
FIG. 6 is a diagram showing the control configuration of switching pattern determination means in a comparative example.

In FIG. 6, switching pattern determination means 100 is means for calculating a switching phase group (switching pattern) for ensuring the modulation rate amplitude and eliminating harmonics of specific orders, by using an expression representing the amplitude of an output voltage fundamental wave and the amplitude of an integer-multiple frequency component thereof by a trigonometrical function and switching phases (0 to 2π) by a Fourier series by frequency-converting a time-series switching pattern determined by the number of pulses, a modulation rate, and an output frequency.

The switching pattern determination means 100 includes: modulation rate ensuring means 101 for ensuring the modulation rate amplitude; harmonic order kind number determination means 102 for calculating the degree of freedom of simultaneous equations described later, which is determined by the number of switching phases based on the number of pulses and the determined switching leg series-stage number, and determining the number of order kinds of harmonics that can be eliminated, from the above degree of freedom and the number of degree of freedom used by the modulation rate ensuring means 101; harmonic elimination means 103 for performing harmonic elimination for the orders of harmonics that can be eliminated on the basis of the harmonic order kind number determination means 102; switching phase calculation means 104 for calculating switching phases for a switching pattern by solving expressions set by the modulation rate ensuring means 101 and the harmonic elimination means 103; and switching pattern storage means 105 for storing, for each modulation rate and for each pulse number, the switching pattern determined by the switching phases calculated by the switching phase calculation means 104.

Next, a method for defining the frequency and the amplitude of a voltage waveform outputted through switching, using a Fourier series, will be described. An output voltage waveform outputted from each switching leg is set to be a waveform having 120-degree symmetry among the respective phases and having symmetry in ¼ cycle and in ½ cycle, irrespective of the number of pulses. Therefore, only harmonic voltages of integer orders are contained, and harmonic voltages of even-numbered orders and orders of multiples of 3 do not occur in theory. Therefore, if the order of the fundamental wave is defined as 1, the order of each harmonic that occurs is represented by 6n±1. That is, the order of each harmonic based on a fundamental wave frequency as a reference is represented as 6n±1, where n is a natural number, and the order takes values such as 5, 7, 11, 13, 17, 19, 23, 25, 29, 31, 35, 37, . . . .

For example, at the pulse number Pnum=3, in the case of calculating a switching pattern that can ensure the modulation rate m and eliminate harmonic components of fifth, seventh, eleventh, and thirteenth orders, simultaneous equations as shown by expression (2) are obtained. These correspond to expression (4) of the above Patent Document 2.

[Mathematical 2]

$$\left.\begin{aligned}&\frac{4}{\pi}(\cos th1a-\cos th2a+\cos th3a)=m\\&\frac{4}{\pi}(\cos th1b-\cos th2b+\cos th3b)=m\\&\cos 5th1a-\cos 5th2a+\cos 5th3a+\\&\cos 5th1b-\cos 5th2b+\cos 5th3b=0\\&\cos 7th1a-\cos 7th2a+\cos 7th3a+\\&\cos 7th1b-\cos 7th2b+\cos 7th3b=0\\&\cos 11th1a-\cos 11th2a+\cos 11th3a+\\&\cos 11th1b-\cos 11th2b+\cos 11th3b=0\\&\cos 13th1a-\cos 13th2a+\cos 13th3a+\\&\cos 13th1b-\cos 13th2b+\cos 13th3b=0\end{aligned}\right\} \quad (2)$$

In expression (2), the first stage is an equation prescribing the relationship between the modulation rate m and the switching phases th1a, th2a, th3a for the switching leg 8a, and the second stage is an equation prescribing the relationship between the modulation rate m and the switching phases th1b, th2b, th3b for the switching leg 8b. These are set by the modulation rate ensuring means 101 in FIG. 6.

Next, the harmonic order kind number determination means 102 calculates the number of switching phases in a harmonic output voltage fundamental wave half cycle, from the number of pulses and the number of stages of switching legs per one phase of the inverter 4, and determines the number of order kinds of harmonics that can be eliminated. Here, the number of switching phases is represented as total pulse number=pulse number Pnum×2 stages=6, and the degree of freedom of the simultaneous equations is 6.

In the equations at the first and second stages of expression (2), the modulation rate ensuring means 101 sets allocation of the modulation rate (fundamental wave amplitude) on a stage number basis of switching legs so that voltage amplitudes to be outputted from the two switching legs 8a and 8b are equally allocated. Therefore, the number of order kinds of harmonics that can be eliminated is 6−2=4.

Accordingly, the harmonic elimination means 103 sets equations at the third to sixth stages of expression (2) so that four harmonic components of, from the lowest order, fifth, seventh, eleventh, and thirteenth orders, become zero.

The switching phase calculation means 104 solves the simultaneous equations with six unknowns composed of the equations at the first and second stages of expression (2), which are set by the modulation rate ensuring means 101, and the equations at the third to sixth stages of expression (2), which are set by the harmonic elimination means 103, thereby calculating six variables that specify a switching pattern, i.e., the switching phases (th1a to th3b).

Figure 7:
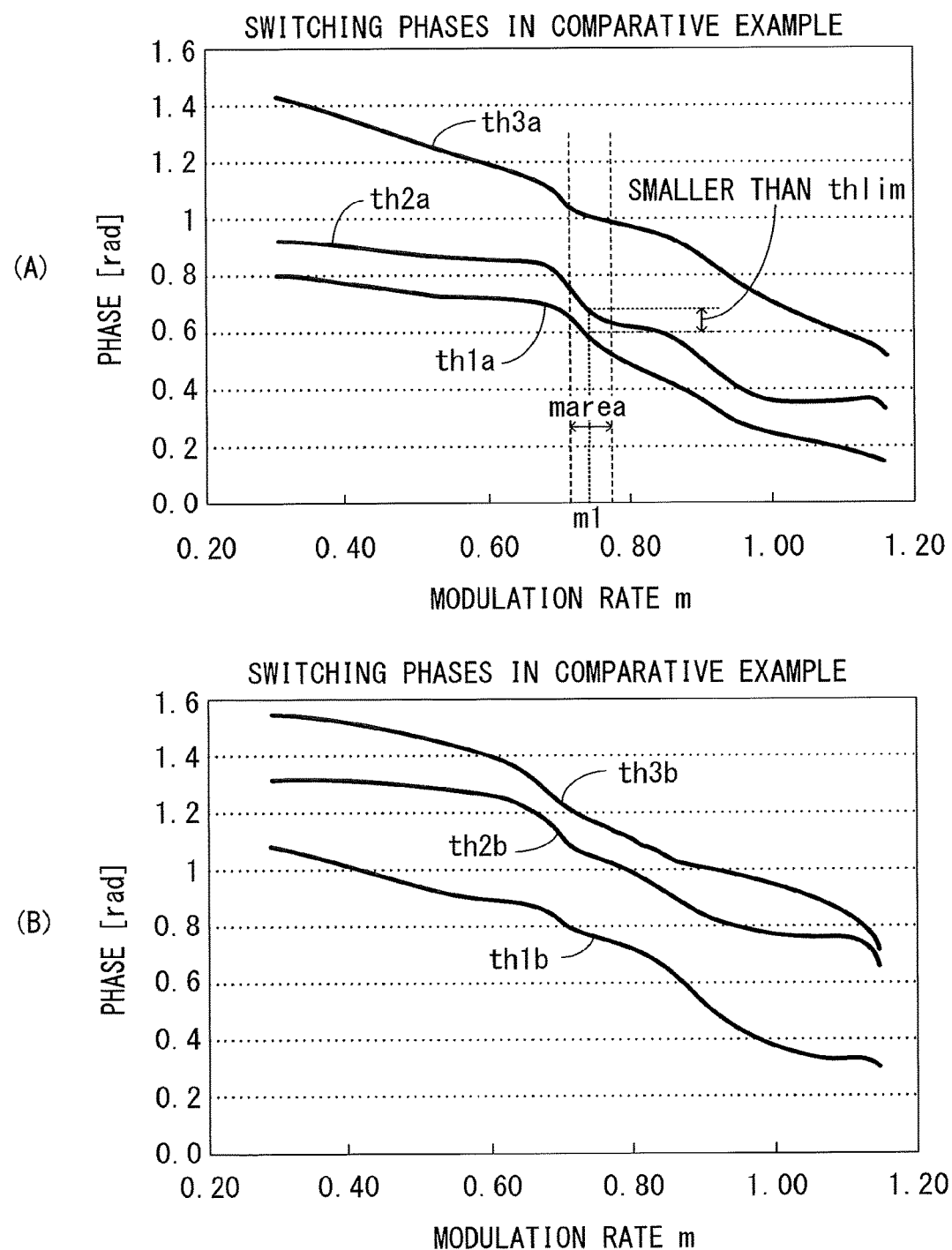
FIG. 7 is a diagram showing a switching pattern based on a low-order harmonic eliminating PWM control method in the comparative example.

FIG. 7 is a diagram showing the characteristics of the switching phases, calculated over a predetermined range of modulation rates m by expression (2). FIG. 7(A) shows the characteristics of the switching phases th1a, th2a, th3a for the switching leg 8a, and FIG. 7(B) shows the characteristics of the switching phases th1b, th2b, th3b for the switching leg 8b.

Thus, a switching pattern is obtained so that the output modulation rates of the switching legs 8a and 8b become the same to equalize the burdens on the switching legs 8a and 8b and harmonics of four kinds of orders become zero.

However, as shown in FIG. 7(A), in a region marea around the modulation rate m1, partially, the phase difference between the adjacent switching phases th1a and th2a of the same switching device is smaller than a lower limit phase difference thlim that is tolerable in the switching device mainly in view of switching speed performance.

As a measure therefor, while the modulation rate ensuring means 101 is kept as it is, the configuration of the harmonic order kind number determination means 102 may be changed such that, in expression (2), the number of order kinds of harmonics to be reduced is decreased by one, and instead, an equation for ensuring the lower limit phase difference thlim is employed to calculate solutions. Alternatively, as shown in the above Patent Document 2, the configuration of the modulation rate ensuring means 101 may be changed so as to, at the modulation rate m1, employ solutions of simultaneous equations shown by the following expression (3) (corresponding to expression (5) of the document 2) in which the condition for equalizing the burdens on the switching legs 8a and 8b is relaxed, thereby ensuring the condition of the phase difference (th2a−th1a)=thlim.

[Mathematical 3]

$$\left.\begin{aligned}&\frac{2}{\pi}(\cos th1a-\cos th2a+\cos th3a+\\&\quad\cos th1b-\cos th2b+\cos th3b)=m\\&\cos 5th1a-\cos 5tha+\cos 5th3a+\\&\cos 5th1b-\cos 5th2b+\cos 5th3b=0\\&\cos 7th1a-\cos 7th2a+\cos 7th3a+\\&\cos 7th1b-\cos 7th2b+\cos 7th3b=0\\&\cos 11th1a-\cos 11th2a+\cos 11th3a+\\&\cos 11th1b-\cos 11th2b+\cos 11th3b=0\\&\cos 13th1a-\cos 13th2a+\cos 13th3a+\\&\cos 13th1b-\cos 13th2b+\cos 13th3b=0\\&th2a-th1a=th\text{lim}\end{aligned}\right\} \quad (3)$$

As is found from the above expression (2) and expression (3), in the switching pattern determination means 100 in the comparative example, in the simultaneous equations set for obtaining a switching pattern through calculation, the relational equations for reducing harmonics, which are set by the harmonic elimination means 103, need to be set using only as many equations as the number of order kinds determined by the harmonic order kind number determination means 102. As a result, in the case of a small pulse number Pnum, e.g., Pnum=1, for example, as shown by expression (4), the number of variables for specifying a switching pattern is two, i.e., th1a and th1b, and if one relational equation is set for prescribing the modulation rate m, the number of the remaining relational equations that can be set for reducing harmonics is only one, that is, only a harmonic of one kind of order, here, fifth order, can be reduced.

[Mathematical 4]

$$\left.\begin{aligned}&\frac{2}{\pi}(\cos th1a+\cos th1b)=m\\&\cos 5th1a+\cos 5th1b=0\end{aligned}\right\} \quad (4)$$

In the present invention, the number of order kinds of harmonics to be reduced is not directly limited by the number of pulses, and therefore, even if the pulse number Pnum is comparatively small, it is also possible to reduce, in output voltages, harmonic components of which the number of order kinds is equal to or greater than the total pulse number. Hereinafter, the details thereof will be specifically described.

Figure 8:
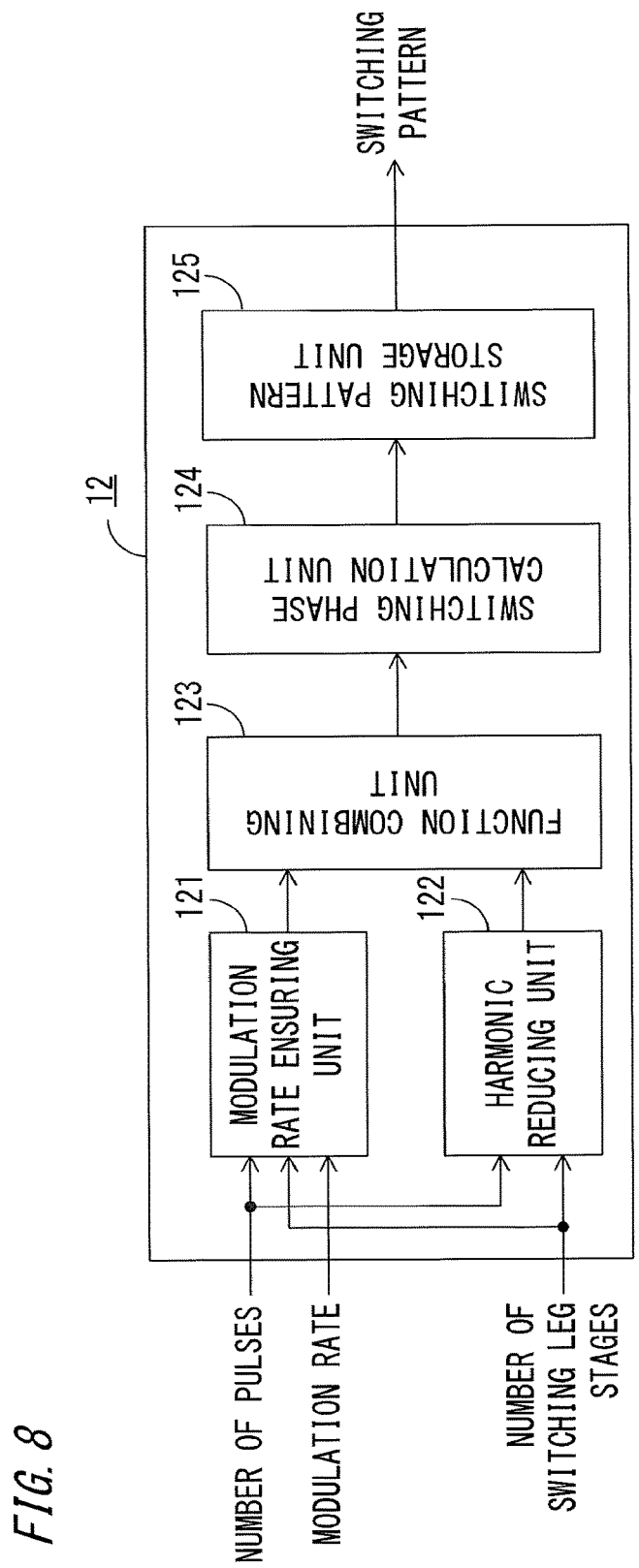
FIG. 8 is a diagram showing the internal configuration of a switching pattern determination unit in embodiment 1 of the present invention.

FIG. 8 is a diagram showing the internal configuration of the switching pattern determination unit 12 employed in the power conversion device 2 in embodiment 1 of the present invention.

In FIG. 8, the switching pattern determination unit 12 includes a modulation rate ensuring unit 121, a harmonic reducing unit 122, a function combining unit 123, a switching phase calculation unit 124, and a switching pattern storage unit 125. As described above, the switching pattern determination unit 12 is realized by the processor 301, but the switching pattern storage unit 125 in the switching pattern determination unit 12 is realized by the switching pattern storage device 303.

The modulation rate ensuring unit 121 generates a first function f which is a function for ensuring the modulation rate and which associates the fundamental wave component of the output waveform of the inverter 4 with the modulation rate, on the basis of the modulation rate, the number of pulses, and the number of switching leg stages. The harmonic reducing unit 122 sets a second function Y which is a function for reducing harmonic components of the output waveform of the inverter 4 and which is an addition value of harmonic elements of respective orders described later determined by the harmonic components of respective orders, on the basis of the number of pulses and the number of switching leg stages. The function combining unit 123 sets an evaluation function X as a third function which is formed from the first function f, the second function Y, and one or more additional variables described later. The switching phase calculation unit 124 minimizes the evaluation function X with respect to each switching phase and the additional variable, thereby calculating switching phases that ensure the modulation rate and reduce the addition value of harmonic elements of respective orders. The switching pattern storage unit 125 stores, for each modulation rate and for each pulse number, a switching pattern determined by the switching phases calculated by the switching phase calculation unit 124.

As specific examples of the first function f, the second function Y, and the evaluation function X described above, here, three functions shown by the following expression (5), expression (6), and expression (7) are defined.

[Mathematical 5]

$$f(th1a, th2a, th3a, th1b, th2b, th3b) = \\ (\cos th1a - \cos th2a + \cos th3a + \\ \cos th1b - \cos th2b + \cos th3b) - m \quad (5)$$

$$Y(th1a, th2a, th3a, th1b, th2b, th3b) = \\ \sum \left\{ \frac{2}{\pi} \times \frac{1}{k} (\cos k th1a - \cos k th2a + \cos k th3a + \\ \cos k th1b - \cos k th2b + \cos k th3b) \times w(k) \right\}^2 \quad (6)$$

$$(k = 5, 7, 11, 13, 17, 19, 23, 25)$$

$$X(th1a, th2a, th3a, th1b, th2b, th3b, \alpha) = \\ Y(th1a, th2a, th3a, th1b, th2b, th3b) + \\ \alpha \times f(th1a, th2a, th3a, th1b, th2b, th3b) \quad (7)$$

First, as shown by expression (5), in order to ensure the modulation rate m obtained by connecting the switching legs 8a and 8b in series, the modulation rate ensuring unit 121 defines a first function f(thi) which prescribes the relationship between each switching phase (here, corresponding to th1a, th2a, th3a, th1b, th2b, th3b; hereinafter, may be referred to as thi) and the modulation rate m and which has each switching phase thi as a variable.

Next, as shown by expression (6), in order to reduce a harmonic, the harmonic reducing unit 122 defines a second function Y(thi) which prescribes the relationship between each switching phase thi and, as the addition value of respective harmonic elements, the sum of squares of values obtained by multiplying a harmonic voltage component of each order in the output waveform of the inverter 4 by a weighting coefficient w(k) (k=k1 to kj) of each order, and which has each switching phase thi as a variable.

In expression (6), k is the order of a harmonic to be reduced, and here, a total of eight kinds of orders, i.e., fifth order, ..., twenty-fifth order, are reduction targets. However, the reduction targets are not limited thereto. The weighting coefficient w(k) will be further described later.

As shown by expression (7), in order to ensure the modulation rate and reduce the aforementioned sum of squares relevant to the harmonic voltage components of respective orders, the function combining unit 123 defines the evaluation function X having an increased degree of freedom by further adding additional variables to the degree of freedom (corresponding to the number of the switching phases thi as variables, here, six variables) of the first function f and the second function Y.

Specifically, the function combining unit 123 defines the evaluation function X(thi, α) which is the sum of the function Y(thi) shown by expression (6) and a value obtained by multiplying the function f(thi) shown by expression (5) by a weighting variable α as an additional variable, and which has each switching phase thi and the weighting variable α as variables.

In the evaluation function X, also the second function Y may be multiplied by another additional variable.

The switching phase calculation unit 124 creates simultaneous equations with seven unknowns shown by expression (8) in which partial derivatives of the evaluation function X(thi, α) with respect to the seven variables α and th1a to th3b are all set at zero. By solving the simultaneous equations with seven unknowns using, for example, Newton's method, it is possible to obtain a switching pattern that ensures a required modulation rate m and minimizes the overall value of harmonic voltage components of many orders.

[Mathematical 6]

$$\left. \begin{array}{l} \dfrac{\partial X}{\partial \alpha} = 0 \\ \dfrac{\partial X}{\partial thi} = 0 \\ (i = 1a, 2a, 3a, 1b, 2b, 3b) \end{array} \right\} \quad (8)$$

Figure 9:
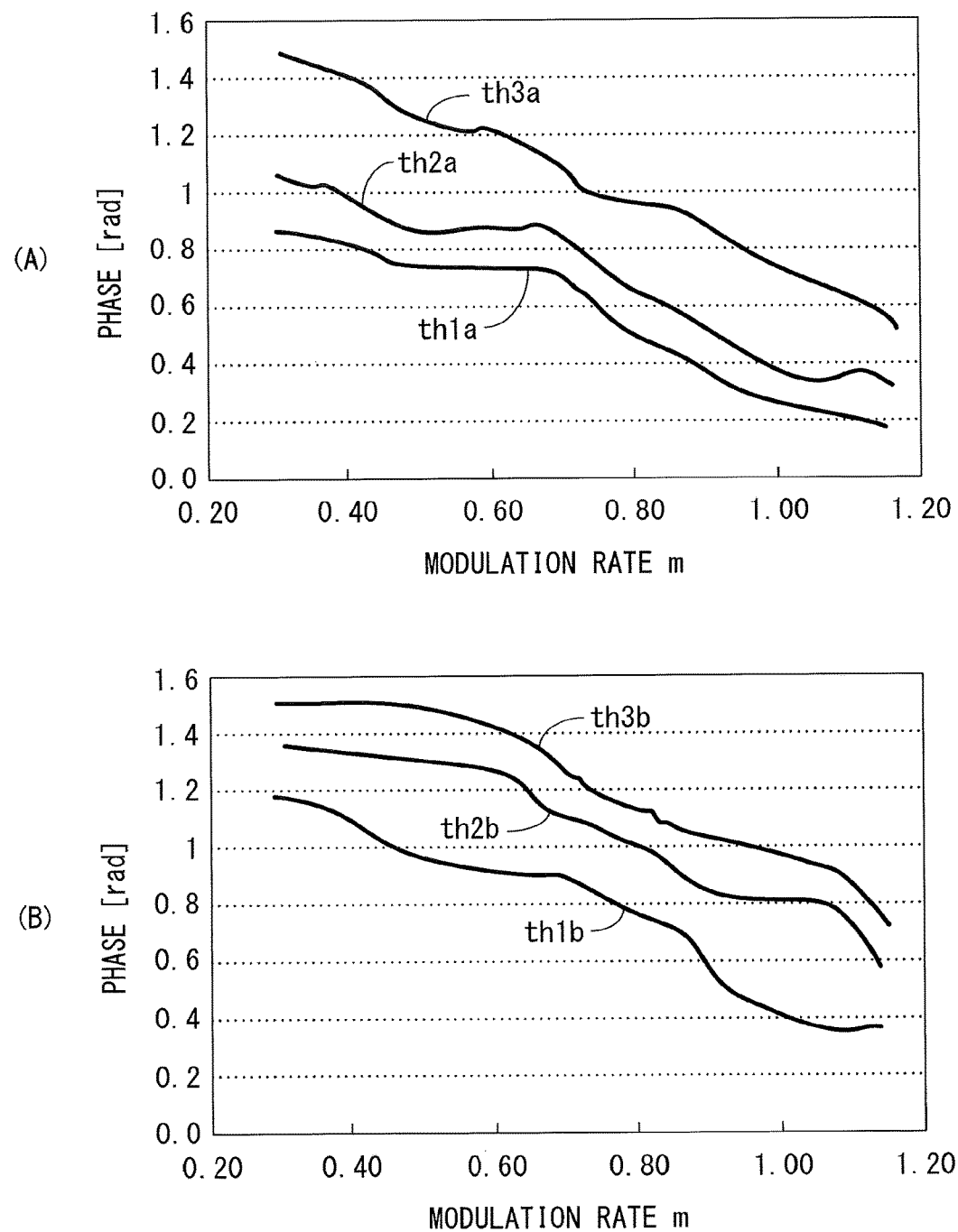
FIG. 9 is a diagram showing an example of a switching pattern in the case of applying a pulse number of 3, in embodiment 1 of the present invention.

FIG. 9 is a diagram showing the characteristics of switching phases calculated over a range of modulation rates m from 0.3 to 1.15 by expression (8) set by the switching phase calculation unit 124. FIG. 9(A) shows the characteristics of the switching phases th1a, th2a, th3a for the switching leg 8a, and FIG. 9(B) shows the characteristics of the switching phases th1b, th2b, th3b for the switching leg 8b.

As also understood from expression (6) and expression (8), in the present invention, the pulse number Pnum and the number of order kinds that are reduction targets do not directly relate to each other, unlike the case of setting by the harmonic order kind number determination means 102 in the above comparative example. Therefore, it is possible to reduce harmonic voltage components for more kinds of orders than in the case of pulse number=3 shown by expression (2) or expression (3) in the comparative example.

It is noted that FIG. 9 shows the case where the weighting coefficient w(k) is set to 1 for all orders k=k1 to kj in the second function Y of expression (6) set by the harmonic reducing unit 122. Regarding these weighting coefficients w(k), for example, by setting the coefficient w(k) for a specific order to be greater, the degree of reduction of the harmonic component of this order can be made greater than those of the other orders.

For example, in a motor in which the inductance characteristics and the winding method are modified considering the efficiency to be important, a harmonic component of a specific order might appear at a high level, leading to occurrence of harmful torque ripple due to the harmonic. In such a case, by setting the weighting coefficient w(k) for this specific order to be greater than for the other orders, it is possible to obtain a switching pattern that can prevent occurrence of harmful torque ripple and can reduce the harmonics as a whole.

By using the method described above, even in the case of pulse number=1, it is possible to obtain a pulse pattern that can reduce harmonic components up to higher orders than in the comparative example using expression (4).

Figure 10:
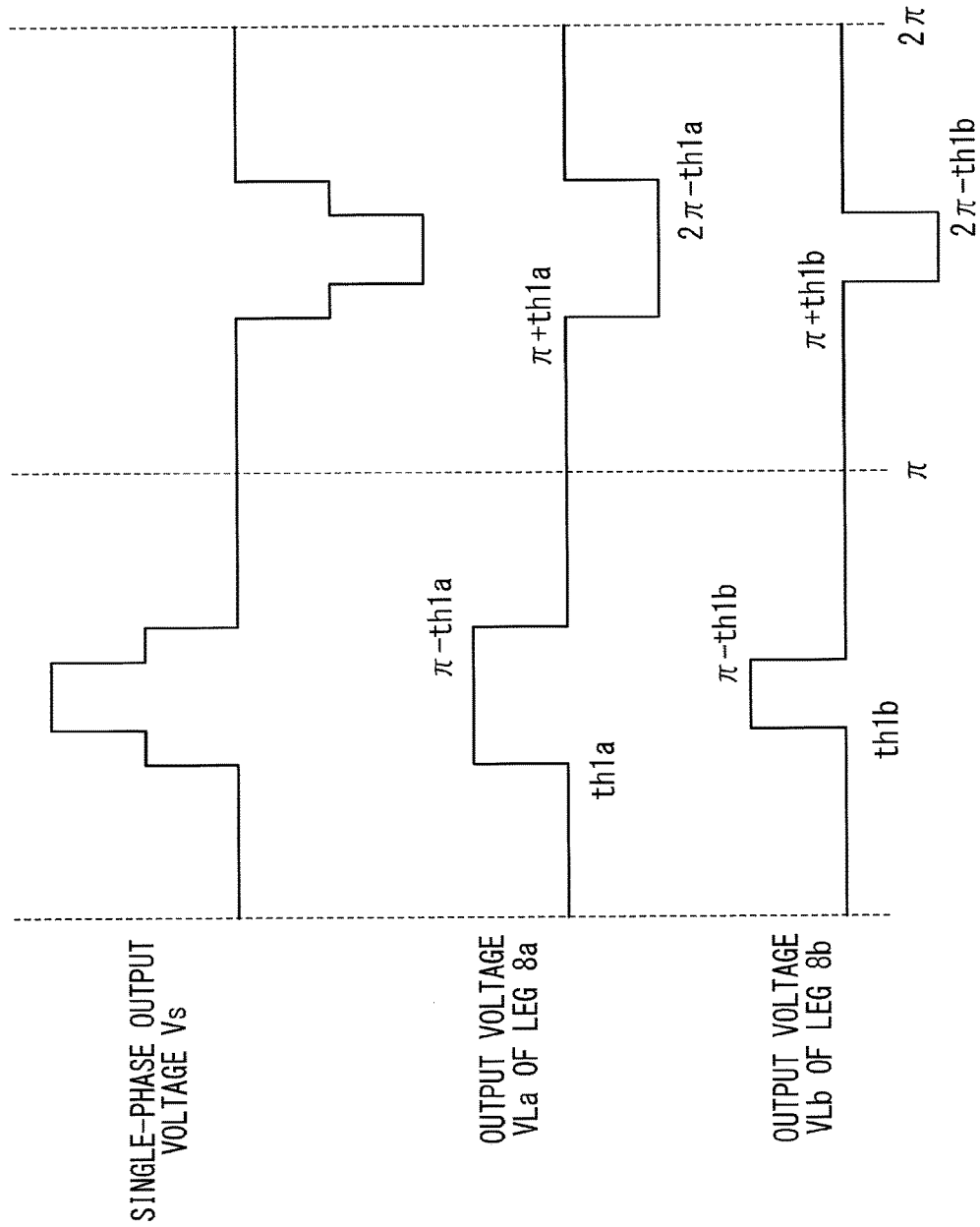
FIG. 10 is a diagram showing an example of an output voltage waveform for a single phase of the inverter controlled with a pulse number of 1, in embodiment 1 of the present invention.

FIG. 10 shows the relationship between the output voltage waveform for a single phase of the 5-level inverter 4 and the output voltage waveforms of the two switching legs 8a and 8b connected in series, in the case of pulse number Pnum=1.

FIG. 10 shows pulse voltage waveforms for one cycle ($2\pi$), and shows single-phase output voltage Vs of the 5-level inverter 4, output voltage VLa of the switching leg 8a, and output voltage VLb of the switching leg 8b. As shown in FIG. 10, by adding the output voltages VLa and VLb of the two switching legs 8a and 8b, the single-phase output voltage Vs of the 5-level inverter 4 which operates with a total pulse number=Pnum (1)×number of leg series stages (2)=2 is obtained.

As in the case of FIG. 5, since the symmetry of positive and negative waveforms needs to be compensated, as switching phases corresponding to timings of turning on or off the switching devices 6, th1a is determined for the switching leg 8a and th1b is determined for the switching leg 8b, as shown in FIG. 10. Thus, the output waveforms of the switching legs 8a and 8b and further the output voltage waveform of the 5-level inverter are determined.

That is, the switching pattern is to specify these two switching phases th1a and th1b and the output voltage waveform of the inverter 4 is to be specified by the switching pattern.

In the case of pulse number Pnum=1, as in expression (5), expression (6), and expression (7) for the case of pulse number Pnum=3, expression (9), expression (10), and expression (11) are defined by the modulation rate ensuring unit 121, the harmonic reducing unit 122, and the function combining unit 123, respectively.

[Mathematical 7]

Mathematical 7

$$f(th1a, th1b) = \frac{2}{\pi}(\cos th1a + \cos th1b) - m \quad (9)$$

$$Y(th1a, th1b) = \quad (10)$$

$$\sum \left\{ \frac{2}{\pi} \times \frac{1}{k}(\cos k th1a + \cos k th1b) \times w(k) \right\}^2$$

$$(k = 5, 7, 11, 13)$$

$$X(th1a, th1b, \alpha) = Y(th1a, th1b) + \alpha \times f(th1a, th1b) \quad (11)$$

The modulation rate ensuring unit 121 defines, by expression (9), a first function f(thi) which prescribes the relationship between each switching phase (th1a, th1b, hereinafter, may be referred to as thi) and the modulation rate m and which has each switching phase thi as a variable.

The harmonic reducing unit 122 defines, by expression (10), a second function Y(thi) which prescribes the relationship between each switching phase thi and the sum of squares of values obtained by multiplying a harmonic voltage component of each order in the output waveform of the inverter 4 by the weighting coefficient w(k) of each order, and which has each switching phase thi as a variable.

Here, four kinds of orders, i.e., k=5, 7, 11, 13 are reduction targets, but the reduction targets are not limited thereto.

The function combining unit 123 defines, by expression (11), an evaluation function X(thi, α) which is the sum of the second function Y(thi) shown by expression (10) and a value obtained by multiplying the first function f(thi) shown by expression (9) by a weighting variable α as an additional variable, and which has each switching phase thi and the weighting variable α as variables.

Then, simultaneous equations with three unknowns as shown by expression (12) are created in which partial derivatives of the evaluation function X(thi, α) with respect to three variables α, th1a, and th1b are all set at zero. Then, by solving the simultaneous equations with three unknowns, it is possible to obtain a switching pattern that ensures a required modulation rate m and minimizes the overall value of harmonic voltage components of, here, four kinds of orders.

[Mathematical 8]

Mathematical 8

$$\left.\begin{array}{l}\frac{\partial X}{\partial \alpha} = 0 \\ \frac{\partial X}{\partial thi} = 0 \\ (i = 1a, 1b)\end{array}\right\} \quad (12)$$

Figure 11:
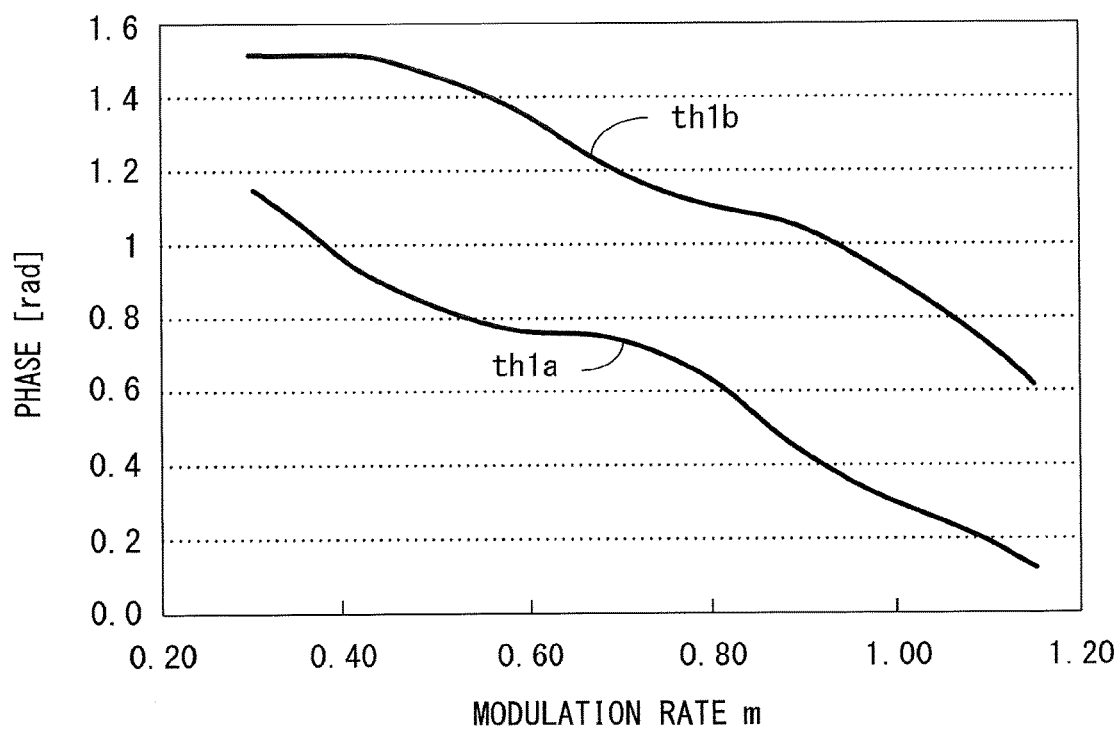
FIG. 11 is a diagram showing an example of a switching pattern in the case of applying a pulse number of 1, in embodiment 1 of the present invention.

FIG. 11 is a diagram showing the characteristics of the switching phase th1a for the switching leg 8a and the switching phase th1b for the switching leg 8b, calculated over a range of modulation rates m from 0.3 to 1.15 by the above expression (12). The switching phases th1a and th1b smoothly vary in accordance with the modulation rate m.

Figure 12:
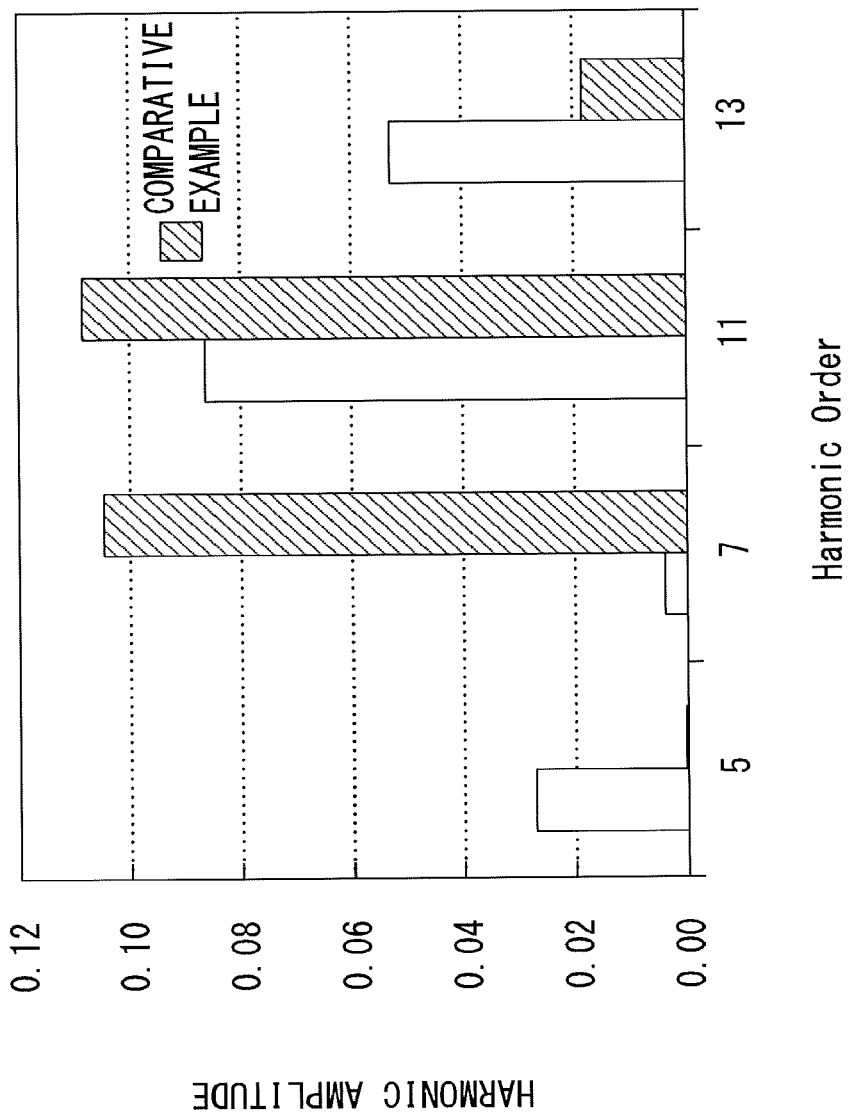
FIG. 12 is a diagram showing comparison of harmonic components of fifth to thirteenth orders between the case of embodiment 1 of the present invention and the case of the low-order harmonic eliminating PWM control method in the comparative example, under the condition that the number of pulses is 1 and the modulation rate is 0.78.

FIG. 12 shows comparison of harmonic components of fifth to thirteenth orders, between output voltage of the inverter 4 at the modulation rate m=0.78, obtained through calculation using expression (12) in the present embodiment, and output voltage at the same modulation rate m=0.78, obtained through calculation using expression (4) in the above comparative example, in the case of pulse number Pnum=1.

In the low-order harmonic eliminating PWM method in the comparative example indicated by oblique hatching, harmonic components other than a fifth-order harmonic component to be reduced, in particular, seventh-order and eleventh-order harmonic components are both high. In contrast, in the case of expression (12) in the present embodiment indicated without hatching, harmonic components of respective orders are low as a whole. It is found that the sum of the harmonic amplitudes is reduced and harmonic components of which the number of order kinds is equal to or greater than (Pnum×number of leg series stages) can be suppressed.

A voltage overall distortion rate, which is a value obtained by dividing the square root of the sum of squares of harmonic voltage components of respective orders by a reference wave voltage component, serves as a criterion for a harmonic containing rate. If the distortion rate is calculated for the fifth to thirteenth harmonic components, it can be confirmed that, in the case of comparative example, the distortion rate is 25%, whereas in the present embodiment, the distortion rate is 17%, and thus the distortion rate can be reduced by a rate of about ⅓.

As described above, the switching pattern determination unit 12 of the power conversion device 2 in embodiment 1 of the present invention includes the modulation rate ensuring unit 121, the harmonic reducing unit 122, and the function combining unit 123 as described above in detail, and further includes the switching phase calculation unit 124 and the switching pattern storage unit 125.

The modulation rate ensuring unit 121 sets the first function f(thi) which is a function for ensuring the modulation rate and which associates the fundamental wave component of the output waveform of the inverter 4 with the modulation rate and has each switching phase thi as a variable. The harmonic reducing unit 122 sets the second function Y(thi) which is a function for reducing a harmonic component in the output waveform of the inverter 4 and which is the addition value of harmonic elements of respective orders determined by the harmonic components of respective orders of the output waveform of the inverter 4, and has each switching phase thi as a variable. The function combining unit 123 sets the evaluation function X(thi, α)=Y(thi)+α×f(thi) as a third function which is formed from the first function f(thi), the second function Y(thi), and the additional variable α and has each switching phase thi and the additional variable α as variables. Further, simultaneous equations in which partial derivatives of the evaluation function X(thi, α) with respect to each switching phase thi and the additional variable α are all set at zero, are solved to minimize the evaluation function X(thi, α). Thus, the switching phase calculation unit 124 can calculate the switching phases thi that ensure the modulation rate and reduce the addition value of the harmonic elements of respective orders, and the switching pattern storage unit 125 stores, for each modulation rate and for each pulse number, a switching pattern specified by the calculated switching phases thi. Therefore, the number of order kinds of harmonics to be reduced is not directly limited by the number of pulses. Therefore, even with a comparatively small number of pulses, it is possible to reduce, in output voltage, harmonic voltage components or harmonic current components of which the number of order kinds is equal to or greater than the total pulse number.

Embodiment 2

Next, a power conversion device in embodiment 2 of the present invention will be described. The entire configuration of the power conversion device 2 is the same as that shown in FIG. 1 and FIG. 2 in the above embodiment 1, but in this case, the internal configuration of the switching pattern determination unit is different.

Figure 13:
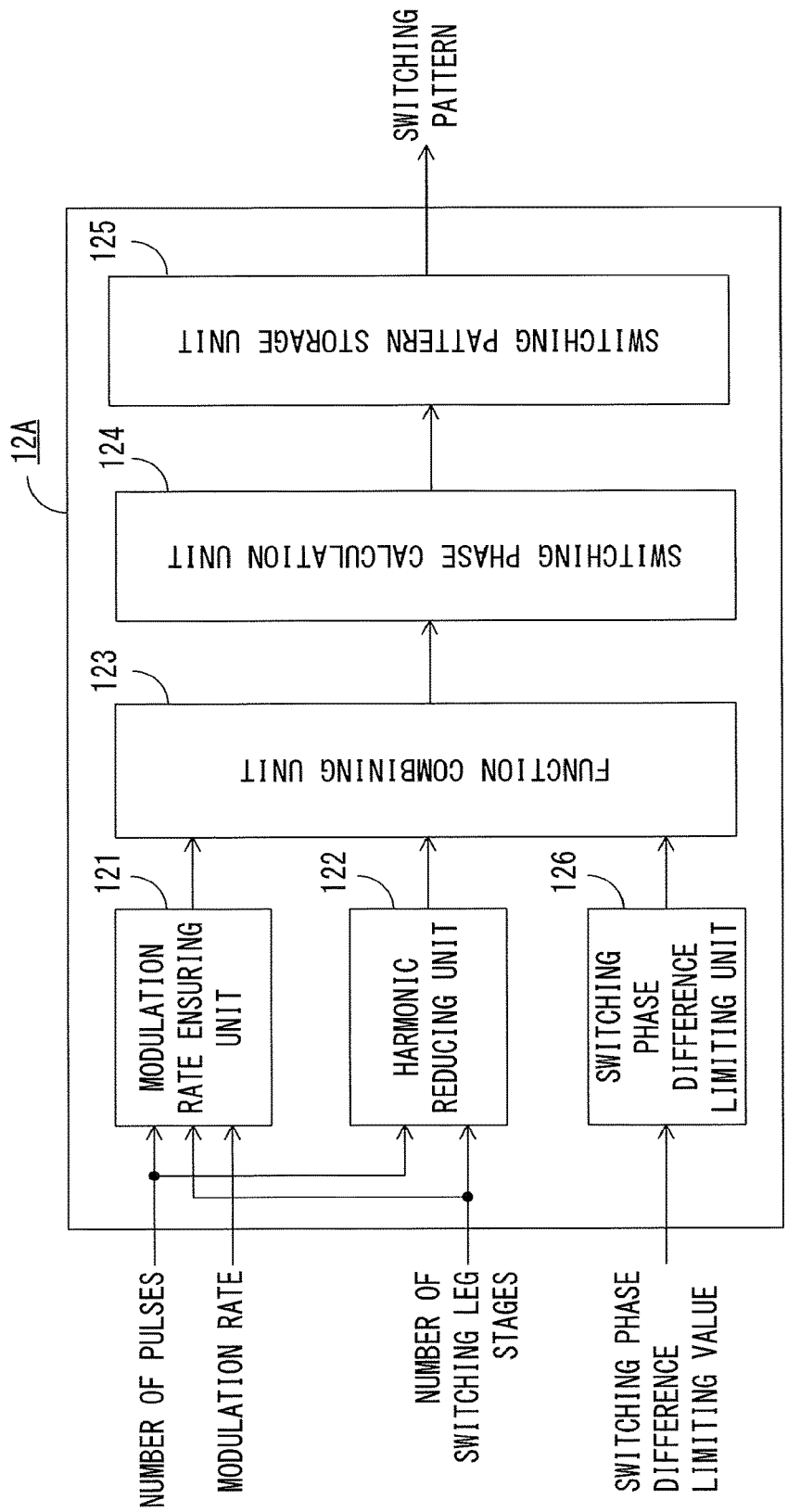
FIG. 13 is a diagram showing the internal configuration of a switching pattern determination unit in embodiment 2 of the present invention.

FIG. 13 is a diagram showing the internal configuration of a switching pattern determination unit 12A in the present embodiment 2.

In the above comparative example, as described in FIG. 7, there is a problem that, in the region marea around the modulation rate m1 in the switching patterns calculated over a predetermined range of modulation rates m, partially, the phase difference between the adjacent switching phases th1$a$ and th2$a$ of the same switching device is smaller than a lower limit phase difference thlim that is tolerable in the switching device (see FIG. 7(A)). As described above, a measure therefor in the comparative example is to employ solutions of simultaneous equations shown by expression (3) instead of expression (2), for the region marea including the modulation rate m1.

On the other hand, in the characteristics of the switching patterns calculated in the above embodiment 1 (see FIG. 9), any of the phase differences between the adjacent switching phases is equal to or greater than the lower limit phase difference thlim, and thus the above problem does not arise. However, it is considered that, depending on the calculation condition, the above problem can arise even in the above embodiment 1. Therefore, the present embodiment 2 is to achieve a measure for such a case.

Here, the description will be given under the assumption that, in the switching pattern calculated by the method described in the above expressions (5) to (8) in the case of pulse number Pnum=3, the phase difference between the adjacent switching phases th1$a$ and th2$a$ becomes smaller than the lower limit phase difference thlim.

The switching pattern determination unit 12A shown in FIG. 13 is different from the switching pattern determination unit 12 shown in FIG. 6 in the above embodiment 1 in that a switching phase difference limiting unit 126 is newly provided. Hereinafter, this point will be mainly described. The other configuration is the same as in the above embodiment 1.

The switching phase difference limiting unit 126 newly sets a function P prescribing the phase difference between the adjacent switching phases th1$a$ and th2$a$, in order to set a lower limit value (thlim) of the switching phase difference.

Specifically, the function P(th1$a$, th2$a$) is defined by expression (13).

[Mathematical 9]

Mathematical 9

$$P(th1a, th2a) = th2a - th1a - th\,lim \quad (13)$$

The function P is reflected in expression (14) and expression (15) described later which are respectively defined by the function combining unit 123 and the switching phase calculation unit 124, thereby ensuring that the phase difference between the switching phases th1$a$ and th2$a$ is equal to or greater than the lower limit phase difference thlim.

Further, the evaluation function X(thi, α) shown by the above expression (7) is replaced with an evaluation function X(thi, α, β) shown by the following expression (14). The function f(thi) and the function Y(thi) are the same as in the above embodiment 1.

[Mathematical 10]

$$X(th1a, th2a, th3a, th1b, th2b, th3b, \alpha, \beta) = \\ Y(th1a, th2a, th3a, th1b, th2b, th3b) + \\ \alpha \times f(th1a, th2a, th3a, th1b, th2b, th3b) + \\ \beta \times P(th1a, th2a) \quad (14)$$

In this expression (14), a term obtained by multiplying the function P by a weighting variable β is added to the right-hand side of the above expression (7).

For the modulation rate m1 in the region marea, simultaneous equations with eight unknowns shown by expression (15) are set in which partial derivatives of the evaluation function X with respect to a total of eight variables α, β, th1a to th3b are set at zero or at zero or greater.

[Mathematical 11]

$$\left. \begin{array}{l} \frac{\partial X}{\partial \alpha} = 0 \\ \frac{\partial X}{\partial \beta} \geq 0 \\ \frac{\partial X}{\partial thi} = 0 \end{array} \right\} \quad (15)$$
$$(i = 1a, 2a, 3a, 1b, 2b, 3b)$$

By solving the expression (15), it is possible to obtain a switching pattern that ensures a required modulation rate m1 and a necessary phase difference thlim between the adjacent switching phases and minimizes the overall value of harmonic voltage components of many orders.

Thus, for a modulation rate outside the region marea, as in the above embodiment 1, the switching pattern determination unit 12A stores the switching pattern calculated by the above expression (8), and for a modulation rate in the region marea, the switching pattern determination unit 12A stores the switching pattern calculated by expression (15) in place of the switching pattern calculated by the above expression (8).

It is noted that the continuity between the characteristics of the switching phases calculated by the above expression (8) and the switching phases calculated by expression (15) for the modulation rate in the region marea can be ensured by adjusting the weighting variable β as appropriate.

Also in the present embodiment 2, as in the above embodiment 1, the number of order kinds of harmonics to be reduced is not directly limited by the number of pulses. Therefore, even with a comparatively small number of pulses, it is possible to reduce, in output voltage, harmonic voltage components or harmonic current components of which the number of order kinds is equal to or greater than the total pulse number.

In addition, the switching pattern determination unit 12A includes the switching phase difference limiting unit 126, and therefore, in the case where, in some of the calculated switching patterns, the phase difference between the adjacent switching phases is smaller than the lower limit phase difference to cause a problem in the switching operation of the switching device 6, the following measure can be taken. That is, a function P(thi) for ensuring the lower limit phase difference for the above phase difference is set by the switching phase difference limiting unit 126, and then the evaluation function X(thi, α, β)=Y(thi)+α×f(thi)+β×P(thi), in which the function P(thi) is considered, is set. Then, the switching phase calculation unit 124 solves simultaneous equations in which partial derivatives of the evaluation function X(thi, α, β) with respect to each switching phase thi and the additional variables α and β are set at zero or at zero or greater, thereby calculating a switching pattern, and this switching pattern is used in placed of the above some switching patterns. Thus, a necessary phase difference thlim between the adjacent switching phases is ensured, thereby preventing the problem in the switching operation.

Embodiment 3

Next, a power conversion device in embodiment 3 of the present invention will be described. The entire configuration of the power conversion device 2 is the same as that shown in FIG. 1 and FIG. 2 in the above embodiment 1. In this case, the first function set by the modulation rate ensuring unit 121 in the switching pattern determination unit 12 is different from that in the above embodiment 1. The other configuration is the same as in the above embodiment 1.

In the above embodiment 1, as the first function prescribing the relationship between each switching phase and the modulation rate, the function f for ensuring the modulation rate obtained by connecting the switching legs 8a and 8b in series is defined by expression (5). In the present embodiment 3, in order to equalize the burdens of the switching legs 8a and 8b, a switching pattern is calculated with the condition that the modulation rate to be outputted is equal between the switching legs 8a and 8b. The summary thereof will be described below.

First, as shown by expression (16) and expression (17), for the respective switching legs 8a and 8b, a function fa(th1a, th2a, th3a) and a function fb(th1b, th2b, th3b) are defined as the first function prescribing the relationship between each switching phase and the modulation rate. In this case, in order to equalize the burdens on the switching legs 8a and 8b, the function fa and the function fb are set so that the modulation rate m to be outputted is equally allocated between the switching legs 8a and 8b.

[Mathematical 12]

$$fa(th1a, th2a, th3a) = \\ \frac{2}{\pi}(\cos th1a - \cos th2a + \cos th3a) - m/2 \quad (16)$$

$$fb(th1b, th2b, th3b) = \\ \frac{2}{\pi}(\cos th1b - \cos th2b + \cos th3b) - m/2 \quad (17)$$

In response, instead of the evaluation function X shown by expression (7) in the above embodiment 1, an evaluation function X(thi, α1, α2) shown by expression (18) is defined as the third function. It is noted that the function Y(thi) is the same as in the above embodiment 1, and the functions Y(thi) defined by the above expression (6) and expression (10) are used.

[Mathematical 13]

Mathematical 13

$$X(th1a,th2a,th3a,th1b,th2b,th3b,\alpha1,\alpha2) = Y(th1a,th2a,th3a,th1b,th2b,th3b) + \alpha1 \times fa(th1a,th2a,th3a) + \alpha2 \times fb(th1b,th2b,th3b) \quad (18)$$

Then, simultaneous equations with eight unknowns shown by expression (19) are solved in which partial derivatives of the evaluation function X(thi, α1, α2) with respect to eight variables α1, α2, th1a to th3b are all set at zero as shown by expression (19). Thus, it is possible to obtain a switching pattern that ensures a required modulation rate m, equalizes the burdens on the switching legs 8a and 8b, and minimizes the overall value of the harmonic voltage components of many orders.

[Mathematical 14]

Mathematical 14

$$\left. \begin{array}{l} \frac{\partial X}{\partial \alpha 1} = 0 \\ \frac{\partial X}{\partial \alpha 2} = 0 \\ \frac{\partial X}{\partial thi} = 0 \\ (i = 1a, 2a, 3a, 1b, 2b, 3b) \end{array} \right\} \quad (19)$$

Also in embodiment 3, as in the above embodiment 1, the number of order kinds of harmonics to be reduced is not directly limited by the number of pulses. Therefore, even with a comparatively small number of pulses, it is possible to reduce, in output voltage, harmonic voltage components or harmonic current components of which the number of order kinds is equal to or greater than the total pulse number. Further, the switching pattern can be determined so that the modulation rate to be outputted is equal between the switching legs 8a and 8b, whereby burdens on the switching legs 8a and 8b can be equalized.

The functions Y(thi) defined by the above expression (6) and expression (10) are both intended to reduce the sum of squares of harmonic voltage components. However, in the case where the load is the motor 3, increase in copper loss of the motor 3 due to presence of harmonic components can become a problem, and in this case, it is necessary to reduce harmonic current components.

Current flowing through the motor 3 has a value obtained by dividing the voltage by the impedance. The impedance Z is approximately determined by the inductance L of the motor 3. That is, Z≈2πfL is satisfied, and the current is inversely proportional to the frequency f.

Accordingly, in the case where the harmonic current components are to be reduced, instead of the functions Y(thi) defined by the above expression (6) and expression (10), for example, a function Y1(thi) shown by the following expression (20) in which, as harmonic elements of respective orders, components of respective orders are further multiplied by 1/k, is defined as the second function.

[Mathematical 15]

Mathematical 15

$$Y1(th1a, th2a, th3a, th1b, th2b, th3b) = \sum \left\{ \frac{2}{\pi} \times \frac{1}{k} \times \frac{1}{k} (\cos kth1a - \cos kth2a + \cos kth3a + \cos kth1b - \cos kth2b + \cos kth3b) \times w(k) \right\}^2 \quad (20)$$

$(k = 5, 7, 11, 13)$

The way of calculating the switching pattern by applying the function Y1(thi) is completely the same as in the case of applying the aforementioned function Y(thi), and therefore the description thereof is not repeated.

At this time, the second function Y1(thi) is set by summing squares of current harmonics of respective orders while changing the weighting coefficient w(k) depending on each order so as to reduce the total harmonic loss in the inverter 4 and the motor connected to the inverter 4. Thus, it is possible to reduce the total harmonic loss in the inverter 4 and the motor 3 connected to the inverter 4.

Further, although specific expressions are not described, as the harmonic elements of respective orders, multiplication values of harmonic voltage components of respective orders and harmonic current components of respective orders may be used, and then the addition value of these multiplication values for respective orders may be used as the second function Y(thi), to obtain switching phases. In this case, it is possible to reduce the sum of harmonic power components of respective orders.

It is noted that the second function Y1(thi) can be applied not only in the above embodiment 3 but also in the above embodiments 1 and 2, and also in such a case, the same effect can be obtained.

Embodiment 4

Next, a power conversion device in embodiment 4 of the present invention will be described. The entire configuration of the power conversion device 2 is the same as that shown in FIG. 1 and FIG. 2 in the above embodiment 1. In this case, the internal configuration of the gate signal generation unit is different from that in the above embodiment 1.

Figure 14:
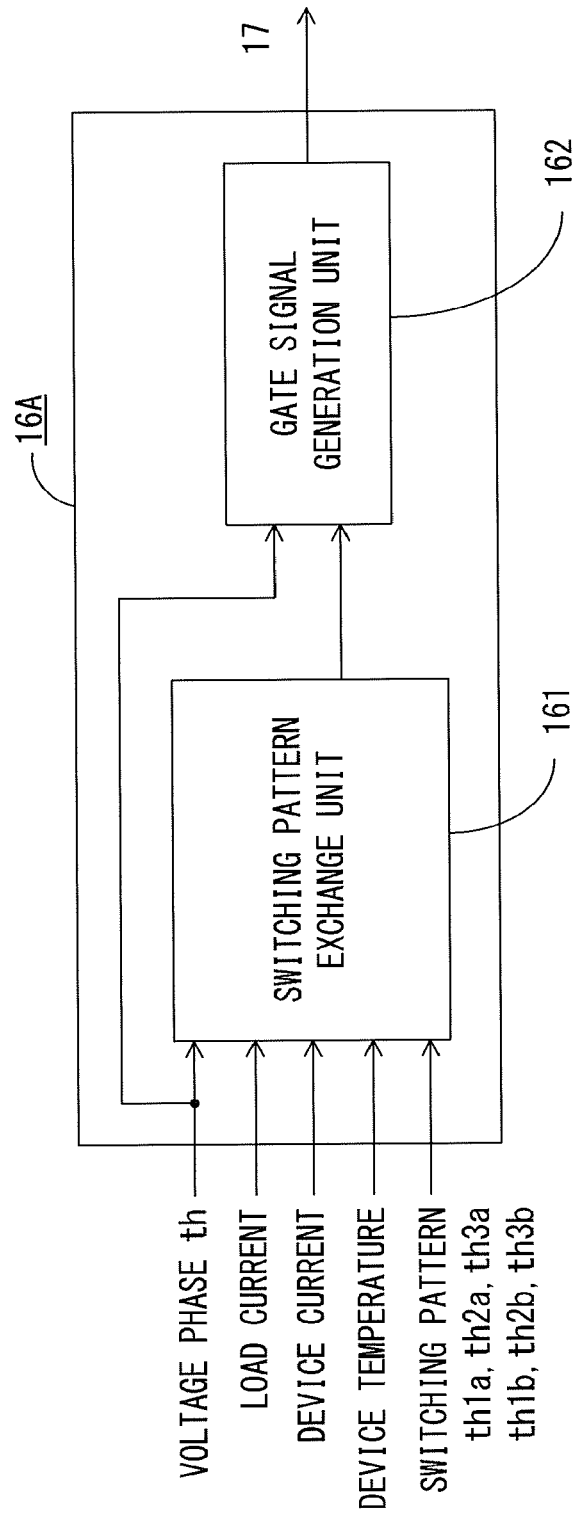
FIG. 14 is a diagram showing the internal configuration of a gate signal generation unit in embodiment 4 of the present invention.

FIG. 14 is a diagram showing the internal configuration of a gate signal generation unit 16A in the present embodiment 4. The other configuration is the same as in the above embodiment 1.

As in the above embodiment 1, the gate signal generation unit 16A reads, from the switching pattern determination unit 12, a switching pattern corresponding to the modulation rate m from the modulation rate calculator 11 and the pulse number Pnum from the pulse number determination unit 13, and generates the gate signal 17 for ON/OFF driving each switching device 6, on the basis of the switching pattern.

For example, in the case of pulse number Pnum=3, as shown in the above switching pattern in FIG. 9, at any of the modulation rates, the switching phases (th1a, th2a, th3a, and th1b, th2b, th3b) for the two switching legs 8a and 8b are different from each other. Therefore, if the switching leg 8a continues switching operation using only the switching pattern for the switching leg 8a (hereinafter, referred to as a leg-a switching pattern), and the switching leg 8b continues switching operation using only the switching pattern for switching leg 8b (hereinafter, referred to as a leg-b switching pattern), loads on the switching devices become uneven because their ON/OFF periods and the flowing currents are different depending on the load current or each switching phase, and thus partial deterioration among the switching devices and variations in switching operations are likely to occur.

In the present embodiment 4, as shown in FIG. 14, the gate signal generation unit 16A includes a switching pattern exchange unit 161 and a gate signal generation unit 162.

The switching pattern exchange unit 161 exchanges the switching patterns between the switching legs 8a and 8b with a predetermined cycle, on the basis of the output voltage phase th, load current, device current, and further, device temperature, so that the burdens on the two switching legs 8a and 8b are equalized. The gate signal generation unit 162 generates the gate signal 17 on the basis of the switching patterns exchanged by the switching pattern exchange unit 161.

Here, the case where two switching legs 8a and 8b are connected in series will be described. However, also in the case where three or more switching legs are connected in series, it is possible to equalize the burdens on these switching legs connected in series by applying the same method.

Figure 15:
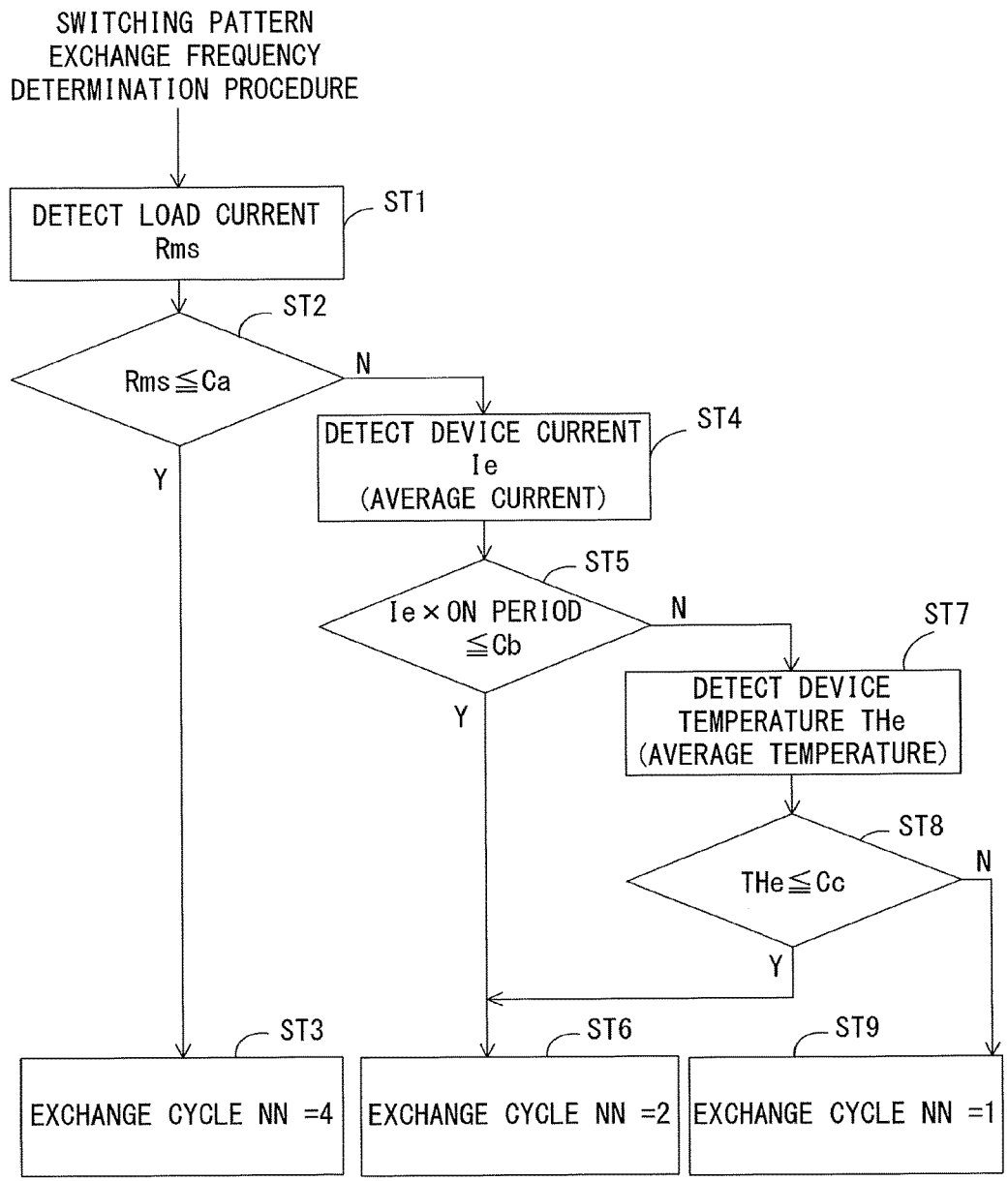
FIG. 15 is a diagram showing a procedure for determining the frequency of exchange of switching patterns used for two switching legs of an inverter in embodiment 4 of the present invention.

FIG. 15 is a chart showing an example of a procedure for determining the frequency of exchange of switching patterns between the two switching legs 8a and 8b. Hereinafter, a flow for determining an exchange cycle NN which is the frequency of exchange of switching patterns will be described with reference to FIG. 15. It is noted that the exchange cycle NN is represented by the number of cycles in the inverter operation frequency.

First, the load current is detected by the current sensor 19, and an effective value Rms of the load current is calculated (ST1).

Next, the load current effective value Rms is compared with a determination threshold value Ca for the frequency of switching, to perform determination as to the frequency of switching on the basis of the load current (ST2).

Figure 16:
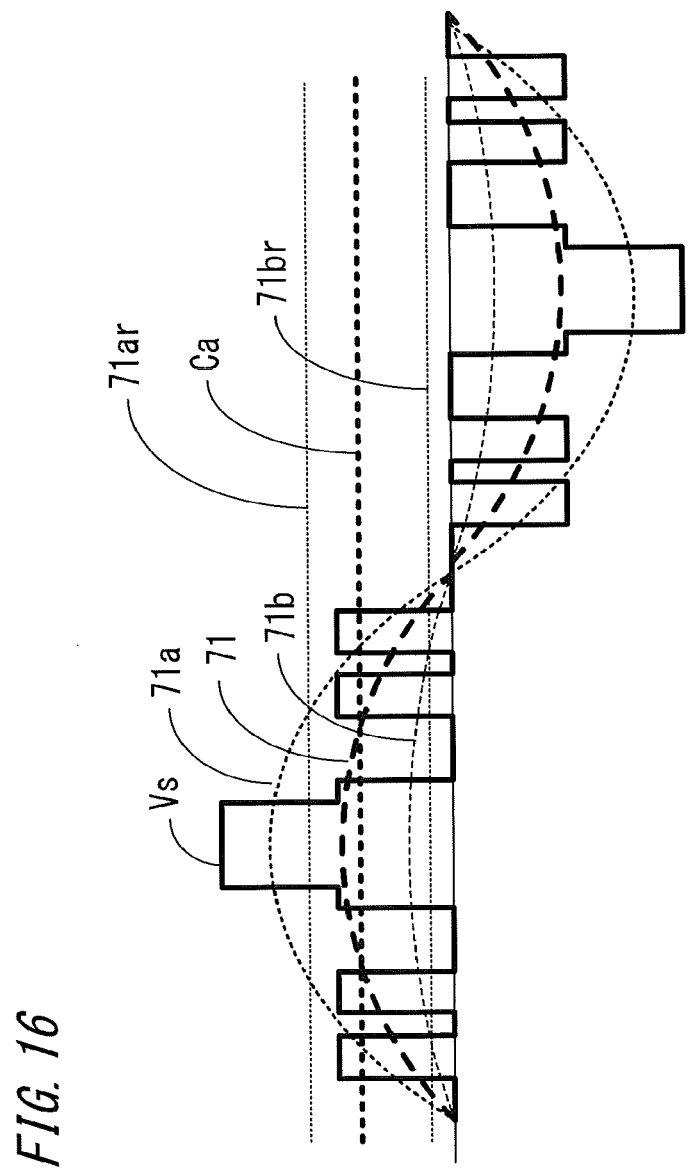
FIG. 16 is a diagram illustrating determination as to the frequency of switching, based on load current in embodiment 4 of the present invention.

FIG. 16 shows examples of the load current and output voltage Vs of the 5-level inverter 4 for a single phase in step ST2.

Waveforms 71a, 71b each indicate the load current for a single phase, a waveform 71ar indicates the current effective value (Rms) of the load current (waveform 71a), a waveform 71br indicates the current effective value (Rms) of the load current (waveform 71b), and the waveform 71 indicates a waveform obtained by converting the determination threshold value Ca for the frequency of switching into phase current.

In step ST2, if the detected load current is in a state indicated by the waveforms 71b, 71br, that is, the effective value Rms of the load current is equal to or smaller than the determination threshold value Ca, the exchange cycle NN for the switching patterns is set at 4 (four cycles in the inverter operation frequency). This means that the switching pattern exchange cycle NN is elongated to decrease the frequency of exchange (ST3).

In step ST2, if the detected load current is in a state indicated by the waveforms 71a, 71ar, that is, the effective value Rms of the load current is greater than the determination threshold value Ca, the device currents of the plurality of switching devices 6 in each of two switching legs 8a and 8b of the inverter 4 are detected by the device current/temperature sensor 18, and the average current Ie thereof is calculated (ST4).

Next, a value obtained by multiplying a switching-leg ON period and the average current Ie among the switching devices in each switching leg 8a, 8b is compared with the determination threshold value Cb set in advance in designing (ST5), and if the value is equal to or smaller than the determination threshold value Cb, the switching pattern exchange cycle NN is set at 2 (ST6).

In step ST5, if the value obtained by multiplying a switching-leg ON period and the average current Ie among the switching devices in each switching leg 8a, 8b is higher than the determination threshold value Cb, the device temperatures of the plurality of switching devices 6 in each switching leg 8a, 8b are detected by the device current/temperature sensor 18, and an average temperature THe thereof is calculated (ST7).

Next, the average temperature THe of the switching devices in each switching leg 8a, 8b is compared with a determination threshold value Cc set in advance in designing (ST8), and if the value is equal to or smaller than the determination threshold value Cc, the process proceeds to step ST6 to set the switching pattern exchange cycle NN at 2.

In step ST8, if the average temperature THe of the switching devices in each switching leg 8a, 8b is higher than the determination threshold value Cc, the switching pattern exchange cycle NN is set at 1 (ST9).

Figure 17:
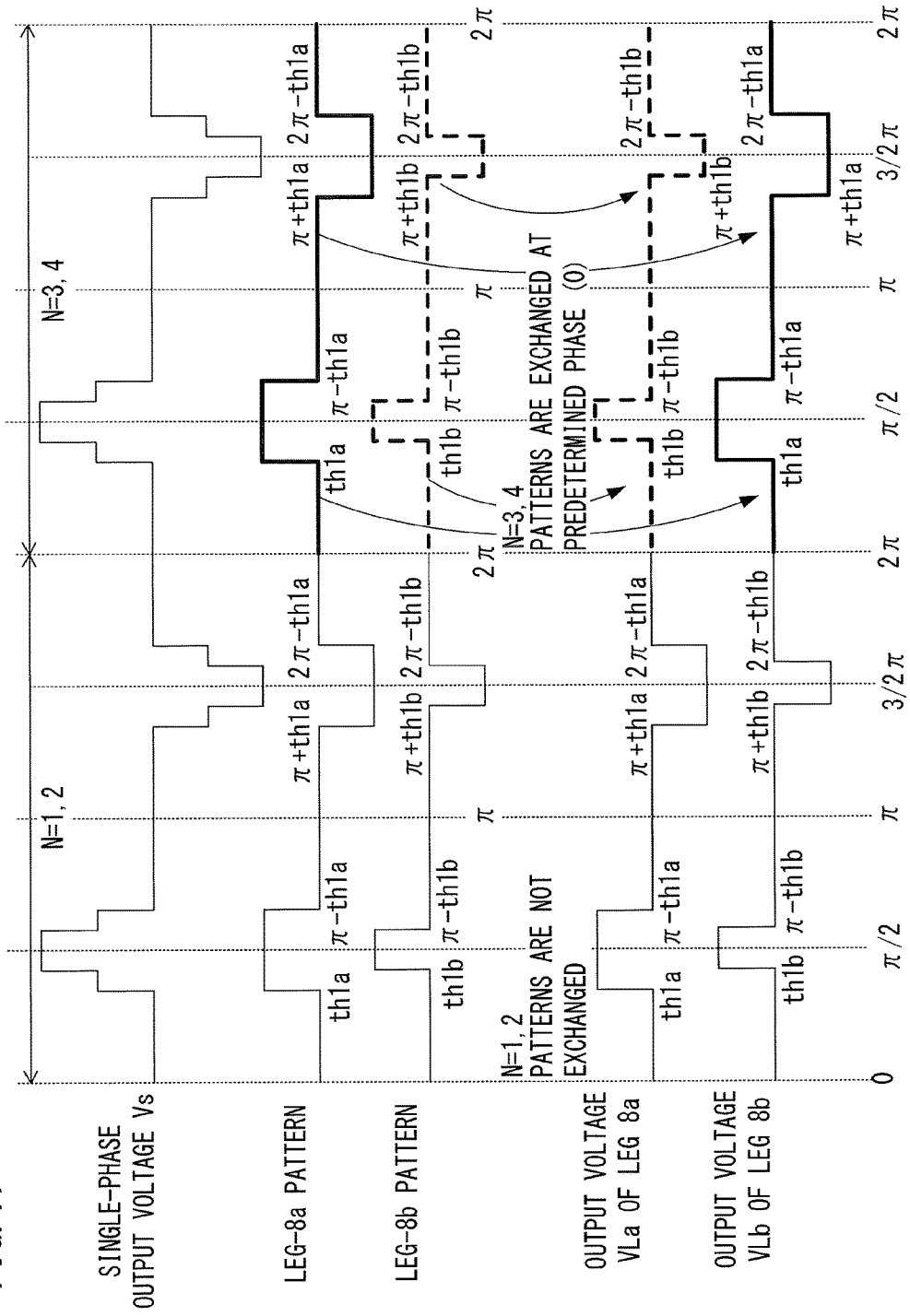
FIG. 17 is a diagram illustrating exchange of switching patterns in embodiment 4 of the present invention.

FIG. 17 is a diagram illustrating a switching pattern exchange method in the case where the switching pattern exchange cycle NN is 4, and shows switching patterns in the case where the number of pulses at which each switching leg 8a, 8b performs switching is one, with numbers N (=1 to 4) allocated to four cycles in the inverter operation frequency.

As shown in FIG. 17, in the cycles N=1, 2 of the operation frequency, the switching leg 8a performs switching using its own switching pattern, i.e., a leg-8a pattern (th1a). In the cycles N=3, 4, the switching leg 8a performs switching using a switching pattern for the switching leg 8b, i.e., a leg-8b pattern (th1b).

Similarly, also the switching leg 8b performs switching while alternately using its own leg-8b pattern and the leg-8a pattern for every two cycles. The phase at which the switching patterns are exchanged is set at zero degrees in each phase.

Figure 18:
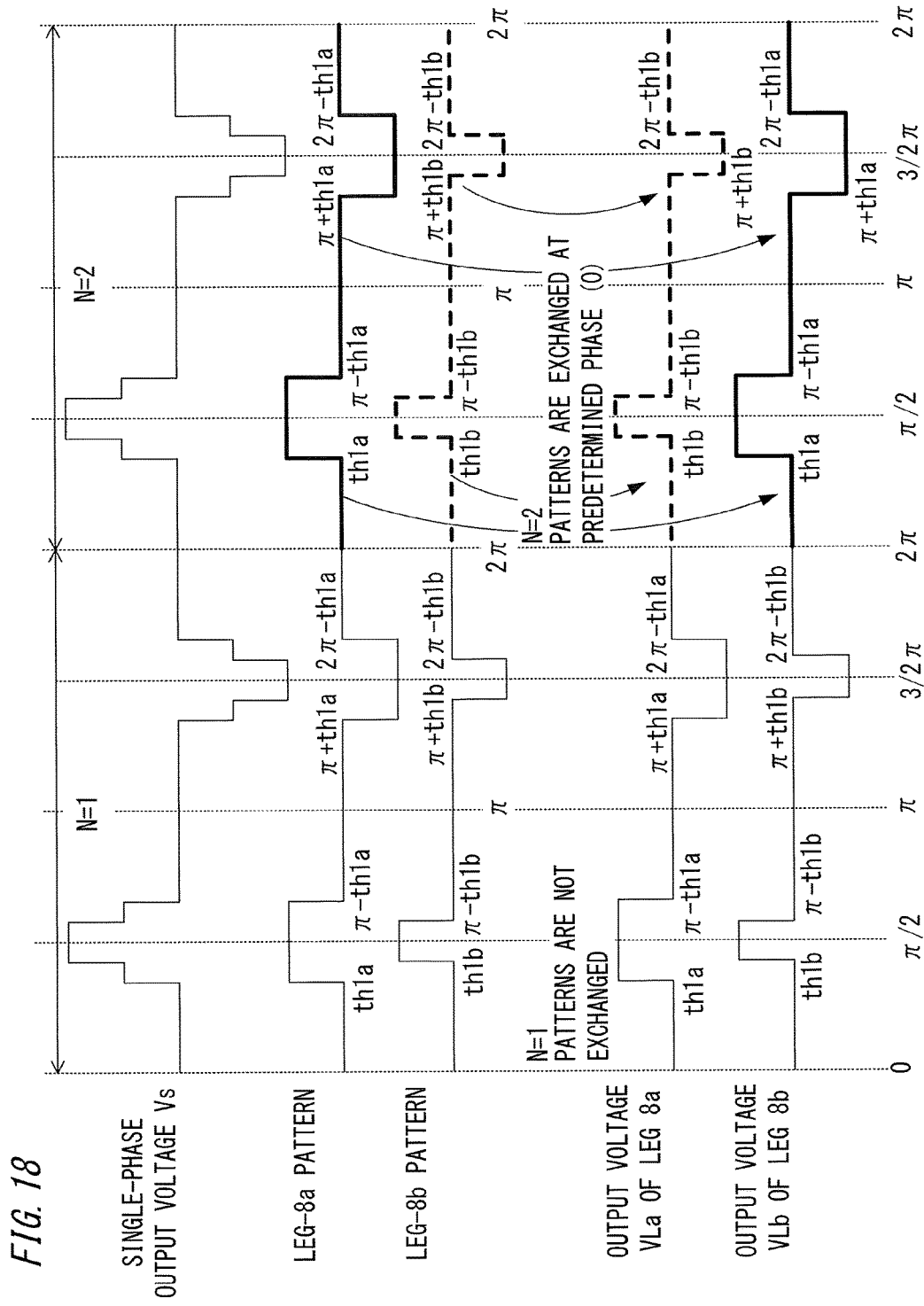
FIG. 18 is a diagram illustrating exchange of switching patterns in embodiment 4 of the present invention.

FIG. 18 is a diagram illustrating a switching pattern exchange method in the case where the switching pattern exchange cycle NN is 2. As shown in FIG. 18, each switching leg 8a, 8b performs switching while alternately using its own leg pattern and the other leg pattern for every cycle in the inverter operation frequency.

Figure 19:
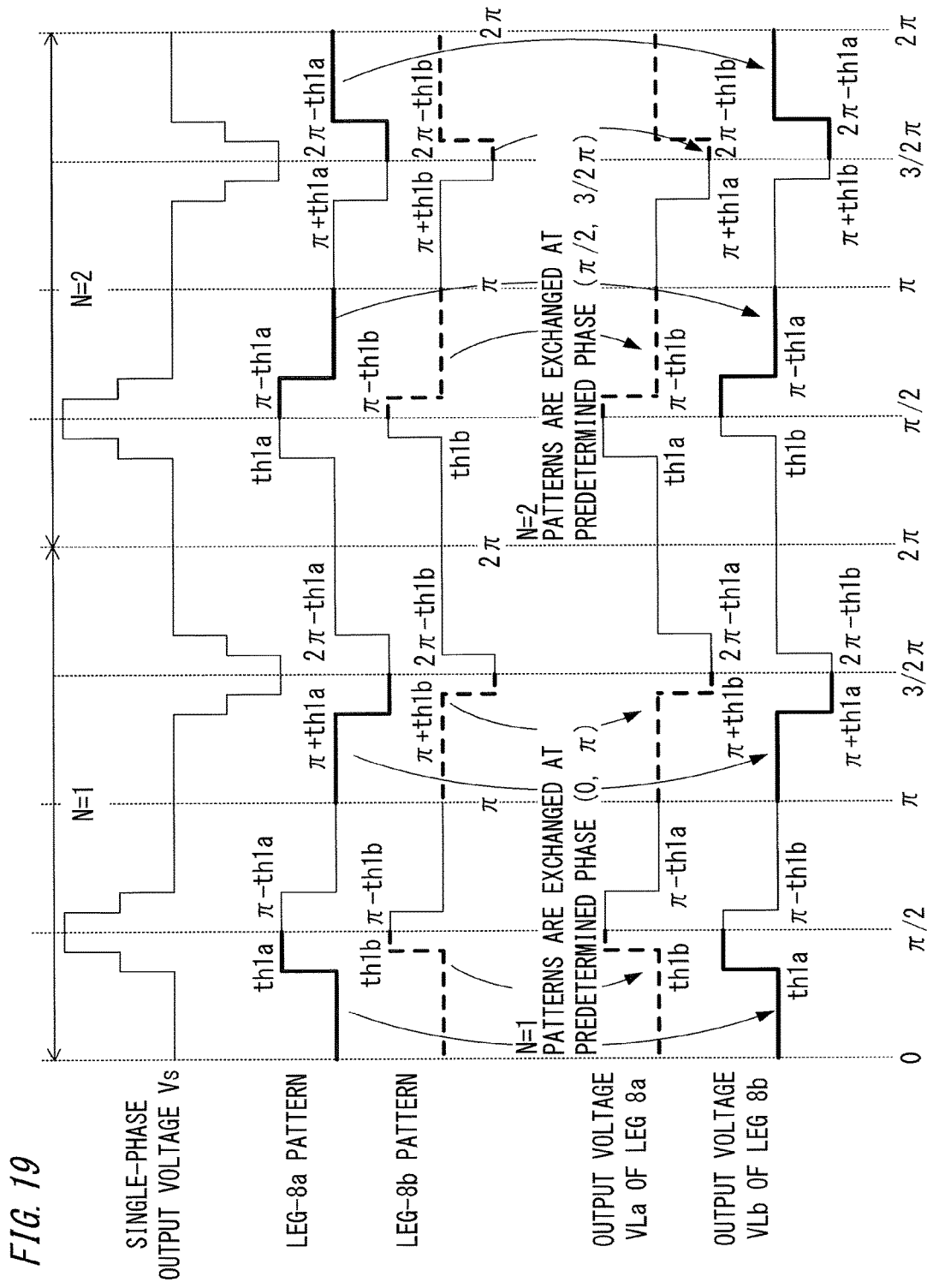
FIG. 19 is a diagram illustrating exchange of switching patterns in embodiment 4 of the present invention.

FIG. 19 is a diagram illustrating an example of a switching pattern exchange method in the case where the switching pattern exchange cycle NN is 1. As shown in FIG. 19, the switching patterns for the two switching legs 8a and 8b are exchanged in one cycle in the inverter operation frequency.

In the cycle N=1, during the period from 0 to $(1/2)\pi$ and the period from $\pi$ to $(3/2)\pi$, the switching leg 8a performs switching using the leg-8b switching pattern (th1b), and during the period from $(1/2)\pi$ to $\pi$ and the period from $(3/2)\pi$ to $2\pi$, the switching leg 8a performs switching using its own leg-8a switching pattern (th1a).

In the cycle N=2, contrary to the case of cycle N=1, during the period from $(1/2)\pi$ to $\pi$ and the period from $(3/2)\pi$ to $2\pi$, the switching leg 8a performs switching using the leg-8b switching pattern (th1b), and during the period from 0 to $(1/2)\pi$ and the period from it to $(3/2)\pi$, the switching leg 8a performs switching using its own leg-8a switching pattern (th1a).

The switching leg 8b performs switching using a switching pattern that is not used by the switching leg 8a.

In the above description using FIG. 15, the switching pattern exchange cycle is switched on the basis of the detected values of the load current, the device current, and the device temperature. However, without limitation thereto, depending on the use condition or the like of the power conversion device 2, the switching patterns may be exchanged on the basis of one or more kinds of the detected values of the load current, the device current, and the device temperature, and thus the exchange-related configuration may be simplified.

Also in the present embodiment 4, as in the above embodiment 1, the number of order kinds of harmonics to be reduced is not directly limited by the number of pulses. Therefore, even with a comparatively small number of pulses, it is possible to reduce, in output voltage, harmonic voltage components or harmonic current components of which the number of order kinds is equal to or greater than the total pulse number. Further, the gate signal generation unit 16A includes the switching pattern exchange unit 161 and the gate signal generation unit 162, and generates the gate signal 17 so as to exchange the switching patterns between the switching legs 8a and 8b with a predetermined cycle. Thus, the burdens on the switching legs 8a and 8b are equalized and accordingly, the life of the device is prolonged.

By applying the present embodiment 4 to the above embodiment 3, the switching patterns for the switching legs may be generated so that the modulation rates outputted from these switching legs become equal to each other, and then the switching patterns may be exchanged with a predetermined cycle. Thus, the burdens on the switching legs 8a and 8b can be further equalized.

Embodiment 5

Figure 20:
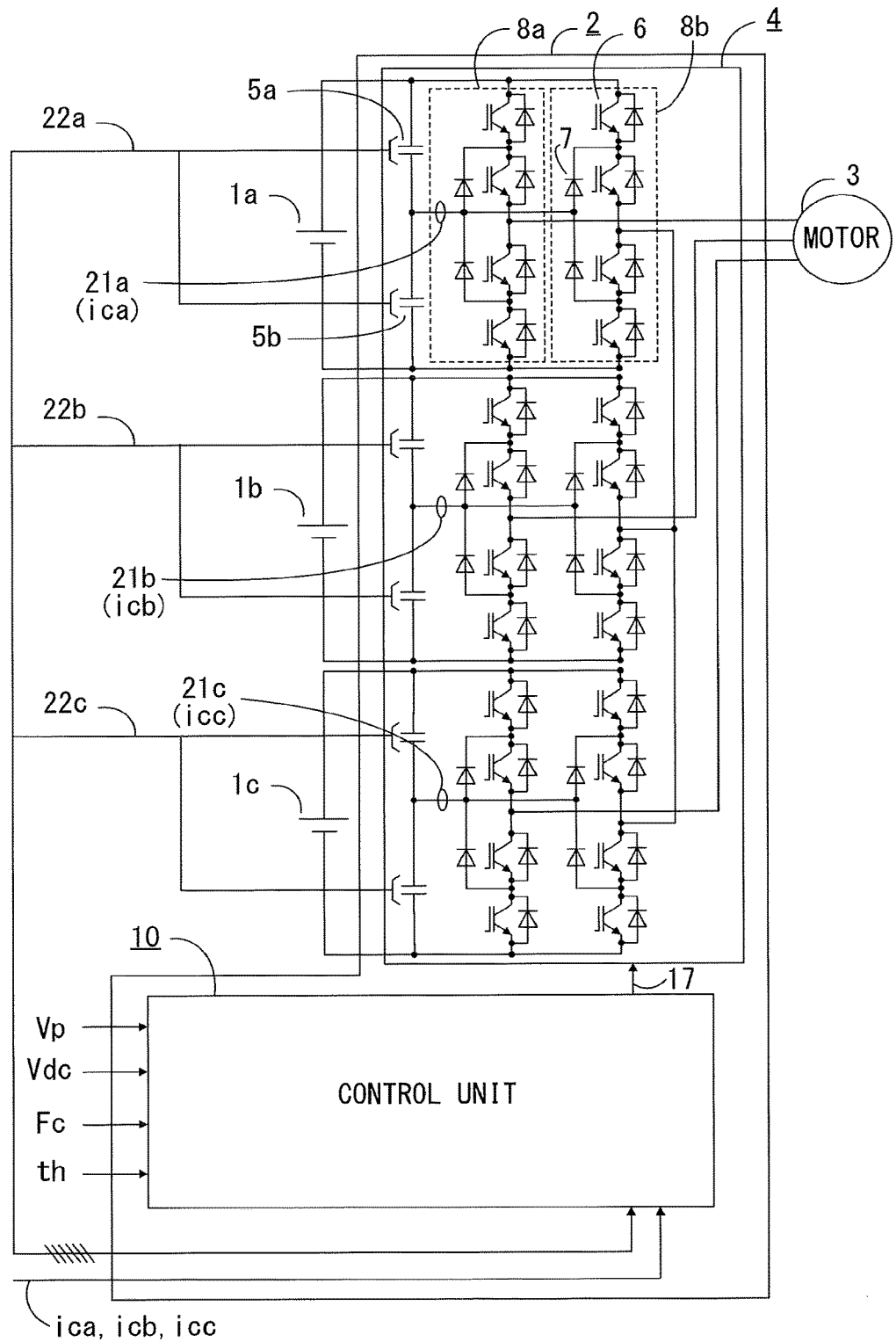
FIG. 20 is a circuit diagram showing the entire configuration of a power conversion device in embodiment 5 of the present invention.
Figure 21:
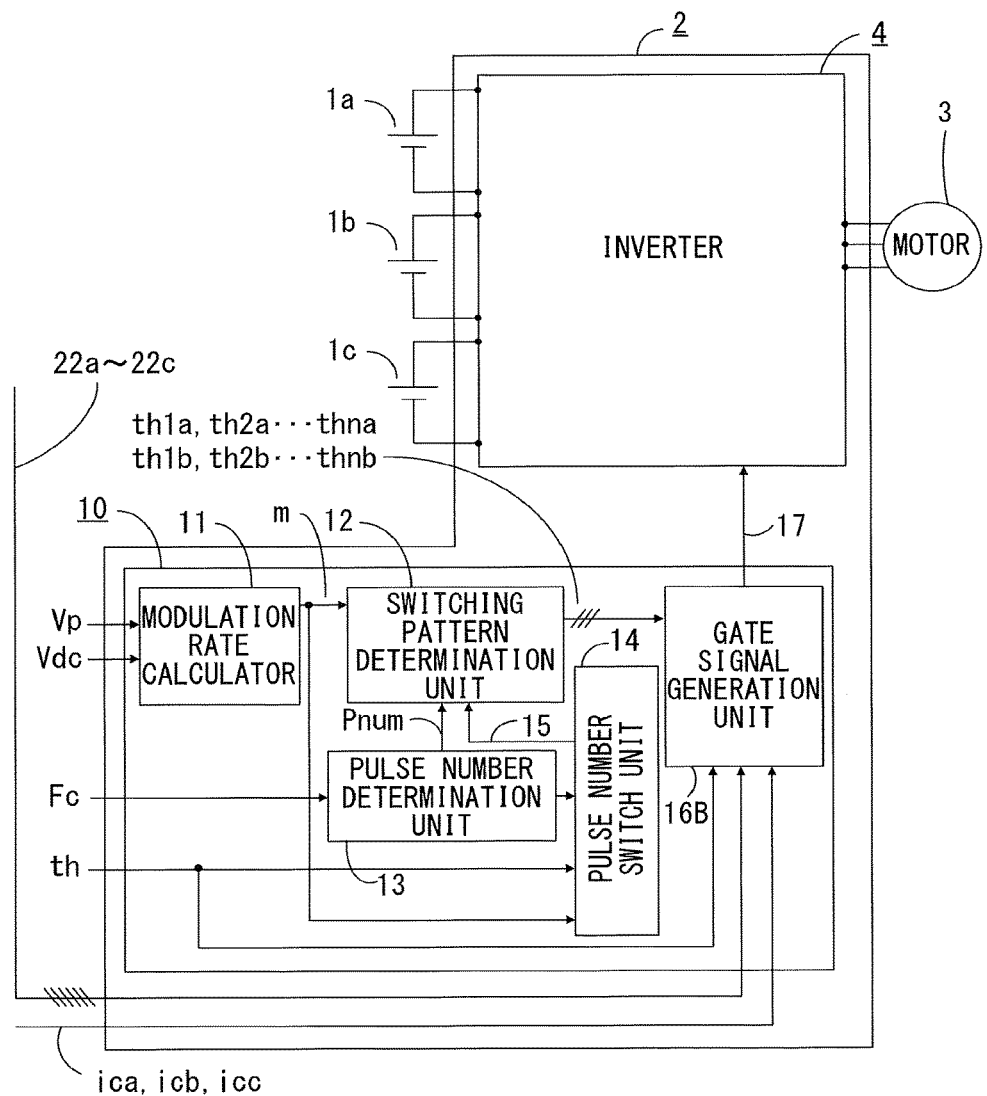
FIG. 21 is a circuit diagram showing the entire configuration the power conversion device in embodiment 5 of the present invention.

FIG. 20 and FIG. 21 are circuit diagram showing the entire configuration of a power conversion device in embodiment 5 of the present invention. In particular, FIG. 20 shows the details of the configuration of the inverter 4 which is a main circuit, and FIG. 21 shows the details of the configuration of the control unit 10. The present embodiment 5 adopts a scheme in which voltages of the positive-side capacitor 5a and the negative-side capacitor 5b which divide voltage of the DC voltage source 1 into two voltages to supply DC voltages to the switching legs 8a and 8b are equalized, thereby eliminating the difference between the positive side and the negative side of the output voltage of the inverter 4. The other configuration and operation are the same as in the above embodiment 1, and the operation relevant to reduction in harmonics is also the same.

Hereinafter, the configuration and operation relevant to the above scheme will be mainly described.

As shown in FIG. 20, the power conversion device 2 includes: neutral point voltage sensors 22a, 22b, 22c for detecting the voltage difference between each positive-side capacitor 5a and each negative-side capacitor 5b, as neutral point voltage; and neutral point current sensors 21a, 21b, 21c for detecting current ica, icb, icc flowing into the connection point between each positive-side capacitor 5a and each negative-side capacitor 5b, as neutral point current. In FIG. 20, the respective neutral point voltages are indicated by reference characters 22a, 22b, 22c of the neutral point voltage sensors.

Figure 22:
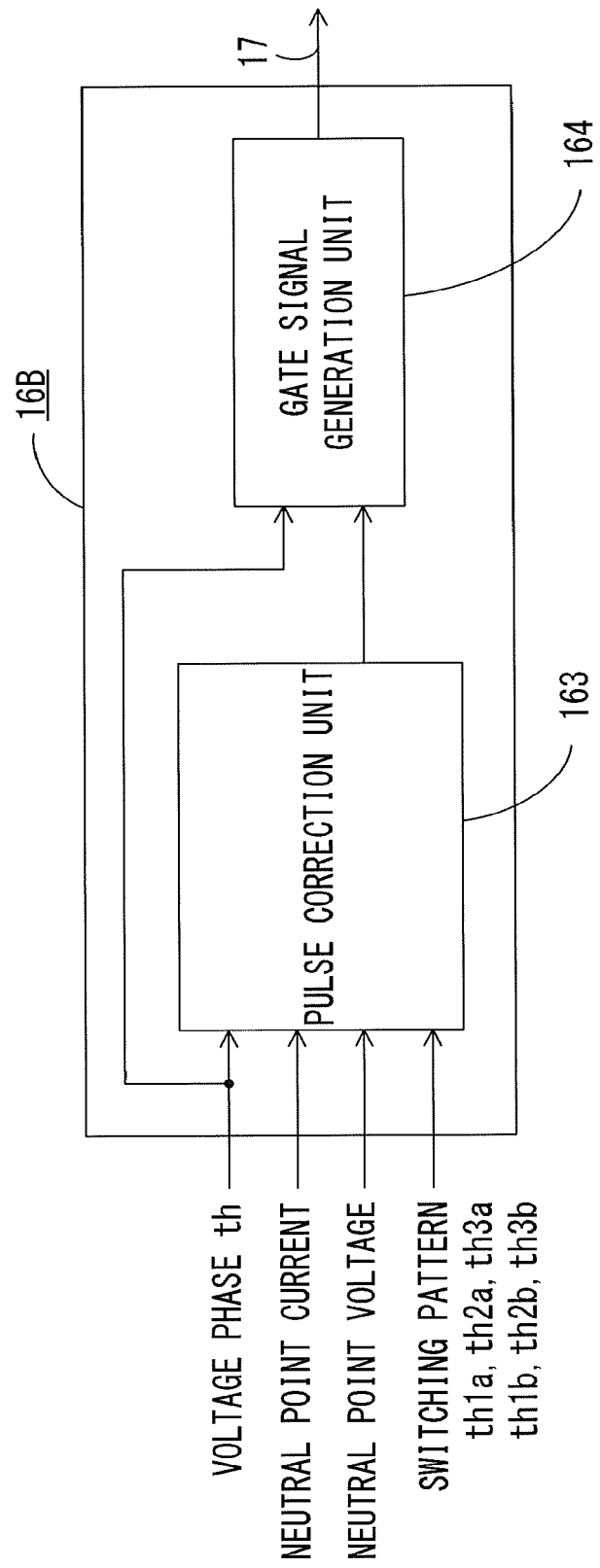
FIG. 22 is a diagram showing the internal configuration of a gate signal generation unit in embodiment 5 of the present invention.

FIG. 22 is an internal configuration diagram of a gate signal generation unit 16B. The gate signal generation unit 16B includes a pulse correction unit 163 for correcting a switching pattern, and a gate signal generation unit 164 for generating the gate signal 17 on the basis of the corrected switching pattern. The pulse correction unit 163 corrects a switching pattern read from the switching pattern determination unit 12, in accordance with the detection outputs of the neutral point voltage sensors 22a, 22b, 22c and the neutral point current sensors 21a, 21b, 21c.

Figure 23:
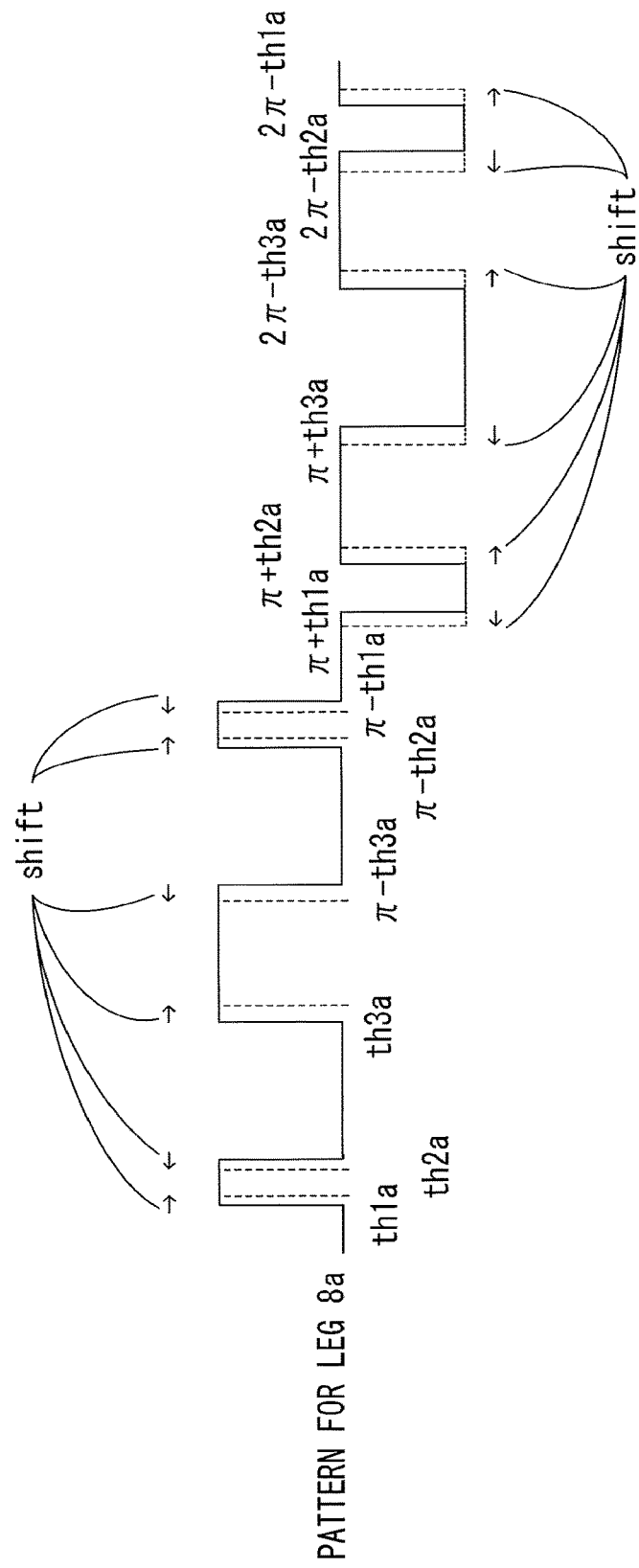
FIG. 23 is a diagram illustrating the way of correction by a pulse correction unit in embodiment 5 of the present invention.

FIG. 23 is a diagram illustrating the way of the pulse correction unit 163 correcting imbalance between voltages of the positive-side capacitor 5a and the negative-side capacitor 5b. Here, as an example, it is assumed that voltage of the positive-side capacitor 5a is higher than voltage of the negative-side capacitor 5b, and this voltage difference is detected and the switching pattern for the switching leg 8a for U phase is corrected, thereby reducing the difference.

If voltage vuca of the positive-side capacitor 5a is greater than voltage vucb of the negative-side capacitor 5b by an amount exceeding a threshold value Thv set in advance in designing, or if the neutral point current ica is smaller than a threshold value −Thi set in advance in designing, correction is performed so as to reduce voltage of the positive-side capacitor 5a. That is, on the positive side (0 to $\pi$) of the pulse pattern, each switching phase is corrected by an amount of "shift" set in advance in designing, in a direction to shorten each pulse width. On the negative side ($\pi$ to $2\pi$) of the pulse pattern, each switching phase is corrected by an amount of "shift", in a direction to broaden the pulse width. In FIG. 23, the solid line indicates the pulse pattern before correction, and the broken line indicates the pulse pattern after correction.

In the method shown in FIG. 23, the phase correcting direction is different between the phase at which switching is turned on (the pulse changes from 0 to 1) and the phase at which switching is turned off (the pulse changes from 1 to 0). Thus, the correction is complicated.

In this case, in order to simplify the correction process, the switching phases to be corrected may be limited to only a phase of a center pulse closest to $\pi/2$, $(3/2)\pi$, at which the pulse waveform does not change, and at which switching is turned on or at which switching is turned off.

The correction amount "shift" may be changed in a stepwise manner in accordance with the difference (vcua−vcub) between voltages of the positive-side capacitor 5a and the negative-side capacitor 5b, or the magnitude of the neutral point current (ica). In order that the voltage difference between the capacitors 5a and 5b becomes zero, an optimum correction amount may be calculated through so-called feedback control. The frequency at which the correction is performed may be changed in accordance with the above voltage difference or the magnitude of the neutral point current.

As described above, the power conversion device in embodiment 5 of the present invention eliminates the difference between voltage of the positive-side capacitor and voltage of the negative-side capacitor for each phase, using the neutral point voltage sensor and the neutral point current sensor. Thus, in addition to the effect described in the above embodiment 1, an effect of obtaining high-quality output characteristics in which the difference between the positive side and the negative side of output voltage by PWM control is small even under high load, is provided.

Embodiment 6

Figure 24:
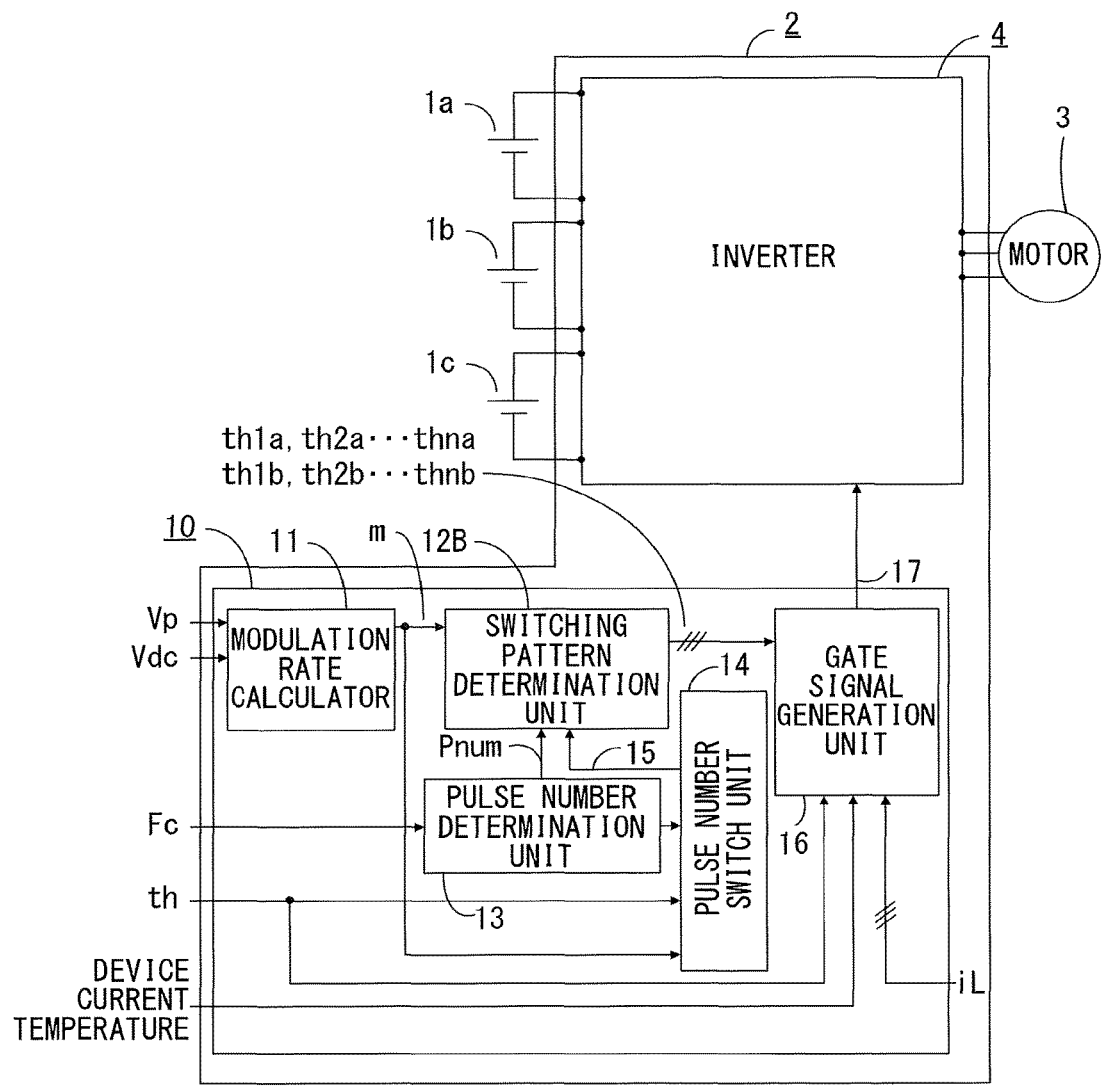
FIG. 24 is a circuit diagram showing the entire configuration of a power conversion device in embodiment 6 of the present invention.

FIG. 24 is a circuit diagram showing the entire configuration of a power conversion device in embodiment 6 of the present invention. The entire configuration of the power conversion device 2 is the same as that shown in the above embodiment 1, but in this case, the internal configuration of a switching pattern determination unit 12B in the control unit 10 is different. The other configuration is the same as in the above embodiment 1.

Figure 25:
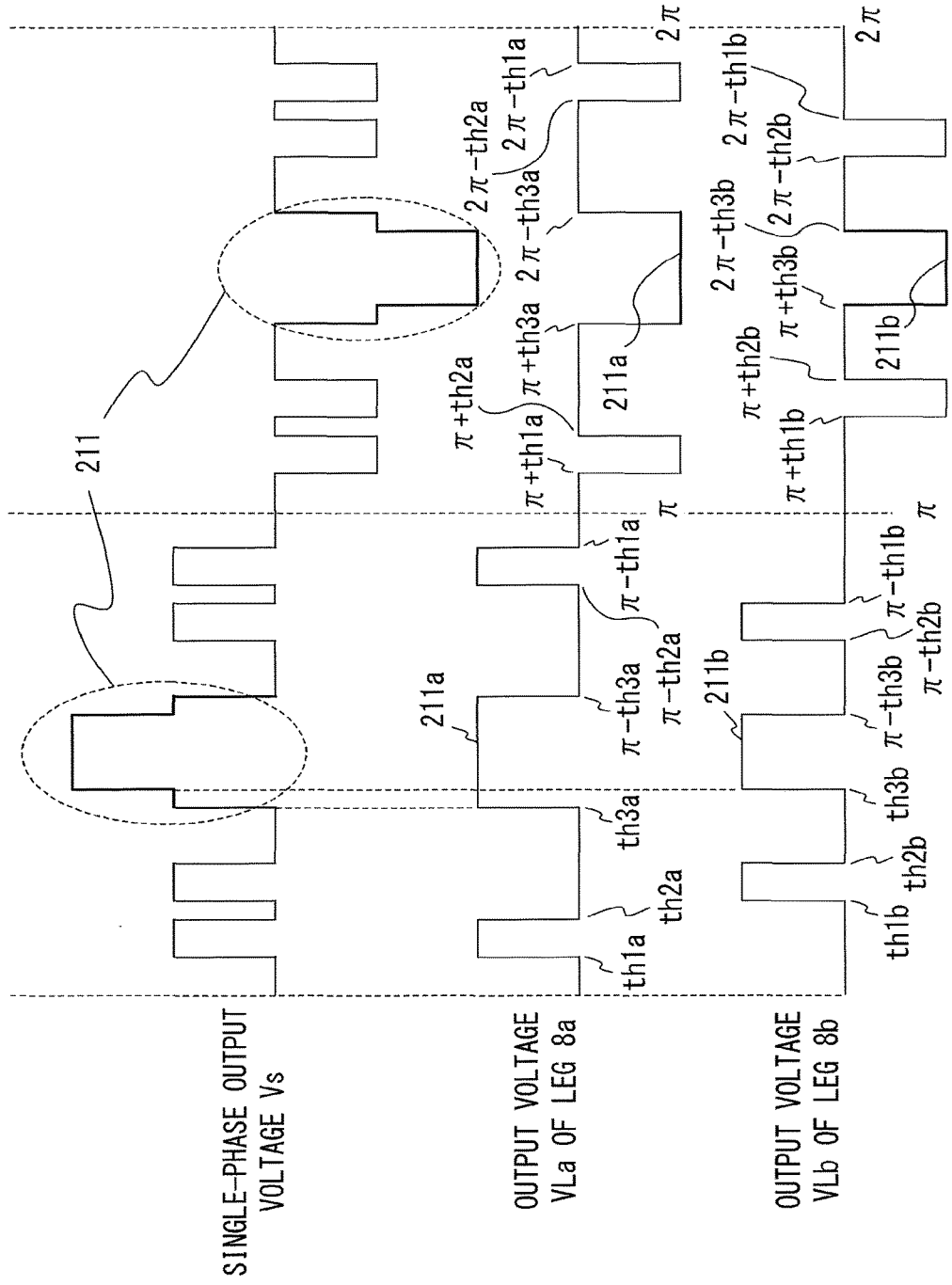
FIG. 25 is a diagram showing an example of an output voltage waveform for a single phase of an inverter controlled with a pulse number of 3, in embodiment 6 of the present invention.

FIG. 25 shows the relationship between an output voltage waveform for a single phase of the 5-level inverter 4 and output voltage waveforms of the two switching legs 8a and 8b connected in series, in the case of pulse number Pnum=3, as in FIG. 5 in the above embodiment 1. Hereinafter, determination of a switching pattern in the present embodiment 6 will be briefly described with reference to FIG. 25.

As shown in FIG. 25, in the output voltage waveform outputted from the 5-level inverter 4, at the center intervals which are partial intervals of half cycles and respectively include phases (½)π and (3/2)π, center pulses 211 are present which are partial waveforms of the output voltage waveform. The center pulses 211 are generated by the phases th3a and th3b, and are each formed from a center pulse train obtained by adding a center pulse 211a of output voltage VLa of the switching leg 8a and a center pulse 211b of output voltage VLb of the switching leg 8b.

In the present embodiment, a ratio j of the fundamental wave amplitude of the center pulse 211 in the fundamental wave amplitude (=modulation rate) of the entire output waveform is determined, and further, a threshold value i for a harmonic level in the center pulse 211 is set, thereby determining a switching pattern. That is, for both the entire output waveform and the center pulse 211, desired fundamental waves are ensured and harmonic components of respective orders are reduced.

Figure 26:
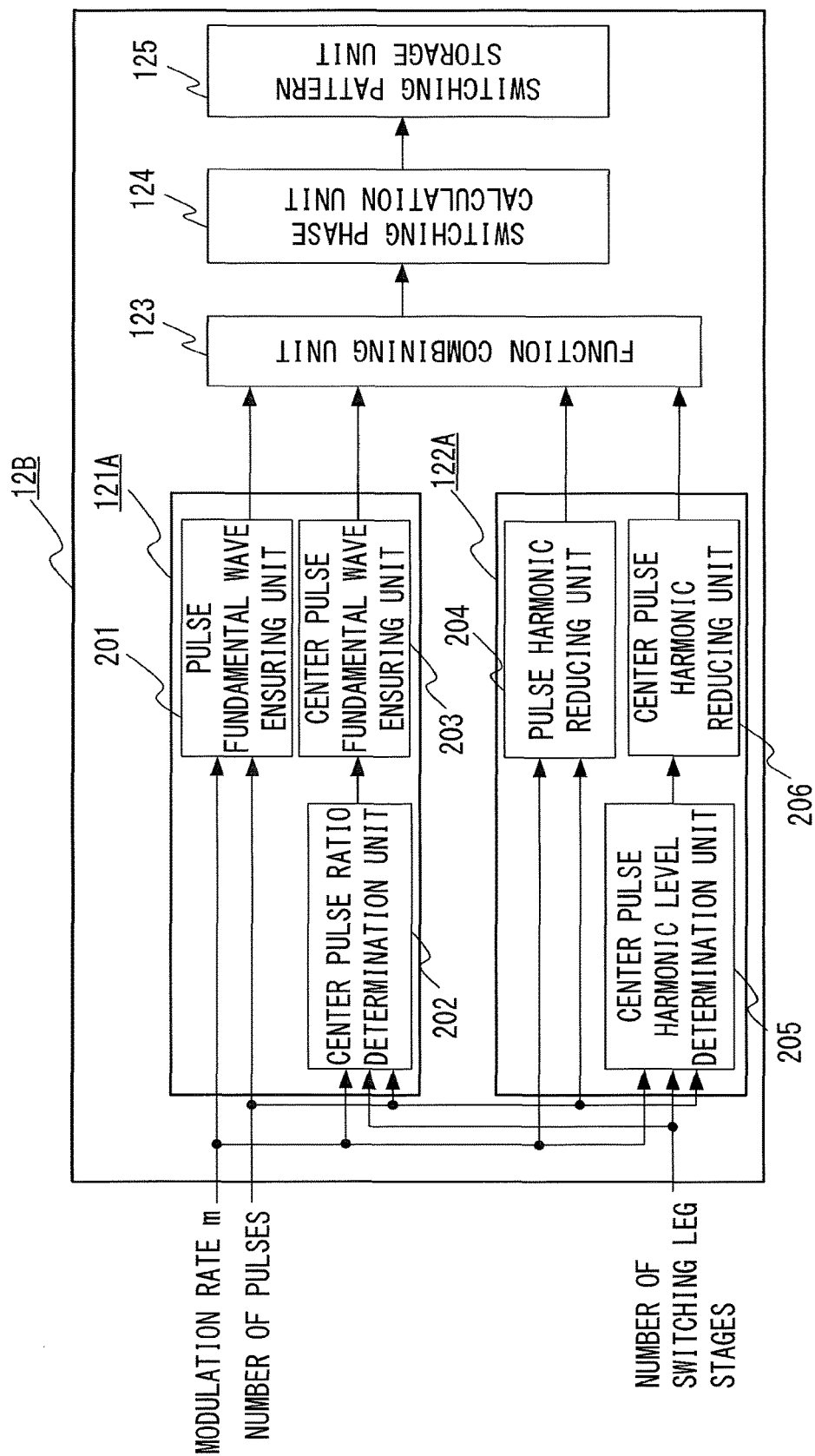
FIG. 26 is a diagram showing the internal configuration of a switching pattern determination unit in embodiment 6 of the present invention.

FIG. 26 is a diagram showing the internal configuration of the switching pattern determination unit 12B in the present embodiment 6.

As shown in FIG. 26, the switching pattern determination unit 12B includes a modulation rate ensuring unit 121A, a harmonic reducing unit 122A, the function combining unit 123, the switching phase calculation unit 124, and the switching pattern storage unit 125.

The modulation rate ensuring unit 121A includes a pulse fundamental wave ensuring unit 201, a center pulse ratio determination unit 202, and a center pulse fundamental wave ensuring unit 203, and sets a fundamental first function (function f) and an auxiliary first function (function fc), as the first functions.

The pulse fundamental wave ensuring unit 201 generates a function f as the fundamental first function which is a function for ensuring the modulation rate and which associates the fundamental wave component in a half cycle of output voltage of the inverter 4 with the modulation rate, on the basis of the modulation rate, the number of pulses, and the number of stages of switching legs. It is noted that the function f is the same as the function f in the above embodiment 1.

The center pulse ratio determination unit 202 determines the ratio j of the fundamental wave component (partial fundamental wave component) of the center pulse 211 in a half cycle of the output voltage with respect to the modulation rate, on the basis of the modulation rate, the number of pulses, and the number of stages of switching legs. The center pulse fundamental wave ensuring unit 203 generates a function fc as the auxiliary first function which associates the fundamental wave component of the center pulse 211 with the modulation rate, on the basis of the ratio j determined by the center pulse ratio determination unit 202.

The harmonic reducing unit 122A includes a pulse harmonic reducing unit 204, a center pulse harmonic level determination unit 205, and a center pulse harmonic reducing unit 206, and sets a fundamental second function (function Y) and an auxiliary second function (function Yc), as the second functions.

The pulse harmonic reducing unit 204 generates a function Y as the fundamental second function which is a function for reducing a harmonic component in the output waveform of the inverter 4 and which is the addition value of harmonic elements of respective orders determined by harmonic components of respective orders in a half cycle of output voltage of the inverter 4, on the basis of the number of pulses and the number of stages of switching legs. It is noted that the function Y is the same as the function Y in the above embodiment 1.

The center pulse harmonic level determination unit 205 determines the threshold value i (amplitude threshold value for harmonic component) for the harmonic level of a harmonic component in the center pulse 211 in a half cycle of the output voltage, on the basis of the modulation rate, the number of pulses, and the number of stages of switching legs. The center pulse harmonic reducing unit 206 generates a function Yc as the auxiliary second function which associates the threshold value i for the harmonic level with the addition value of harmonic elements of respective orders determined by harmonic components of respective orders in the center pulse 211, on the basis of the threshold value i determined by the center pulse harmonic level determination unit 205.

The function combining unit 123 sets an evaluation function X as the third function which is formed from the function f and the function fc as the first functions, the function Y and the function Yc as the second functions, and one or more additional variables. The switching phase calculation unit 124 minimizes the evaluation function X with respect to each switching phase and the additional variable, thereby calculating switching phases that ensure the modulation rate and reduce the addition value of harmonic elements of respective orders. The switching pattern storage unit 125 stores, for each modulation rate and for each pulse number, a switching pattern determined by the switching phases calculated by the switching phase calculation unit 124.

As specific examples of the first functions (fundamental first function f and auxiliary first function fc), the second functions (fundamental second function Y and auxiliary second function Yc), and the evaluation function X described above, here, five functions shown by the following expressions (21) to (25) are defined.

[Mathematical 16]

$$f(th1a, th2a, th3a, th1b, th2b, th3b) = \quad \text{Mathematical 16}$$

$$\frac{2}{\pi}(\cos th1a - \cos th2a + \cos th3a + \quad (21)$$

$$\cos th1b - \cos th2b + \cos th3b) - m$$

$$fc(th3a, th3b) = \quad (22)$$

$$\frac{2}{\pi}(\cos th3a + \cos th3b) - j/100 \times m$$

$$(0 < j < 100)$$

$$Y(th1a, th2a, th3a, th1b, th2b, th3b) = \quad (23)$$

$$\sum \left\{ \frac{2}{\pi} \times \frac{1}{k} (\cos kth1a - \cos kth2a + \right.$$

$$\left. \begin{array}{l} \cos k th3a + \cos k th1b - \cos k th2b + \\ \cos k th3b) \times w(k) \end{array} \right\}^2$$

$(k = 5, 7, 11, 13, 17, 19, 23, 25)$ $$Yc(th3a, th3b) = \quad (24)$$

$$\sum \left\{ \left( \frac{2}{\pi} \times \frac{1}{k} (\cos k th3a + \cos k th3b) \right)^2 - i^2 \right\}$$

$(k = 5, 7, 11, 13)$

[Mathematical 17]

Mathematical 17

$$X(th1a, th2a, th3a, th1b, th2b, th3b, \alpha, \beta, \gamma) = \quad (25)$$

$Y(th1a, th2a, th3a, th1b, th2b, th3b) +$ $\alpha \times f(th1a, th2a, th3a, th1b, th2b, th3b) +$ $\beta \times fc(th3a, th3b) + \gamma \times Yc(th3a, th3b)$ The function f and the function fc defined by the above expression (21) and expression (22) are generated by the pulse fundamental wave ensuring unit 201 and the center pulse fundamental wave ensuring unit 203 in the modulation rate ensuring unit 121A.

In order to ensure the modulation rate m obtained by connecting the switching legs 8a and 8b in series, the pulse fundamental wave ensuring unit 201 defines a function f(thi) which prescribes the relationship between all the switching phases (th1a, th2a, th3a, th1b, th2b, th3b; hereinafter, referred to as thi) and the modulation rate m and which has each switching phase thi as a variable, as shown by expression (21). It is noted that expression (21) is the same as expression (5) representing the function f(thi) in the above embodiment 1.

Figure 27:
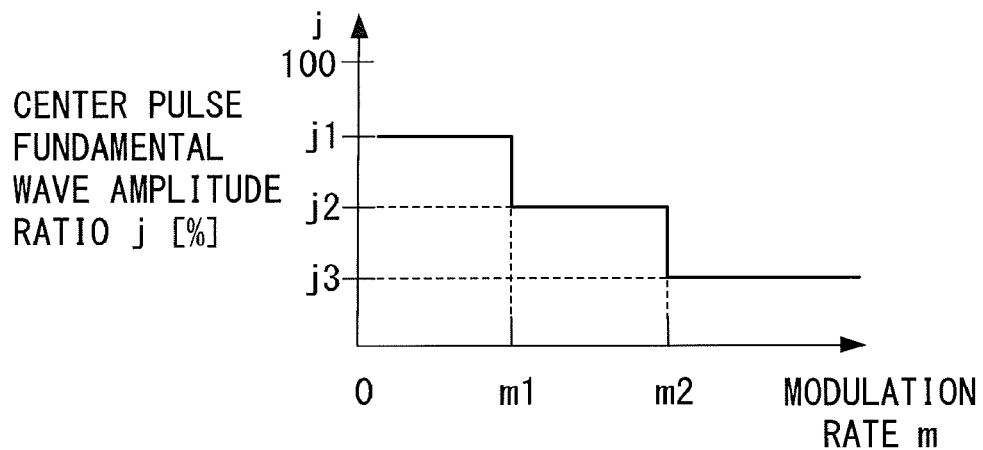
FIG. 27 is a diagram showing the ratio of the fundamental wave amplitude of a center pulse with respect to a modulation rate, in embodiment 6 of the present invention.

The center pulse ratio determination unit 202 determines the ratio j of the fundamental wave amplitude of the center pulse 211 in the fundamental wave amplitude (=modulation rate) of the entire output waveform, as shown in, for example, FIG. 27. In the example shown in FIG. 27, using two modulation rates m1, m2 (m1<m2) as reference values, a region of the modulation rate m where m≤m1 is satisfied is set as a low modulation rate region, a region of the modulation rate m where m1<m≤m2 is satisfied is set as a middle modulation rate region, and a region of the modulation rate m where m2≤m is satisfied is set as a high modulation rate region. In the respective regions, the ratios j of the fundamental wave amplitude of the center pulse 211 with respect to the modulation rate are set.

As shown in FIG. 27, the ratio j of the fundamental wave amplitude of the center pulse in the fundamental wave amplitude (=modulation rate) of the entire output waveform is set to be increased as the modulation rate is decreased. This is because, in general, when the modulation rate is high, the load is great, and when the modulation rate is low, the load is small, and therefore the setting is performed on the basis of such a condition. That is, when the modulation rate is low, the output voltage waveform is less likely to change by variation in the modulation rate, and the fundamental wave amplitude of the center pulse 211 is increased so as to stabilize the control. When the modulation rate is high, the load current becomes high in the vicinity of the center pulse, and therefore the fundamental wave amplitude of the center pulse 211 is decreased in order to reduce loss. The ratios j1, j2, j3 may be changed in accordance with the number of pulses or the number of stages of switching legs.

The center pulse fundamental wave ensuring unit 203 defines, for the center pulses 211 generated by the switching phases th3a and th3b, a function fc(th3a, th3b) which prescribes the relationship between the switching phases th3a and th3b and the fundamental wave amplitude of the center pulse 211 determined by the product of the modulation rate m and the ratio j, and which has the switching phases th3a and th3b as variables, as shown by expression (22).

The function Y(thi) and the function Yc(th3a, th3b) defined by the above expression (23) and expression (24) are generated by the pulse harmonic reducing unit 204 and the center pulse harmonic reducing unit 206 in the harmonic reducing unit 122A.

In order to reduce harmonics, the pulse harmonic reducing unit 204 defines a function Y(thi) which prescribes the relationship between each switching phase thi and, as the addition value of respective harmonic elements, the sum of squares of values obtained by multiplying a harmonic voltage component of each order in the output waveform of the inverter 4 by a weighting coefficient w(k) (k=k1 to kj) of each order, and which has each switching phase thi as a variable, as shown by expression (23). It is noted that expression (23) is the same as expression (6) representing the function Y(thi) in the above embodiment 1. That is, in expression (23), k is the order of a harmonic to be reduced, and here, a total of eight kinds of orders, i.e., fifth order, . . . , twenty-fifth order, are reduction targets. However, the reduction targets are not limited thereto. Here, the definition and the setting method for the weighting coefficient w(k) are the same as in embodiment 1.

Figure 28:
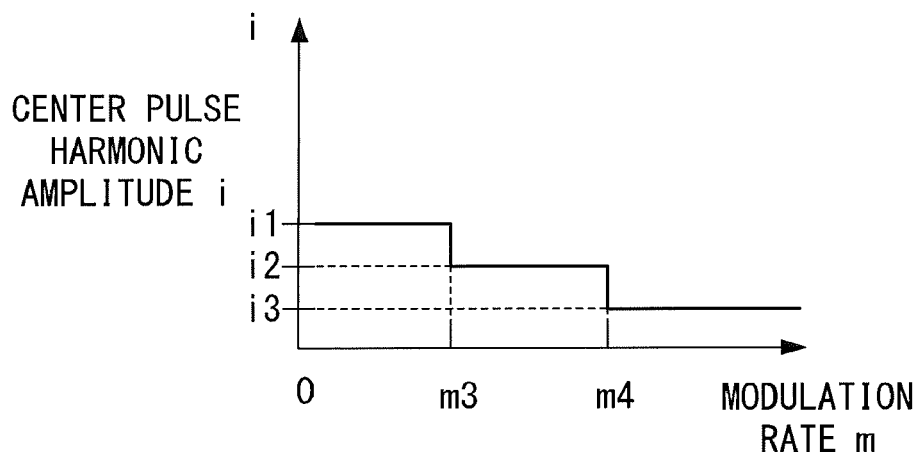
FIG. 28 is a diagram showing the harmonic amplitude of the center pulse in embodiment 6 of the present invention.

The center pulse harmonic level determination unit 205 determines the threshold value i for the harmonic level, i.e., harmonic amplitude, of a harmonic component in the center pulse 211 in a half cycle of the output voltage, as shown in, for example, FIG. 28. In the example shown in FIG. 28, using the two modulation rates m3, m4 (m3<m4) as reference values, a region of the modulation rate m where m≤m3 is satisfied is set as a low modulation rate region, a region of the modulation rate m where m3<m≤m4 is satisfied is set as a middle modulation rate region, and a region of the modulation rate m where m4≤m is satisfied is set as a high modulation rate region. In the respective regions, the threshold values i for the harmonic amplitude of the center pulse 211 with respect to the modulation rate are set. It is noted that the harmonic level is prescribed by the square root of the sum of squares of harmonic voltages of respective orders in the center pulse 211.

As shown in FIG. 28, the threshold value i for the harmonic amplitude is set to be decreased as the modulation rate is increased. This is because the setting is performed on the basis of the condition that, when the modulation rate is high, the load is great, and when the modulation rate is low, the load is small. That is, when the modulation rate is low, if there are many harmonics in a pulse at the end of a half cycle, the output voltage waveform is deformed due to a dead time or the like, and the control is likely to become unstable. Therefore, the harmonic level is increased in the center pulse. On the other hand, when the modulation rate is high, the load current increases in the vicinity of the center pulse, and therefore the harmonic level of the center pulse is decreased in order to reduce harmonic loss. The threshold values i1, i2, i3 for the harmonic level may be changed in accordance with the number of pulses or the number of stages of switching legs.

The center pulse harmonic reducing unit 206 defines, for the center pulses 211 generated by the switching phases th3a and th3b, a function Yc(th3a, th3b) which prescribes the relationship between the harmonic amplitude, i.e., the harmonic level prescribed by the square root of the sum of squares of harmonic voltage components of respective orders, and the threshold value i therefor, and which has the switching phases th3a and th3b as variables, as shown by expression (24).

In expression (24), as in expression (23), k is the order of a harmonic to be reduced, and here, a total of four kinds of orders, i.e., fifth order, . . . , thirteenth order, are reduction targets. Then, in expression (25) and expression (26) described later, the purpose is to obtain such switching phases that allow the sum of squares of harmonic components of fifth to thirteenth orders in expression (24) to become equal to or smaller than the square of the threshold value i for the harmonic level.

As shown by expression (25), the function combining unit 123 defines an evaluation function X having an increased degree of freedom by further adding additional variables to the degree of freedom (corresponding to the number of the switching phases thi as variables, here, six variables) of the function f, the function fc, the function Y, and the function Yc. The evaluation function X is defined so as to: ensure the modulation rate of the output waveform of the inverter 4; reduce the sum of squares of harmonic voltage components of respective orders; ensure that the fundamental wave of the center pulse 211 has a center pulse fundamental wave amplitude calculated as the product of the modulation rate m and the ratio j; and allow the sum of squares of harmonic voltages of respective orders in the center pulse 211 to become equal to or smaller than the determined threshold value ($i^2$).

Specifically, the function combining unit 123 defines an evaluation function X(thi, $\alpha$, $\beta$, $\gamma$) which is the sum of the function Y(thi) shown by expression (23) and values obtained by multiplying the function f(thi), the function fc(th3a, th3b), and the function Yc(th3a, th3b) shown by expression (21), expression (22), and expression (24) by weighting variables $\alpha$, $\beta$, $\gamma$, respectively, and which has each switching phase thi and the weighting variables $\alpha$, $\beta$, $\gamma$ as variables.

The switching phase calculation unit 124 creates simultaneous equations with nine unknowns shown by expression (26) in which the partial derivatives of the evaluation function X(thi, $\alpha$, $\beta$, $\gamma$) with respect to nine variables $\alpha$, $\beta$, $\gamma$, th1a to th3b are set at zero or at zero or smaller. By solving the simultaneous equations with nine unknowns using, for example, Newton's method, it is possible to obtain a switching pattern which ensures a required modulation rate m and minimizes the overall value of harmonic voltage components of many orders, and in which the ratio of the fundamental wave amplitude of the center pulse 211 with respect to the modulation rate m, and harmonic voltage components of many orders in the center pulse 211, are appropriately set on the basis of the modulation rate.

[Mathematical 18]

Mathematical 18

$$\left.\begin{aligned}\frac{\partial X}{\partial \alpha} &= 0 \\ \frac{\partial X}{\partial \beta} &= 0 \\ \frac{\partial X}{\partial \gamma} &\leq 0 \\ \frac{\partial X}{\partial thi} &= 0\end{aligned}\right\} \quad (26)$$

$(i = 1a, 2a, 3a, 1b, 2b, 3b)$

As described above, in the power conversion device in embodiment 6 of the present invention, the modulation rate ensuring unit 121A in the switching pattern determination unit 12B sets the fundamental first function (function f) and the auxiliary first function (function fc) as the first functions, and the harmonic reducing unit 122A sets the fundamental second function (function Y) and the auxiliary second function (function Yc) as the second functions. Then, a switching pattern is determined using the evaluation function X obtained by the above functions and additional variables. Thus, in addition to the effect described in the above embodiment 1, it is possible to appropriately control the ratio of the fundamental wave amplitude of the center pulse 211 with respect to the modulation rate m, and harmonic voltage components of many orders in the center pulse 211, on the basis of the modulation rate. Therefore, as well as minimizing harmonic voltage components of many orders, it is possible to reduce switching loss and the accompanying heat generation in the switching devices irrespective of the magnitude of the load or output voltage, and perform stable control even with low voltage.

Therefore, it is possible to obtain such a switching pattern that, as well as minimizing harmonic voltage components of many orders, reduces switching loss and the accompanying heat generation in the switching devices irrespective of the magnitude of the load or output voltage, and allows stable control even with low voltage.

As the waveform in a partial interval in a half cycle of output voltage of the inverter 4, the center pulse 211 including the phase ($\frac{1}{2}$)$\pi$, (3/2)$\pi$ is used. The center pulse 211 is a part that greatly contributes to and greatly influences the output voltage waveform, and therefore a desired switching pattern is effectively obtained.

The reference values m1, m2 of the modulation rate in the center pulse ratio determination unit 202 may be the same as or different from the reference values m3, m4 of the modulation rate in the center pulse harmonic level determination unit 205. The number of the reference values of the modulation rate, used in each of the center pulse ratio determination unit 202 and the center pulse harmonic level determination unit 205 is not limited to two but may be three or more.

In the center pulse harmonic reducing unit 206, the number of kinds of harmonic orders k as reduction targets is four as shown by expression (24), but may be the same as in the pulse harmonic reducing unit 204, i.e., eight kinds of orders from fifth order to twenty-fifth order, or more kinds of orders may be targeted for reduction.

In the above embodiment 6, as the waveform in a partial interval in a half cycle of the output voltage of the inverter 4, the center pulse 211 is used. However, without limitation thereto, the phase range for the partial interval where the ratio of the fundamental wave amplitude with respect to the modulation rate m is set, may be freely set.

Embodiment 7

Next, a power conversion device in embodiment 7 of the present invention will be described. In the present embodiment 7, as in the above embodiment 6, a switching pattern is determined focusing on the center pulse, and control of the plurality of switching legs is balanced.

Figure 29:
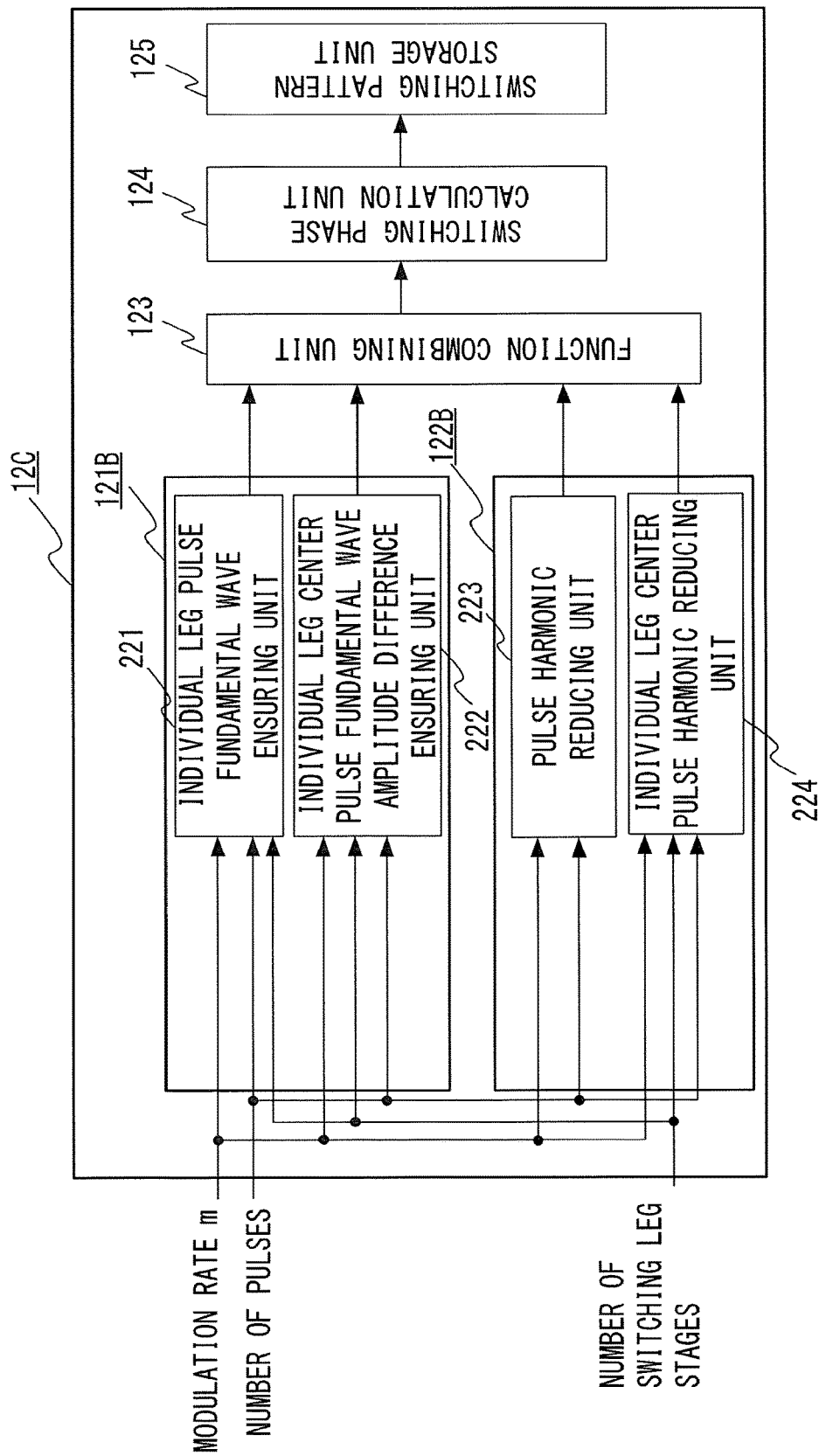
FIG. 29 is a diagram showing the internal configuration of a switching pattern determination unit in embodiment 7 of the present invention.

FIG. 29 is a diagram showing the internal configuration of a switching pattern determination unit 12C in the present embodiment 7. The other configuration is the same as in the above embodiment 1.

Figure 30:
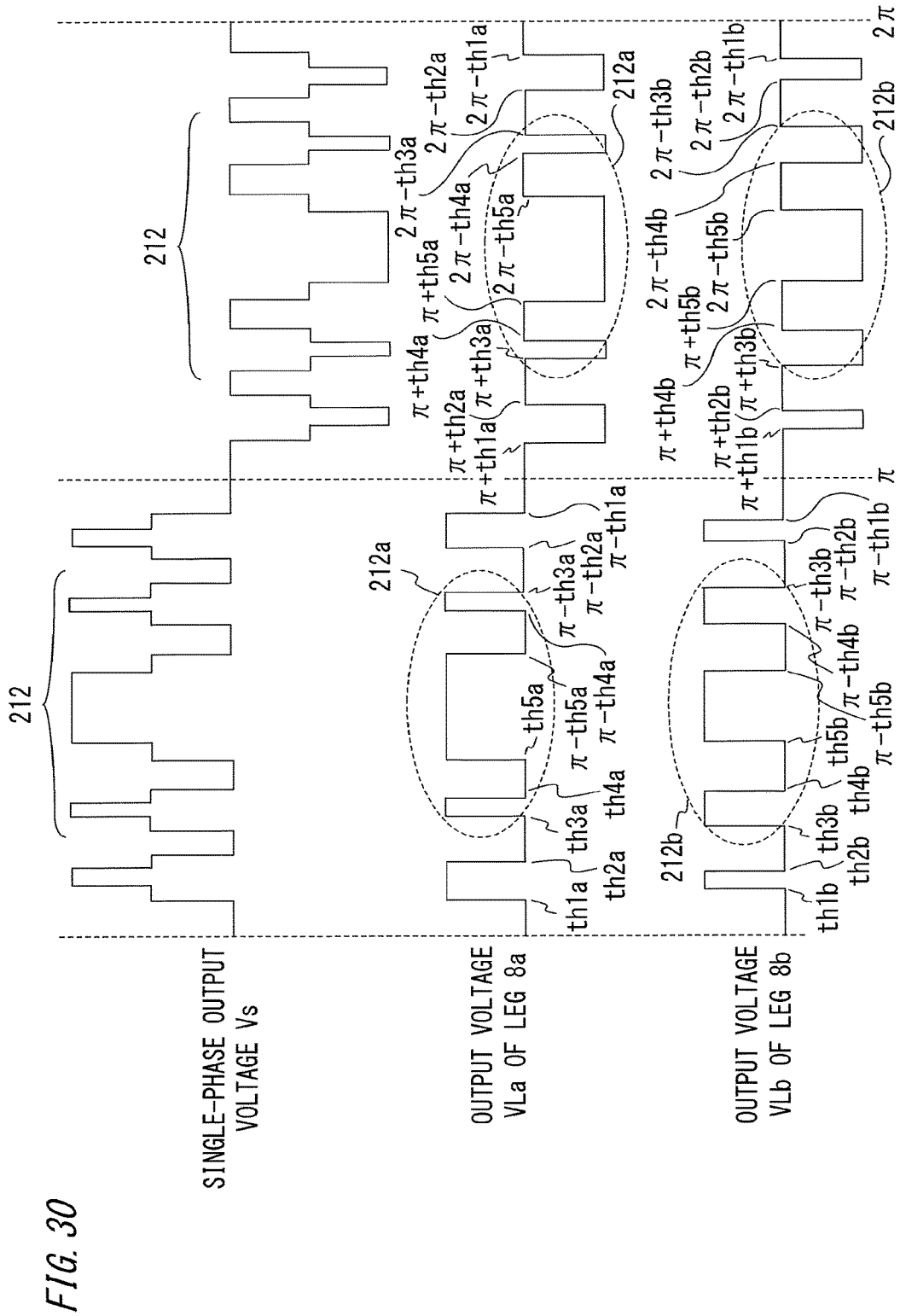
FIG. 30 is a diagram showing an example of an output voltage waveform for a single phase of an inverter controlled with a pulse number of 5, in embodiment 7 of the present invention.

FIG. 30 is an example of output voltage waveforms over one cycle (2π) at the modulation rate m in the case of pulse number Pnum=5, and shows the relationship between the output voltage waveform for a single phase of the 5-level inverter 4 and the output voltage waveforms of the two switching legs 8a and 8b connected in series.

As shown in FIG. 30, in the output voltage waveform outputted from the 5-level inverter 4, at predetermined center intervals which are partial intervals of half cycles and respectively include phases (½)π and (3/2)π, center pulse trains 212 are present which are partial waveforms of the output voltage waveform. The center pulse trains 212 are each formed by adding a center pulse train 212a formed of three center pulses in output voltage VLa of the switching leg 8a, and a center pulse train 212b formed of three center pulses in output voltage VLb of the switching leg 8b.

In the present embodiment, the switching pattern determination unit 12C determines switching patterns as follows. The fundamental wave of the entire output waveform of each switching leg 8a, 8b is ensured, and the amplitude difference between the fundamental waves of the center pulse trains 212 for the switching legs 8a and 8b is reduced. At the same time, harmonic components of respective orders in the entire output waveform of the 5-level inverter 4 are reduced, and harmonic components of respective orders in the center pulse train 212 for each switching leg 8a, 8b are reduced.

As shown in FIG. 29, the switching pattern determination unit 12C includes a modulation rate ensuring unit 121B, a harmonic reducing unit 122B, the function combining unit 123, the switching phase calculation unit 124, and the switching pattern storage unit 125.

The modulation rate ensuring unit 121B includes an individual leg pulse fundamental wave ensuring unit 221 and an individual leg center pulse fundamental wave amplitude difference ensuring unit 222, and sets fundamental first functions (function fa, function fb) for the respective switching legs 8a and 8b, and a balance function (function fd), as the first functions. It is noted that the function fa and the function fb are set in the same manner as in the above embodiment 4.

The individual leg pulse fundamental wave ensuring unit 221 generates, for the respective switching legs 8a and 8b, a function fa and a function fb as the fundamental first functions which are functions for ensuring the same modulation rate for the respective switching legs 8a and 8b, and which associate the fundamental wave component in a half cycle of output voltage of the inverter 4 with the modulation rate, on the basis of the modulation rate, the number of pulses, and the number of stages of switching legs.

The individual leg center pulse fundamental wave amplitude difference ensuring unit 222 generates a function fd as the balance function which associates a preset upper limit value with the amplitude difference between the fundamental wave components in the center pulse trains 212 for the two switching legs 8a and 8b in a half cycle of the output voltage, on the basis of the modulation rate, the number of pulses, and the number of stages of switching legs.

The harmonic reducing unit 122B includes a pulse harmonic reducing unit 223 and an individual leg center pulse harmonic reducing unit 224, and sets a fundamental second function (function Y) and auxiliary second functions (function Yca, function Ycb) for the respective switching legs 8a and 8b, as the second functions.

The pulse harmonic reducing unit 223 generates a function Y as a fundamental second function which is the function for reducing harmonic components in the output waveform of the inverter 4 and which is the addition value of harmonic elements of respective orders determined by harmonic components of respective orders in a half cycle of output voltage of the inverter 4, on the basis of the number of pulses and the number of stages of switching legs. It is noted that the function Y is the same as the function Y in the above embodiment 1.

The individual leg center pulse harmonic reducing unit 224 generates a function Yca and a function Ycb for the respective switching legs 8a and 8b as auxiliary second functions which each associate the addition value of harmonic elements of respective orders determined by harmonic components of respective orders in the center pulse train 212 for each switching leg 8a, 8b, with the harmonic level threshold value i set in advance in accordance with the modulation rate.

The function combining unit 123 sets an evaluation function X as a third function which is formed from: the function fa, the function fb, and the function fd as the first functions; the function Y, the function Yca, and the function Ycb as the second functions; and one or more additional variables. The switching phase calculation unit 124 minimizes the evaluation function X with respect to each switching phase and the additional variable, thereby calculating switching phases that ensure the modulation rate and reduce the addition value of harmonic elements of respective orders. The switching pattern storage unit 125 stores, for each modulation rate and for each pulse number, a switching pattern determined by the switching phases calculated by the switching phase calculation unit 124.

Specific examples of the first functions (fundamental first functions fa, fb and balance function fd), the second functions (fundamental second function Y and auxiliary second functions Yca, Ycb), and the evaluation function X described above will be shown below. Here, the first functions are defined by three functions shown by expressions (27) to (29), the second functions are defined by three functions shown by expressions (30) to (32), the evaluation function is defined by a function shown by expression (33).

[Mathematical 19]

Mathematical 19

$$fa(th1a, th2a, th3a, th4a, th5a) = \frac{2}{\pi}(\cos th1a - \cos th2a + \cos th3a - \cos th4a + \cos th5a) - m/2 \quad (27)$$

-continued $$fb(th1b, th2b, th3b, th4b, th5b) = \qquad (28)$$

$$\frac{2}{\pi}(\cos th1b - \cos th2b + \cos th3b - \cos th4b + \cos th5b) - m/2$$

$$fd(th3a, th4a, th5a, th3b, th4b, th5b) = \qquad (29)$$

$$\text{abs}\left(\frac{2}{\pi}(\cos th3a - \cos th4a + \cos th5a) - \frac{2}{\pi}(\cos th3b - \cos th4b + \cos th5b)\right) - \text{diff lim}$$

[Mathematical 20]

Mathematical 20

$$Y(th1a, th2a, th3a, , th4a, th5a, th1b, th2b, th3b, th4b, \qquad (30)$$

$$th5b) = \sum \left\{\frac{2}{\pi} \times \frac{1}{k}(\cos kth1a - \cos kth2a + \cos kth3a - \cos kth4a + \cos kth5a + \cos kth1b - \cos kth4b + \cos kth5b) + w(k)\right\}^2$$

$$(k = 5, 7, 11, 13, 17, 19, 23, 25, 29, 31)$$

$$Yca(th3a, th4a, th5a) = \qquad (31)$$

$$\sum \left\{\frac{2}{\pi} \times \frac{1}{k}(\cos kth3a - \cos kth4a + \cos kth5a)\right\}^2 - i^2$$

$$(k = 5, 7, 11, 13)$$

$$Ycb(th3b, th4b, th5b) = \qquad (32)$$

$$\sum \left\{\frac{2}{\pi} \times \frac{1}{k}(\cos kth3b - \cos kth4b + \cos kth5b)\right\}^2 - i^2$$

$$(k = 5, 7, 11, 13)$$

[Mathematical 21]

Mathematical 21

$$X(th1a, th2a, th3a, th4a, th5a, th1b, \qquad (33)$$

$$th2b, th3b, th4b, th5b, \alpha1, \alpha2, \beta, \gamma, \delta) =$$

$$Y(th1a, th2a, th3a, th4a, th5a, th1b, th2b, th3b, th4b,$$

$$th5b) + \alpha1 \times fa(th1a, th2a, th3a, th4a, th5a) +$$

$$\alpha2 \times fb(th1b, th2b, th3b, th4b, th5b) +$$

$$\beta \times fd(th3a, th4a, th5a, th3b, th4b, th5b) +$$

$$\gamma \times Yca(th3a, th4a, th5a) + \delta \times Ycb(th3b, th4b, th5b)$$

In order to equalize the burdens on the switching legs 8a and 8b, the individual leg pulse fundamental wave ensuring unit 221 in the modulation rate ensuring unit 121B defines, for the respective switching legs 8a and 8b, the function fa and the function fb having switching phases as variables, so that the modulation rate m to be outputted is equally allocated between the switching legs 8a and 8b, as shown by expression (27) and expression (28). That is, the function fa is a function prescribing the relationship between the switching phases (th1a, th2a, th3a, th4a, th5a) for the switching leg 8a and the modulation rate m, and having the switching phases for the switching leg 8a as variables. The function fb is a function prescribing the relationship between the switching phases (th1b, th2b, th3b, th4b, th5b) for the switching leg 8b and the modulation rate m, and having the switching phases for the switching leg 8b as variables.

The individual leg center pulse fundamental wave amplitude difference ensuring unit 222 in the modulation rate ensuring unit 121B defines the function fd which associates the amplitude difference between the fundamental wave components in the center pulse trains 212 for the switching legs 8a and 8b, with a predetermined upper limit value difflim, as shown by expression (29). That is, the function fd prescribes the relationship between the upper limit value difflim and the difference between the fundamental wave amplitude of the center pulse train 212a defined by the switching phases (th3a, th4a, th5a) for the switching leg 8a and the fundamental wave amplitude of the center pulse train 212b defined by the switching phases (th3b, th4b, th5b) for the switching leg 8b, and the function fd has the switching phases (th3a, th4a, th5a, th3b, th4b, th5b) for the switching legs 8a and 8b as variables. In addition, the function fd is reflected in expression (33) and expression (34) described later which are respectively defined by the function combining unit 123 and the switching phase calculation unit 124, thereby ensuring that the difference between the fundamental wave amplitudes of the center pulse trains 212a and 212b for the switching legs 8a and 8b is equal to or smaller than the upper limit value difflim.

In order to reduce harmonics, the pulse harmonic reducing unit 223 in the harmonic reducing unit 122B defines the function Y(thi) which prescribes the relationship between each switching phase (th1a to th5a, th1b to th5b; hereinafter, referred to as thi) of the output waveform of the inverter 4 and, as the addition value of harmonic elements of respective orders, the sum of squares of values obtained by multiplying a harmonic voltage component of each order in the output waveform of the inverter 4 by the weighting coefficient w(k) (k=k1 to kj) of each order, and which has each switching phase thi as a variable, as shown by expression (30).

It is noted that expression (30) is set in the same manner as expression (6) representing the function Y(thi) in the above embodiment 1, but here, the number of order kinds of harmonics to be reduced is 10. That is, in expression (30), k is the order of a harmonic to be reduced, and here, fifth order, . . . , thirty-first order, i.e., a total of ten kinds of orders are targeted. Here, the definition and the setting method for the weighting coefficient w(k) are the same as in embodiment 1.

The individual leg center pulse harmonic reducing unit 224 in the harmonic reducing unit 122B defines, for the respective switching legs 8a and 8b, the function Yca and the function Ycb as the auxiliary second functions which each associate the addition value of harmonic elements of respective orders in the center pulse train 212a, 212b with the harmonic level threshold value i, and which respectively have the switching phases for the switching legs 8a and 8b as variables, as shown by expression (31) and expression (32). That is, the function Yca is defined using the switching phases (th3a, th4a, th5a) for the switching leg 8a as variables, and the function Ycb is defined using the switching phases (th3b, th4b, th5b) for the switching leg 8b as variables. The threshold value i for the harmonic amplitude which is a harmonic level prescribed by the square root of the sum of squares of harmonic voltage components of respective orders, is set in advance for each modulation rate.

In expression (31) and expression (32), as in expression (30), k is the order of a harmonic to be reduced, and here, a total of four kinds of orders, i.e., fifth order, . . . , thirteenth order, are reduction targets.

As shown by expression (33), the function combining unit 123 defines an evaluation function X having an increased degree of freedom by further adding additional variables to the degree of freedom (corresponding to the number of the switching phases thi as variables, here, ten variables) of the function fa, the function fb, the function fd, the function Y, the function Yca, and the function Ycb. The evaluation function X is set so that the output waveforms of the switching legs 8a and 8b of the inverter 4 equally bear the modulation rate to ensure the fundamental wave component, and the sum of squares of harmonic voltage components of respective orders is reduced. At the same time, the evaluation function X is defined so as to: ensure the fundamental wave amplitudes of the center pulse trains 212a and 212b for the two switching legs 8a and 8b so that the difference between these fundamental wave amplitudes becomes equal to or smaller than the upper limit value; and allow the sum of squares of harmonic voltages of respective orders in each of the center pulse trains 212a and 212b to become equal to or smaller than the determined threshold value ($i^2$).

Specifically, the evaluation function $X(thi, \alpha1, \alpha2, \beta, \gamma, \delta)$ is defined which is the sum of the function Y(thi) shown by expression (30) and values obtained by multiplying the function fa, the function fb, the function fd, the function Yca, and the function Ycb shown by expressions (27) to (29), (31), and (32), by weighting variables $\alpha1, \alpha2, \beta, \gamma, \delta$, respectively, and which has each switching phase thi and the weighting variables $\alpha1, \alpha2, \beta, \gamma, \delta$ as variables.

The switching phase calculation unit 124 creates simultaneous equations with fifteen unknowns shown by expression (34) in which partial derivatives of the evaluation function $X(thi, \alpha1, \alpha2, \beta, \gamma, \delta)$ with respect to the fifteen variables $\alpha1, \alpha2, \beta, \gamma, \delta$, th1a to th5b are set at zero or at zero or smaller. By solving the simultaneous equations with fifteen unknowns using, for example, Newton's method, it is possible to obtain a desired switching pattern. That is, it is possible to obtain such switching patterns that ensure a required modulation rate m with equal burdens on the switching legs 8a and 8b and minimize the overall value of harmonic voltage components of many orders, and further, reduce the difference between the fundamental wave amplitudes of the center pulse trains 212a and 212b for the two switching legs 8a and 8b and reduce harmonic voltage components of respective orders in each center pulse train 212a, 212b.

[Mathematical 22]

Mathematical 22

$$\left.\begin{aligned}\frac{\partial X}{\partial \alpha 1} &= 0 \\ \frac{\partial X}{\partial \alpha 2} &= 0 \\ \frac{\partial X}{\partial \beta} &\leq 0 \\ \frac{\partial X}{\partial \gamma} &\leq 0 \\ \frac{\partial X}{\partial \delta} &\leq 0 \\ \frac{\partial X}{\partial thi} &= 0 \end{aligned}\right\} \quad (34)$$

$(i = 1a, 2a, 3a, 4a, 5a, 1b, 2b, 3b, 4b, 5b)$

As described above, in the power conversion device in embodiment 7 of the present invention, the modulation rate ensuring unit 121B in the switching pattern determination unit 12C sets the fundamental first functions (function fa, function fb) for the respective switching legs 8a and 8b and the balance function (function fd), as the first functions, and the harmonic reducing unit 122B sets the fundamental second function (function Y) and the auxiliary second function (function Yca, function Ycb) for the respective switching legs 8a and 8b, as the second functions. Then, a switching pattern is determined using the evaluation function X obtained from those functions and the additional variables. Thus, in addition to the effect described in the above embodiment 1, it is possible to equalize the burdens on the switching legs 8a and 8b, reduce the difference between the fundamental wave amplitudes of the center pulse trains 212a and 212b for the two switching legs 8a and 8b, and reduce harmonic voltage components of respective orders in each center pulse train 212a, 212b.

Thus, also in a multilevel inverter configured by a plurality of switching legs, it is possible to reduce imbalance of switching loss and prolong the life of each device, and in addition, achieve such switching that reduces switching loss and motor loss due to harmonics.

In the case of generating the gate signal 17 so as to exchange a plurality of switching patterns with a predetermined cycle as shown in the above embodiment 4, if the number of stages of switching legs is increased, the exchange sequence is complicated, and the exchange cycle is elongated, and therefore it is difficult to eliminate imbalance among the switching legs. In the present embodiment, in advance, such a switching pattern as to suppress harmonic loss in each switching leg and reduce loss imbalance is determined and used, and thus the present embodiment is effective also in the case where there are many stages of switching legs.

The upper limit value difflim for the difference between the fundamental wave amplitudes of the center pulse trains 212a and 212b for the switching legs 8a and 8b may be set on a modulation rate basis. Plural kinds of upper limit values difflim may be set in advance in a stepwise manner with respect to the modulation rate and thus determined.

Figure 31:
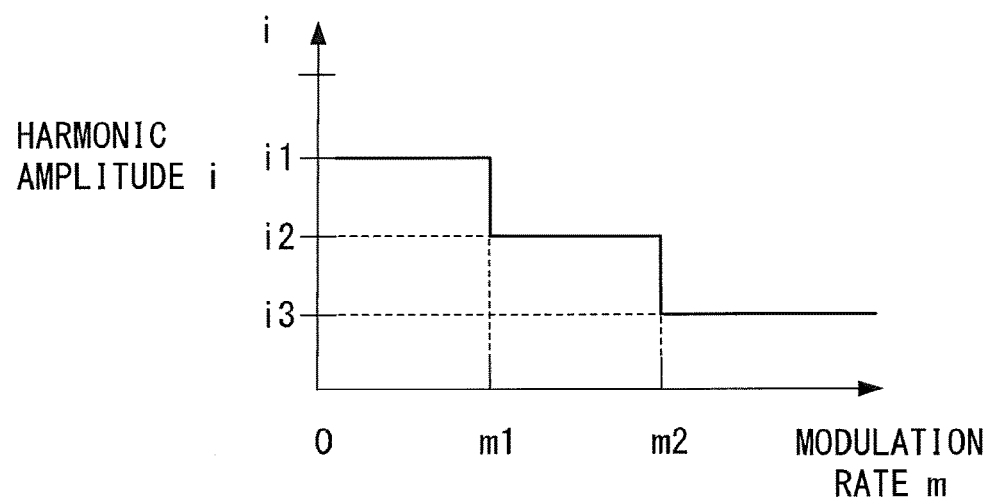
FIG. 31 is a diagram showing the harmonic amplitude of a center pulse train in embodiment 7 of the present invention.

As for the threshold value i for the harmonic amplitude which is a harmonic level, a table indicating the threshold values i corresponding to the modulation rates may be provided in advance. The center pulse harmonic level determination unit 205 as in the above embodiment 6 may be provided, and as shown in FIG. 31, the threshold value i may be set in a stepwise manner in accordance with the modulation rate.

Embodiment 8

Next, a power conversion device in embodiment 8 of the present invention will be described. The entire configuration of the power conversion device is the same as that shown in FIG. 1 and FIG. 2 in the above embodiment 1. In this case, operation of the pulse number determination unit 13 in the control unit 10 is different.

By the way, in the inverter 4 of the power conversion device 2, if the number of stages of the 3-level switching legs 8a and 8b connected in series increases, the level of voltage that can be outputted from the inverter 4 increases. If the number of pulses outputted from each switching leg 8a, 8b in a half cycle of the fundamental wave is increased, the number of times of switching also increases by (increase in number of pulses×number of stages) in ¼ cycle. For example, if the pulse number Pnum in the 3-level voltage outputted from each switching leg 8a, 8b in a half cycle of the fundamental wave is changed from three pulses to five pulses or from five pulses to three pulses, the number of times of switching in the inverter 4 in ¼ cycle increases or decreases by increase in the number of pulses×two stages=four. That is, when the number of pulses increases or decreases, the amount of increase or decrease in the number of times of switching increases in proportion to the number of leg stages.

The pulse number determination unit 13 determines the pulse number Pnum per half cycle of the fundamental wave in PWM control, on the basis of the output frequency command value Fc for the inverter 4. The purpose thereof is to decrease the number of times of switching when the operation speed becomes fast, in order that the switching can follow even in the case of using a large-capacity inverter having a low switching speed.

In the present embodiment 8, the pulse number determination unit 13 determines the numbers of pulses for the respective plurality of switching legs 8a and 8b in accordance with the output frequency command value Fc for the inverter 4 and the modulation rate, and outputs a combination of the numbers of pulses.

Figure 32:
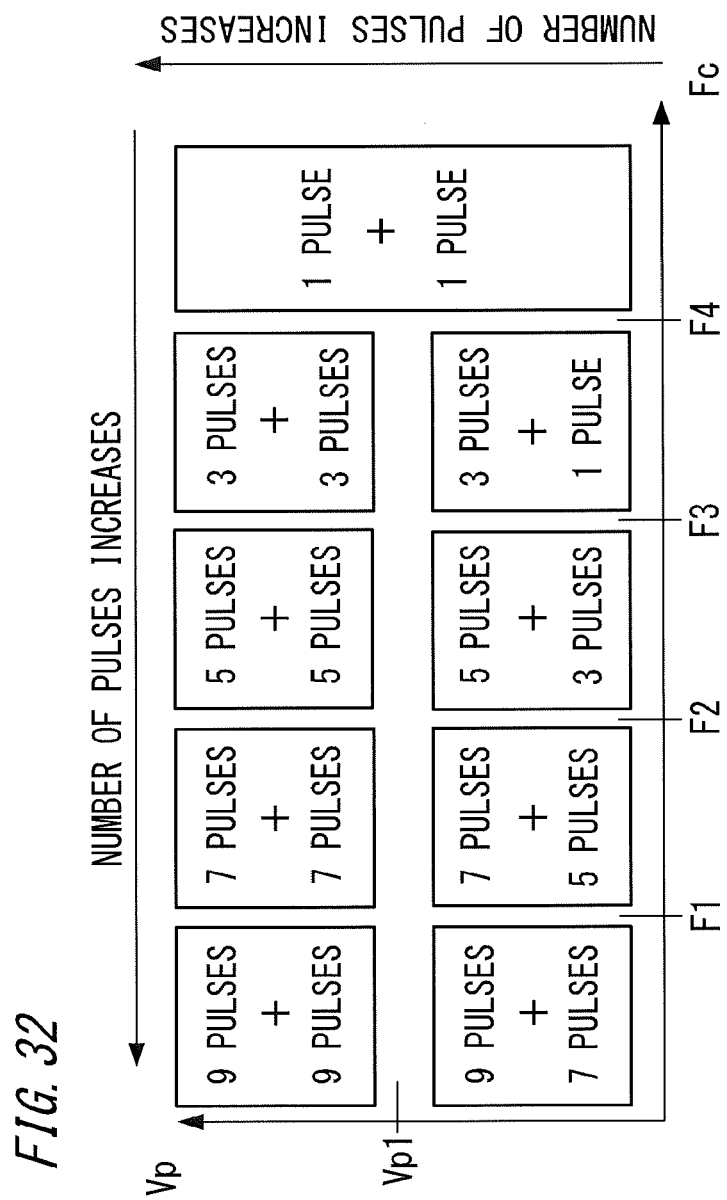
FIG. 32 is a diagram illustrating operation by a pulse number determination unit in embodiment 8 of the present invention.

FIG. 32 is a diagram illustrating operation of the pulse number determination unit 13 in the present embodiment, and showing an example of a pulse number determination condition.

As shown in FIG. 32, a combination of the numbers of pulses for the switching legs 8a and 8b is determined in accordance with the output frequency command value Fc (horizontal axis) for the inverter 4, and the output voltage amplitude value Vp (vertical axis) corresponding to the modulation rate. In this case, reference values F1, F2, F3, F4 for the frequency command value Fc and a reference value Vp1 for the voltage amplitude value Vp are set, and nine combinations of the numbers of pulses are determined on the basis of combinations of those conditions.

Specifically, first, the basic number of pulses is determined on the basis of which of the five ranges, Fc<F1, F1≤Fc<F2, F2≤Fc<F3, F3≤Fc<F4, F4≤Fc, the frequency command value Fc belongs to, and the basic numbers of pulses for the respective ranges are 9, 7, 5, 3, 1, in this order.

Then, in each of the five ranges, whether the numbers of pulses for the switching legs 8a and 8b are the same or different is determined on the basis of whether the voltage amplitude value Vp is not smaller than Vp1 or is smaller than Vp1. In the case where a combination of different numbers of pulses is employed, this combination is the basic number of pulses and the number of pulses less than the basic number of pulses by two.

Determination of a switching pattern in the case where the numbers of pulses for the switching legs 8a and 8b are different, will be described below. As an example, the case of determining a switching pattern by the switching pattern determination unit 12 shown in FIG. 8 in the above embodiment 1 will be described.

Figure 33:
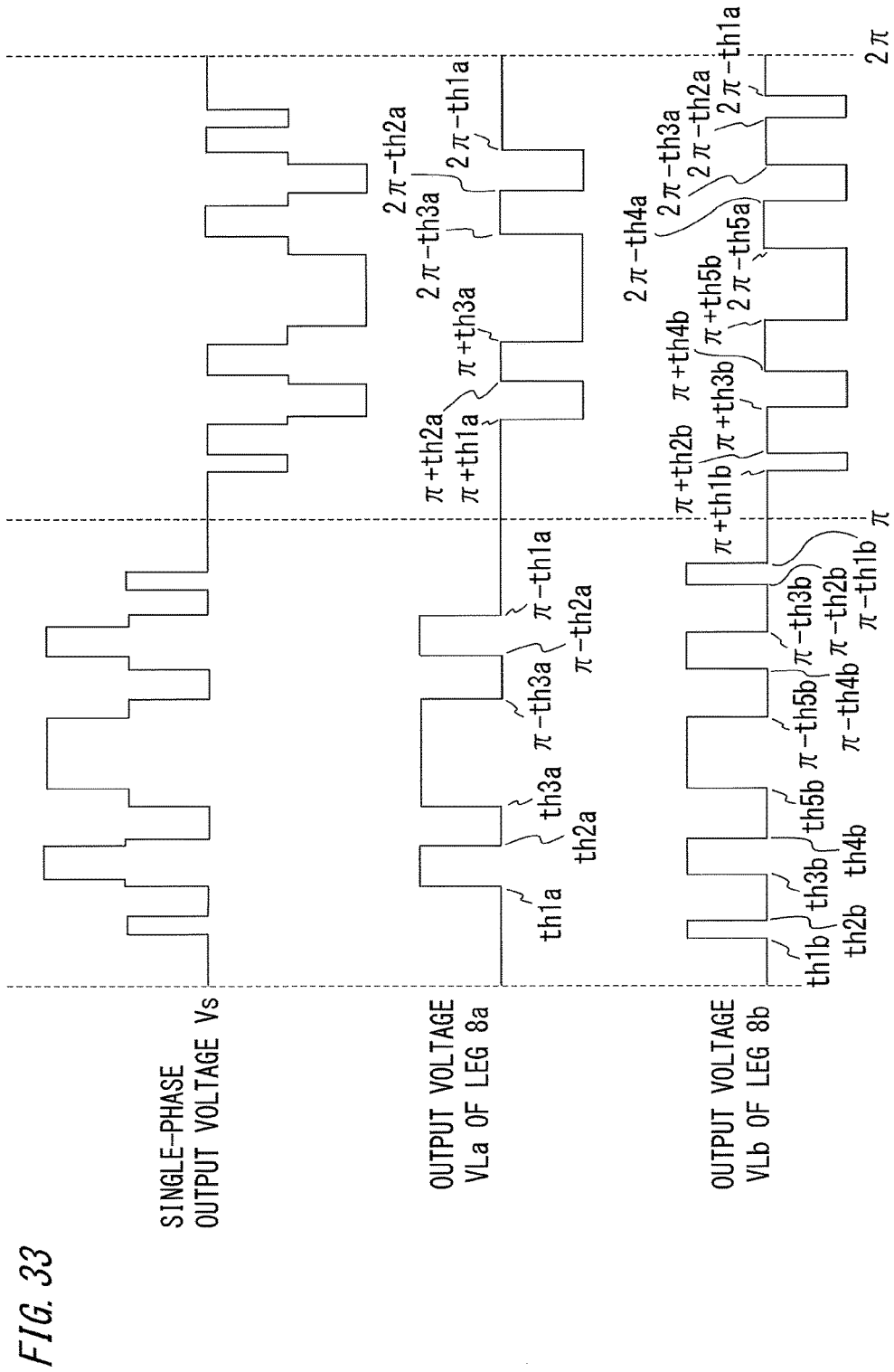
FIG. 33 is a diagram showing an example of an output voltage waveform for a single phase of an inverter in embodiment 8 of the present invention.

FIG. 33 is a diagram showing an output voltage waveform for a single phase of the 5-level inverter 4 in the case where the combination of the numbers of pulses determined by the pulse number determination unit 13 is 5 pulses+3 pulses. In this case, the number of pulses for the switching leg 8a is three, and the number of pulses for the switching leg 8b is five, and the relationship between an output voltage waveform for a single phase of the 5-level inverter 4 and output voltage waveforms of the two switching legs 8a and 8b connected in series is shown in FIG. 33.

First, the modulation rate ensuring unit 121 defines, for the respective switching legs 8a and 8b, a function fa(th1a, th2a, th3a) and a function fb(th1b, th2b, th3b, th4b, th5b) as the first functions which each prescribe the relationship between switching phases and the modulation rate, as shown by expression (35) and expression (36). In this case, in order to equalize the burdens on the switching legs 8a and 8b, the function fa and the function fb are set so that the modulation rate m to be outputted is allocated equally between the switching legs 8a and 8b.

[Mathematical 23]

$$fa(th1a, th2a, th3a) = \quad (35)$$
$$\frac{2}{\pi}(\cos th1a - \cos th2a + \cos th3a) - m/2$$

$$fb(th1b, th2b, th3b, th4b, th5b) = \quad (36)$$
$$\frac{2}{\pi}(\cos th1b - \cos th2b + \cos th3b - \cos th4b + \cos th5b) - m/2$$

Next, as shown by expression (37), in order to reduce a harmonic, the harmonic reducing unit 122 defines a second function Y(thi) which prescribes the relationship between each switching phase thi and, as the addition value of respective harmonic elements, the sum of squares of values obtained by multiplying a harmonic voltage component of each order in the output waveform of the inverter 4 by a weighting coefficient w(k) (k=k1 to kj) of each order, and which has each switching phase thi as a variable.

In expression (37), k is the order of a harmonic to be reduced, and here, a total of ten kinds of orders, i.e., fifth order, . . . , thirty-first order, are reduction targets. However, the reduction targets are not limited thereto.

[Mathematical 24]

$$Y(th1a, th2a, th3a, , th1b, th2b, th3b, th4b, th5b) = \quad (37)$$
$$\sum \left\{ \frac{2}{\pi} \times \frac{1}{k}(\cos kth1a - \cos kth2a + \cos kth3a + \cos kth1b - \cos kth2b + \cos kth3b - \cos kth4b + \cos kth5b) \times w(k) \right\}^2$$
$$(k = 5, 7, 11, 13, 17, 19, 23, 25, 29, 31)$$

As shown by expression (38), in order to ensure the modulation rate and reduce the aforementioned sum of squares relevant to the harmonic voltage components of respective orders, the function combining unit 123 defines an evaluation function X having an increased degree of freedom by further adding additional variables to the degree of freedom (corresponding to the number of the switching phases thi as variables, here, eight variables) of the first functions fa and fb and the second function Y.

Specifically, the function combining unit 123 defines an evaluation function X(thi, α1, α2) which is the sum of the function Y(thi) shown by expression (37) and values obtained by multiplying the functions fa and fb shown by expressions (35) and (36) by weighting variables α1 and α2, respectively, and which has each switching phase thi and the weighting variables α1 and α2 as variables.

[Mathematical 25]

$$X(th1a, th2a, th3a, th1b, \\ th2b, th3b, th4b, th5b, \alpha1, \alpha2) = \\ Y(th1a, th2a, th3a, th1b, th2b, th3b, th4b, th5b) + \\ \alpha1 \times fa(th1a, th2a, th3a) + \\ \alpha2 \times fb(th1b, th2b, th3b, th4b, th5b) \quad (38)$$

The switching phase calculation unit 124 creates simultaneous equations with ten unknowns shown by expression (39) in which partial derivatives of the evaluation function X(thi, α1, α2) with respect to the ten variables α1, α2, th1a to th5b are all set at zero. Then, the simultaneous equations with ten unknowns are solved using, for example, Newton's method. Thus, it is possible to obtain, with a combination of different numbers of pulses, a switching pattern that ensures a required modulation rate m, equalizes the burdens on the switching legs 8a and 8b, and minimizes the overall value of harmonic voltage components of many orders.

[Mathematical 26]

$$\left. \begin{array}{l} \frac{\partial X}{\partial \alpha 1} = 0 \\ \frac{\partial X}{\partial \alpha 2} = 0 \\ \frac{\partial X}{\partial thi} = 0 \\ (i = 1a, 2a, 3a, 1b, 2b, 3b, 4b, 5b) \end{array} \right\} \quad (39)$$

As described above, in the present embodiment, in accordance with the output frequency command value Fc for the inverter 4 and the modulation rate, the pulse number determination unit 13 determines the numbers of pulses for the respective plurality of switching legs 8a and 8b and outputs a combination of the numbers of pulses. Therefore, it is possible to change the combination of the numbers of pulses in accordance with the modulation rate, reduce variation in the number of times of switching per unit output voltage within the same time period, and reduce switching loss irrespective of variation in the modulation rate and the operation frequency.

It is noted that, within the scope of the present invention, the above embodiments may be freely combined with each other, or each of the above embodiments may be modified or simplified as appropriate.

The invention claimed is:

1. A power conversion device comprising:
an inverter which includes a switching device, receives DC voltage of a DC voltage source, converts the DC voltage to variable-voltage variable-frequency AC voltage, and outputs the AC voltage to a load; and
a control unit for performing PWM control for ON/OFF driving of the switching device on the basis of an output voltage command value and an output frequency command value, wherein the control unit includes:
a modulation rate calculator for calculating a modulation rate for the inverter on the basis of the DC voltage of the DC voltage source and the output voltage command value;
a pulse number determination unit for determining a number of pulses per half cycle of a fundamental wave in the PWM control on the basis of the output frequency command value;
a switching pattern determination unit for obtaining, in advance, through calculation, a switching pattern specifying switching phases each of which is a timing of ON/OFF driving the switching device, in accordance with the modulation rate and the number of pulses, and stores the switching pattern for each modulation rate and for each number of pulses; and
a gate signal generation unit for reading, from the switching pattern determination unit, the switching pattern corresponding to the modulation rate from the modulation rate calculator and the number of pulses from the pulse number determination unit, and generating a gate signal for ON/OFF driving the switching device, on the basis of the switching pattern, and the switching pattern determination unit includes:
a modulation rate ensuring unit for generating a first function which is a function for ensuring the modulation rate and which associates a fundamental wave component of an output waveform of the inverter with the modulation rate and has the switching phases as variables;
a harmonic reducing unit for generating a second function which is a function for reducing a harmonic component in the output waveform of the inverter and which is an addition value of harmonic elements of respective orders determined by harmonic components of respective orders in the output waveform of the inverter, and has the switching phases as variables;
a function combining unit for setting a third function which is formed from the first function, the second function, and one or more additional variables, and has the switching phases and the additional variables as variables;
a switching phase calculation unit for calculating the switching phases that ensures the modulation rate and reduces the addition value of the harmonic elements of respective orders, by minimizing the third function with respect to the switching phases and the additional variables; and
a switching pattern storage unit for storing the switching pattern specified by the calculated switching phases, for each modulation rate and for each number of pulses.

2. The power conversion device according to claim 1, wherein
the harmonic elements of respective orders are harmonic voltage components of respective orders or harmonic current components of respective orders, and an addition value of squares of the components of respective orders is used as the second function.

3. The power conversion device according to claim 1, wherein
the harmonic elements of respective orders are multiplication values of harmonic voltage components of respective orders and harmonic current components of respective orders, and an addition value of the multiplication values of respective orders is used as the second function.

4. The power conversion device according to claim 1, wherein
n order of each of the harmonic elements of respective orders based on a fundamental wave frequency in the PWM control as a reference is 6n±1, where n is a natural number.

5. The power conversion device according to claim 1, wherein
the inverter is configured such that two or more 2-level or 3-level switching legs are connected in series for each phase, to output voltage with the modulation rate.

6. The power conversion device according to claim 5, wherein
the modulation rate ensuring unit generates, as the first function, a plurality of fundamental first functions each associating a fundamental wave component in a half cycle of output voltage with the modulation rate, for the respective plurality of switching legs, and a balance function associating an amplitude difference between partial fundamental wave components in partial intervals in half cycles of output voltages of the plurality of switching legs, with an upper limit value for the amplitude difference.

7. The power conversion device according to claim 5, wherein
the harmonic reducing unit generates, as the second function, a fundamental second function which is an addition value of the harmonic elements of respective orders in a half cycle of output voltage of the inverter, and a plurality of auxiliary second functions each associating an addition value of the harmonic elements of respective orders in a partial interval in a half cycle of output voltage with a threshold value for a harmonic level, for the respective plurality of switching legs.

8. The power conversion device according to claim 5, wherein
the pulse number determination unit determines numbers of pulses for the respective plurality of switching legs, and outputs a combination of the numbers of pulses.

9. The power conversion device according to claim 5, wherein
the gate signal generation unit includes a switching pattern exchange unit for exchanging switching patterns for the respective switching legs with a predetermined cycle so as to equalize burdens on the switching legs connected in series.

10. The power conversion device according to claim 9, wherein
the switching pattern exchange unit switches the cycle for exchanging the switching patterns, in accordance with current outputted to the load.

11. The power conversion device according to claim 9, further comprising an device current detection unit for detecting current flowing through the switching device, wherein
the switching pattern exchange unit switches the cycle for exchanging the switching patterns, in accordance with output of the device current detection unit.

12. The power conversion device according to claim 9, further comprising an device temperature detection unit for detecting a temperature of the switching device, wherein
the switching pattern exchange unit switches the cycle for exchanging the switching patterns, in accordance with output of the device temperature detection unit.

13. The power conversion device according to claim 1, wherein
the modulation rate ensuring unit generates, as the first function, a fundamental first function associating a fundamental wave component in a half cycle of output voltage of the inverter with the modulation rate, and an auxiliary first function associating a partial fundamental wave component in a partial interval in the half cycle of output voltage of the inverter with the modulation rate.

14. The power conversion device according to claim 13, wherein
the partial interval in a half cycle of output voltage of the inverter is a center interval, in the half cycle of the output voltage, that includes at least one center pulse.

15. The power conversion device according to claim 1, wherein
the harmonic reducing unit generates, as the second function, a fundamental second function which is an addition value of the harmonic elements of respective orders in a half cycle of output voltage of the inverter, and an auxiliary second function associating an addition value of the harmonic elements of respective orders in a partial interval in the half cycle of output voltage of the inverter with a threshold value for a harmonic level.

16. The power conversion device according to claim 1, wherein
the DC voltage source is connected to a series connection unit formed of a positive-side capacitor and a negative-side capacitor,
the control unit performs PWM control for the inverter so that the inverter outputs a positive-side component of the AC voltage on the basis of voltage of the positive-side capacitor and outputs a negative-side component of the AC voltage on the basis of voltage of the negative-side capacitor, and
the gate signal generation unit includes a pulse correction unit for correcting the switching phases specified by the switching pattern, so as to equalize the voltage of the positive-side capacitor and the voltage of the negative-side capacitor.

17. The power conversion device according to claim 16, further comprising a neutral point voltage detection unit for detecting, as neutral point voltage, a difference between the voltage of the positive-side capacitor and the voltage of the negative-side capacitor, wherein
the pulse correction unit corrects the switching phases on the basis of output of the neutral point voltage detection unit.

18. The power conversion device according to claim 16, further comprising a neutral point current detection unit for detecting, as neutral point current, current flowing into a connection point between the positive-side capacitor and the negative-side capacitor, wherein
the pulse correction unit corrects the switching phases on the basis of output of the neutral point current detection unit.

* * * * *